United States Patent
Iyoda et al.

(10) Patent No.: US 9,818,237 B2
(45) Date of Patent: Nov. 14, 2017

(54) INFORMATION COLLECTION SYSTEM, ON-VEHICLE DEVICE AND SERVER

(71) Applicant: TOYOTA JIDOSHA KABUSHIKI KAISHA, Toyota-shi, Aichi-ken (JP)

(72) Inventors: Motomi Iyoda, Seto (JP); Kenichi Ohue, Toyota (JP); Takashi Kojima, Seto (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 41 days.

(21) Appl. No.: 15/154,145

(22) Filed: May 13, 2016

(65) Prior Publication Data

US 2016/0364921 A1 Dec. 15, 2016

(30) Foreign Application Priority Data

Jun. 15, 2015 (JP) ................................. 2015-120674

(51) Int. Cl.
| | | |
|---|---|---|
| *G07C 5/00* | (2006.01) | |
| *G07C 5/08* | (2006.01) | |
| *H04L 29/08* | (2006.01) | |
| *H04L 29/06* | (2006.01) | |

(52) U.S. Cl.
CPC ........... *G07C 5/008* (2013.01); *G07C 5/0841* (2013.01); *H04L 67/12* (2013.01); *H04L 67/125* (2013.01); *H04L 67/18* (2013.01); *H04L 67/42* (2013.01); *H04L 69/28* (2013.01)

(58) Field of Classification Search
CPC ....... G07C 5/008; G07C 5/0841; H04L 69/28; H04L 67/18; H04L 67/12; H04L 67/125; H04L 67/42
See application file for complete search history.

(56) References Cited

U.S. PATENT DOCUMENTS

| 2015/0088335 A1* | 3/2015 | Lambert | ............... G08G 1/162 |
| | | | 701/1 |
| 2017/0169625 A1* | 6/2017 | Lavie | ..................... G07C 5/008 |

FOREIGN PATENT DOCUMENTS

| JP | 2007-293536 A | 11/2007 |
| JP | 2008-108245 A | 5/2008 |
| JP | 2014-064461 A | 4/2014 |

\* cited by examiner

*Primary Examiner* — Mary Cheung
(74) *Attorney, Agent, or Firm* — Oliff PLC

(57) ABSTRACT

An information collection system includes an on-vehicle device and a server, wherein the on-vehicle device includes a first transmission signal transmitting part configured to transmit a first transmission signal to the server when the vehicle event is detected, and an upload executing part configured to transmit the vehicle event data to the server when the upload demand is received. The server includes a determining part configured to determine, based on the determination purposes information, when the first transmission is received, whether the information acquisition condition is met, an upload demanding part configured to transmit the upload demand to the on-vehicle device when it is determined that the information acquisition condition is met, and a vehicle event data receiving part configured to receive the vehicle event data transmitted from the on-vehicle device.

12 Claims, 28 Drawing Sheets

FIG.6

| VEHICLE EVENT TYPE ID | RECORDING AREA |
|---|---|
| AAA | RECORDING AREA RA |
| BBB | RECORDING AREA RB |
| CCC | RECORDING AREA RC |

FIG.7

| DETECTION NUMBER RECORDING AREA | VEHICLE INFORMATION RECORDING AREA |
|---|---|

FIG.8

| VEHICLE EVENT TYPE ID | VEHICLE INFORMATION |
|---|---|
| AAA | CONTROL SIGNAL A |
| BBB | OPERATION SIGNAL B |
| CCC | SENSOR SIGNAL C |

FIG.11

| FIRST TRANSMISSION SIGNAL ID | VEHICLE ID | DATA/TIME/ POSITION | RECORDING AREA INFORMATION | DETECTION NUMBER INFORMATION | TIMESTAMP |
|---|---|---|---|---|---|

FIG.12

| UPLOAD DEMAND ID | DESIGNATION INFORMATION FOR READ-TARGET RECORDING AREA |
|---|---|

FIG.13

| UPLOAD ID | VEHICLE ID | RECORDING AREA INFORMATION | DETECTION NUMBER INFORMATION | VEHICLE EVENT DATA |
|---|---|---|---|---|

FIG.15

| DATA ID | VEHICLE ID | DETECTION DATA/TIME | DETECTION POSITION | VEHICLE EVENT DATA |
|---|---|---|---|---|
| ** | ** | 2015/1/3 10:30 | (LATITUDE**, LONGITUDE**) | ** |
| ** | ** | 2015/1/5 17:30 | (LATITUDE**, LONGITUDE**) | ** |

FIG.16

| VEHICLE ID | DATA RECORDING SPECIFICATION INFORMATION | VEHICLE SPECIFICATION INFORMATION | DEALER INFORMATION | OCCUPANT INFORMATION |
|---|---|---|---|---|
| ** | ** | ** | ** | ** |
| ** | ** | ** | ** | ** |

FIG.18

```
OR ─┬──────────── CONDITION ELEMENT A0
    ├──────────── CONDITION ELEMENT A1
    ├─ AND ─┬──── CONDITION ELEMENT A2
    │       └──── CONDITION ELEMENT A3
    ├─ AND ─┬──── CONDITION ELEMENT A4
    │       ├──── CONDITION ELEMENT A5
    │       └──── CONDITION ELEMENT A6
```

FIG.19

| SURROUNDING CIRCUMSTANCE | MET OR NOT |
|---|---|
| SEASON A | ○ |
| POSITION B | ○ |

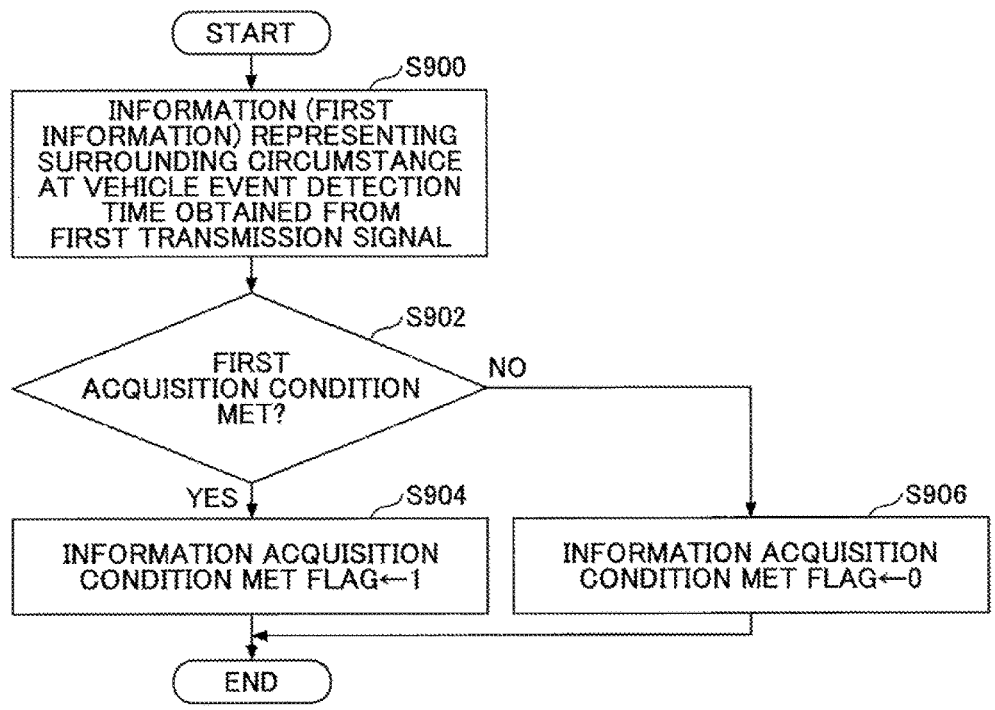

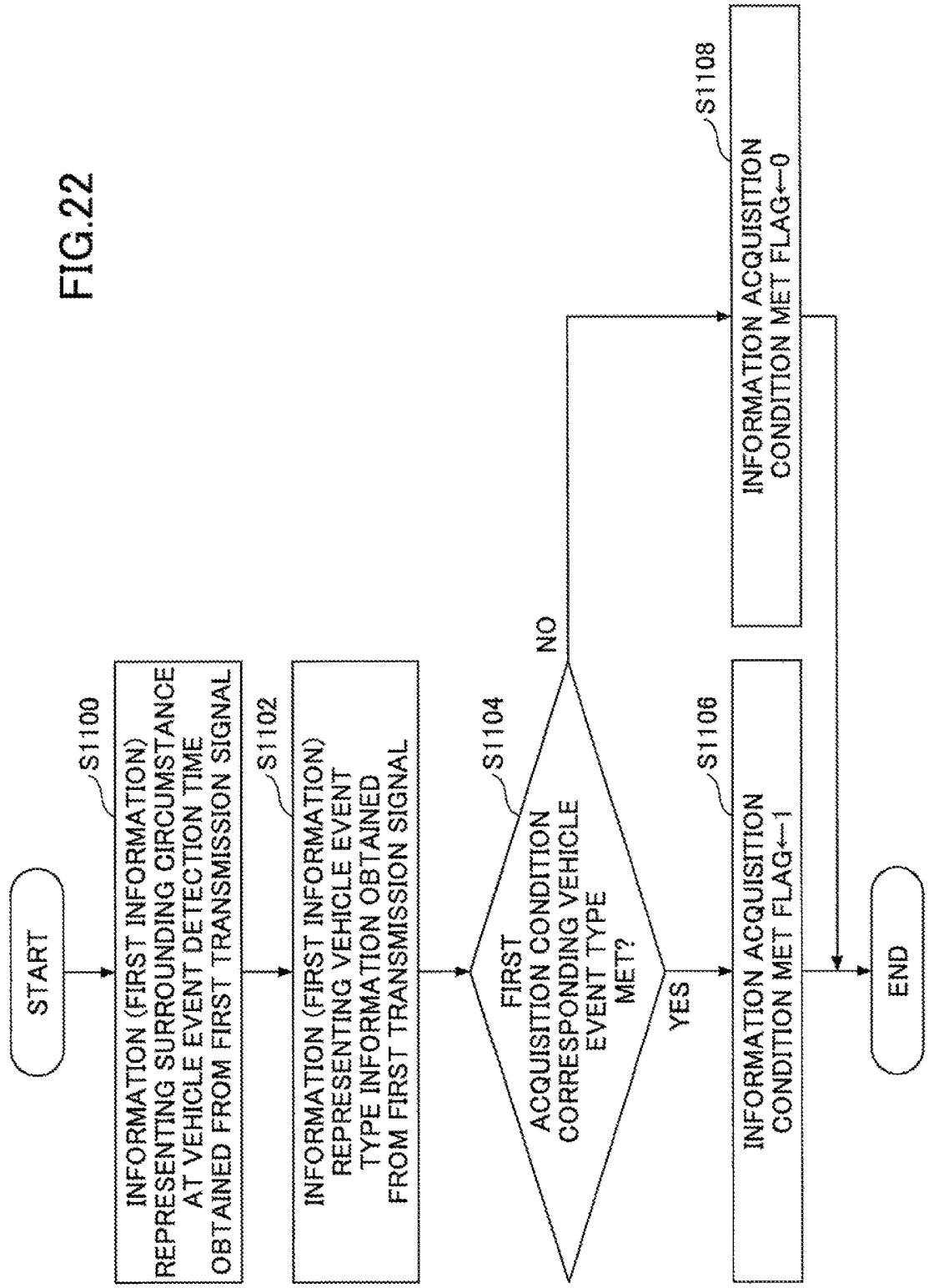

FIG.27

| VEHICLE EVENT TYPE | FIRST ACQUISITION CONDITION | MET OR NOT |
|---|---|---|
| VEHICLE EVENT TYPE A | CLIMATE CONDITION ELEMENT A | ○ |
| VEHICLE EVENT TYPE B | ROAD GRADIENT CONDITION ELEMENT A | ○ |
| VEHICLE EVENT TYPE C | TRAFFIC AMOUNT CONDITION ELEMENT B | ○ |

FIG.31

| VEHICLE EVENT TYPE ID | DETECTION NUMBER |
|---|---|
| AAA | 1 |
| BBB | 2 |
| CCC | 4 |

INFORMATION COLLECTION SYSTEM, ON-VEHICLE DEVICE AND SERVER

CROSS REFERENCE TO RELATED APPLICATION (U.S. ONLY)

The present application is based on and claims the benefit of priority of Japanese Priority Application No. 2015-120674, filed on Jun. 15, 2015, the entire contents of which are hereby incorporated by reference.

FIELD

The disclosure is related to an information collection system, an on-vehicle device and a server.

BACKGROUND

An information collection system including an on-vehicle device and a server is known from Japanese Laid-open Patent Publication No. 2007-293536 (referred to as "Patent Document 1") in which the on-vehicle device records data related to a predetermined type of a vehicle event (referred to as "vehicle event data", hereinafter) to upload the vehicle event data. According to the information collection system disclosed in Patent Document 1, the on-vehicle device uploads the vehicle event data to the server whenever an activation of an air bag (an example of the predetermined type of the vehicle event) is detected.

However, according to such an information collection system as disclosed in Patent Document 1, there may be a case where some of the vehicle event data that is not useful for an analysis because the vehicle event data is always uploaded to the server every time when the predetermined type of the vehicle event is detected. In such a case, there is a problem that a communication load is increased unnecessarily due to such useless uploading of the vehicle event data. Further, in such a case, there is another problem that the vehicle event data useless for the analysis and the vehicle event data useful for the analysis are mixed to be accumulated in the server, which causes a reduction of analysis efficiency.

It is difficult to uniformly determine what vehicle event data is useful for an analysis, because usefulness of the vehicle event data depends on types of the vehicle event in question, a surrounding circumstance of the vehicle at a detection timing of the vehicle event, an analysis way used by an analyzer, an analysis purpose, etc., and could be changed afterward. For example, even the vehicle event whose vehicle event data was believed to be always useful for the analysis may be reconsidered afterward such that the vehicle event data thereof is useful only when the vehicle event is detected in a particular circumstance.

Therefore, an object of the disclosure is to suppress an unnecessary increase in a communication load and increase an analysis efficiency in a case where an on-vehicle device uploads vehicle event data to a server.

SUMMARY

According to one aspect of the present invention, an information collection system is provided, comprising:
an on-vehicle device installed in a vehicle, and
a server disposed remotely from the vehicle, the server being configured to communicate with the on-vehicle device in a bidirectional manner, wherein
the on-vehicle device includes;

a first storage,
a vehicle event detection part configured to detect a vehicle event,
a vehicle information generating part configured to generate vehicle information representing a state of the vehicle,
a data recording part configured to record vehicle event data in the first storage when the vehicle event is detected, the vehicle event data including the vehicle information for a predetermined period according to a detection timing of the vehicle event,
a first transmission signal transmitting part configured to transmit a first transmission signal to the server when the vehicle event is detected, the first transmission signal including vehicle event detection report information for informing that the vehicle event has been detected,
an upload demand receiving part configured to receive an upload demand from the server, and
an upload executing part configured to transmit the vehicle event data to the server when the upload demand is received, and wherein
the server includes;
a first transmission signal receiving part configured to receive the first transmission signal,
a second storage configured to store an information acquisition condition that is predetermined to be determined based on determination purposes information, the determination purposes information including at least one of timing-based information relevant to the detection timing of the vehicle event, type information relevant to a type of the vehicle event, and configuration information relevant to a vehicle configuration that has influence on the vehicle event,
a determination purposes information acquisition part configured to obtain the determination purposes information,
a determining part configured to determine, based on the determination purposes information, when the first transmission is received, whether the information acquisition condition is met,
an upload demanding part configured to transmit the upload demand to the on-vehicle device when it is determined that the information acquisition condition is met, and
a vehicle event data receiving part configured to receive the vehicle event data transmitted from the on-vehicle device.

According to one aspect of the present invention, the vehicle information generating part generates vehicle information representing a state of the vehicle. The term "state of the vehicle" covers a concept that includes a movement state of the vehicle (acceleration, speed, etc.), a control state of the vehicle (operation instructions of the control, instruction values of the control, etc.), a traveling state of the vehicle (distance toward the preceding vehicle, etc.), a operation state of the vehicle (an accelerator pedal position signal and switch operation signals, etc.), an occupant state of the vehicle, etc. The vehicle event detection part of the on-vehicle device detects the vehicle event. The data recording part records vehicle event data in the first storage when the vehicle event is detected by the vehicle event detection part. The vehicle event data includes the vehicle information for a predetermined period according to a detection timing of the vehicle event. The predetermined period according to a detection timing of the vehicle event is a period starting from the detection timing of the vehicle event, a period ending at the detection timing of the vehicle event, or a period starting before the detection timing of the vehicle event and ending after the detection timing of the vehicle event, for example, and is determined in advance. Further, the first transmission signal transmitting part transmits a first transmission signal to the server when the vehicle event is detected. The first transmission signal includes vehicle event detection report information for informing that the vehicle event has been detected. It is noted that, at that time, the first transmission signal transmitting part transmits only the first transmission signal, and does not transmit the vehicle event data together with the first transmission signal to the server.

The first transmission signal is received by the server. The determining part of the server determines whether the predetermined information acquisition condition is met. When the determining part of the server determines that the predetermined information acquisition condition is met, the upload demanding part transmits the upload demand to the on-vehicle device. The upload demand is received by the upload demand receiving part of the on-vehicle device. The upload executing part transmits (uploads) the vehicle event data to the server when the upload demand is received by the upload demand receiving part.

According to the aspect, when the vehicle event is detected, the vehicle event data of the vehicle event is not always uploaded to the server, but instead the first transmission signal is transmitted to the server at first. Then, in the server, whether the information acquisition condition is met is determined, and if it is determined by the determining part that the information acquisition condition is met, the vehicle event data is uploaded to the server. Thus, according to the aspect, the communication load of the information collection system as a whole can be reduced, in comparison with a configuration where the vehicle event data of the vehicle event is always uploaded to the server whenever the vehicle event is detected. For example, with respect to the vehicle event for which the information acquisition condition is not met, only the first transmission signal is transmitted to the server and the vehicle event data is not uploaded to the server. Thus, the communication load is reduced, in comparison with the case where the vehicle event data of the vehicle event is uploaded to the server.

BRIEF DESCRIPTION OF DRAWINGS

FIG. 6 is a diagram illustrating an example of a relationship between a vehicle event type ID and a recording area.

FIG. 7 is a diagram illustrating an example of the recording area.

FIG. 8 is a diagram illustrating an example of a relationship between a vehicle event type ID and vehicle information.

FIG. 11 is a diagram illustrating an example of information included in a first transmission signal.

FIG. 12 is a diagram illustrating an example of information included in an upload request.

FIG. 13 is a diagram illustrating an example of information to be transmitted together with vehicle event data.

FIG. 15 is a diagram illustrating an example of information to be recorded in a vehicle event data accumulating part.

FIG. 16 is a diagram illustrating an example of information to be stored in a vehicle basic information storage part.

FIG. 18 is a diagram illustrating an example of an information acquisition condition.

FIG. 19 is a diagram illustrating another example of the information acquisition condition.

FIG. 20 is a flowchart illustrating an example of a vehicle event data acquisition necessity determination process.

FIG. 21 is a diagram illustrating yet another example of the information acquisition condition.

FIG. 22 is a flowchart illustrating another example of the vehicle event data acquisition necessity determination process.

FIG. 27 is a diagram illustrating an example of the information acquisition condition used in the second embodiment.

FIG. 31 is a diagram illustrating an example of information to be stored in a storage part of the communication module.

DESCRIPTION OF EMBODIMENTS

In the following, the best mode for carrying out the present invention will be described in detail by referring to the accompanying drawings.

First Embodiment

Figure 1:
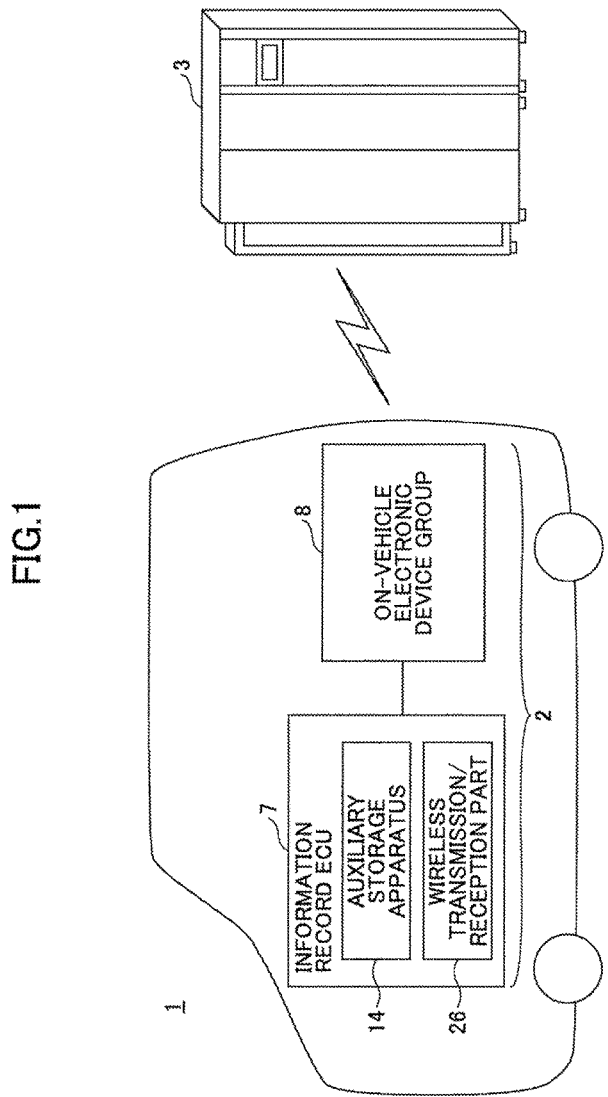
FIG. 1 is a diagram illustrating a configuration of an information collection system according to a first embodiment.

FIG. 1 is a diagram illustrating a configuration of an information collection system according to a first embodiment.

The information collection system 1 includes an on-vehicle device 2 installed on a vehicle and a server 3. The server 3 is disposed remotely with respect to the on-vehicle device 2. It is noted that it is assumed that a plurality of vehicles have the on-vehicle devices 2, respectively. In the following, unless otherwise specified, the on-vehicle device 2 installed on an arbitrary vehicle is described. Further, in the following, unless otherwise specified, the "vehicle" represents the vehicle on which the on-vehicle device 2 is installed.

The on-vehicle device 2 includes an information record ECU (Electronic Control Unit) 7 and an on-vehicle electronic device group 8. The information record ECU 7 is provided in a lower portion of a center console, for example. It is noted that, in FIG. 1, an auxiliary storage apparatus 14 and a wireless transmission/reception part 26 are illustrated as a part of the information record ECU 7.

Figure 2:
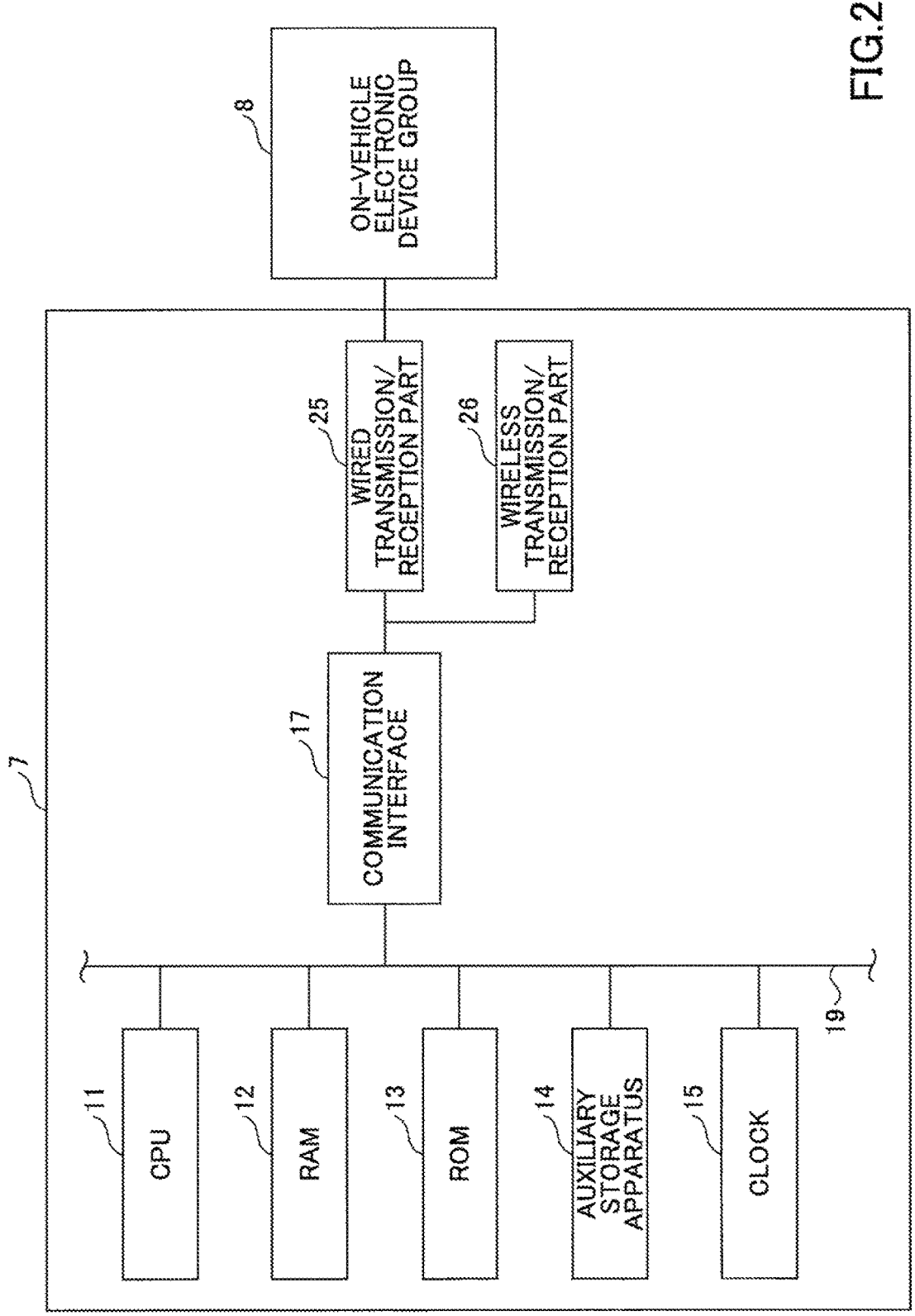
FIG. 2 is a diagram illustrating an example of a configuration of an information record ECU.

FIG. 2 is a diagram illustrating an example of a configuration of the information record ECU 7. In FIG. 2, the on-vehicle electronic device group 8 is schematically illustrated in connection with a hardware configuration of the information record ECU 7.

The information record ECU 7 includes a CPU (Central Processing Unit) 11, a RAM (Random Access Memory) 12, a ROM (Read Only Memory) 13, the auxiliary storage apparatus 14, a clock 15, and a communication interface 17 which are coupled to a bus 19. Further, the information record ECU 7 includes a wired transmission/reception part 25 and the wireless transmission/reception part 26 that are coupled to the communication interface 17.

The auxiliary storage apparatus 14 is an EEPROM (Electrically Erasable Programmable Read-Only Memory), an HDD (Hard Disk Drive), etc., for example.

The clock 15 indicates absolute time (year, month, day, minute, and second), for example.

The wired transmission/reception part 25 includes a transmission/reception part that is capable of communicating via a vehicle network such as CAN (Controller Area Network), LIN (Local Interconnect Network), etc. The wireless transmission/reception part 26 is capable of communicating via a wireless communication network used by cellular phones. In the following, expressions "via the wired transmission/reception part 25" and "via the wireless transmission/reception part 26" are used for the sake of reducing redundancy of the explanation, but means "via the communication interface 17 and the wired transmission/reception part 25" and "via the communication interface 17 and the wireless transmission/reception part 26", respectively.

It is noted that the information record ECU 7 may include a second wireless transmission/reception part (not illustrated) coupled to the communication interface 17, in addition to the wired transmission/reception part 25. In this case, the second wireless transmission/reception part may include a Near Field Communication (NFC) part, a Bluetooth (trademark) communication part, a Wi-Fi (Wireless-Fidelity) transmission/reception part, an infrared transmission/reception part, etc. It is noted that, if the information record ECU 7 includes the second wireless transmission/reception part, the expression "via the wired transmission/reception part 25" in the following can be replaced with the expression "via the second wireless transmission/reception part", if necessary. Similarly, the communication interface 17 may be coupled to a communication line without using the vehicle network. In this case, the expression "via the wired transmission/reception part 25" in the following can be replaced with the expression "via the direct communication line, if necessary.

Figure 3:
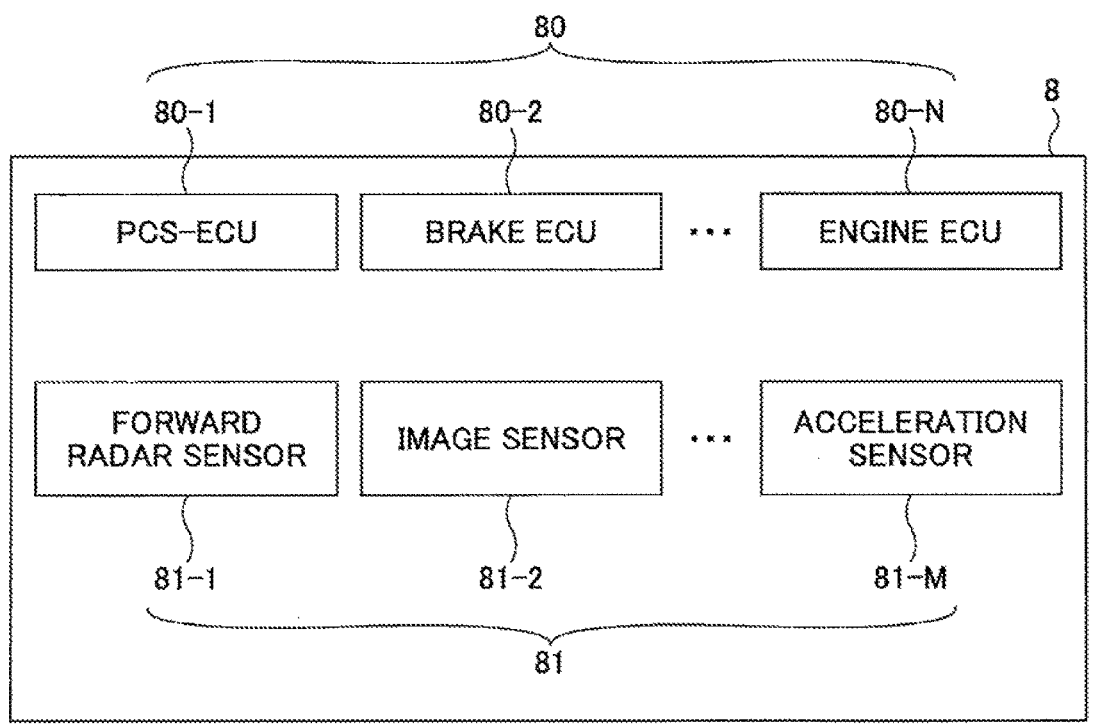
FIG. 3 is a diagram illustrating a configuration of an on-vehicle electronic device group.

FIG. 3 is a diagram illustrating a configuration of the on-vehicle electronic device group 8.

The on-vehicle electronic device group 8 represents a group of various electronic devices (sensors, ECUs, and actuators) installed on the vehicle. In the example illustrated in FIG. 3, the on-vehicle electronic device group 8 includes various ECUs 80 and various detection/measurement devices 81. It is noted that, in the following, as an example, it is assumed that the detection/measurement devices 81 include a GPS (Global Positioning System) receiver that calculates the vehicle position. Further, in the following, the term "an element in the on-vehicle electronic device group 8" means the ECU or the detection/measurement device included in the on-vehicle electronic device group 8.

The on-vehicle electronic device group 8 includes elements that are capable of communicating with the information record ECU 7 via the wired transmission/reception part 25 in a bidirectional manner. Further, when the information record ECU 7 includes the second wireless transmission/reception part, the on-vehicle electronic device group 8 may include elements that are capable of communicating with the information record ECU 7 via the second wireless transmission/reception part in a bidirectional manner.

The on-vehicle electronic device group 8 implements a vehicle information generating part that generates the vehicle information described hereinafter. Which ECU or sensor implements the vehicle information generating part depends on the vehicle information to be written (described hereinafter). For example, if the vehicle information to be written is acceleration of the vehicle, the vehicle information generating part may be implemented by an acceleration sensor in the on-vehicle electronic device group 8. Further, the vehicle information to be written is control instruction values generated by a brake ECU, the vehicle information generating part may be implemented by the brake ECU in the on-vehicle electronic device group 8. It is noted that the vehicle information to be written may be images captured by an on-vehicle image sensor (camera), detection information of an on-vehicle radar sensor, an accelerator signal, control instruction values for a drive apparatus, histories of states of flags related to various controls, diagnosis information, a state of an on-vehicle battery, etc.

In the example illustrated in FIG. 3, as an example, the ECUs 80 include a PCS(Pre-Crash Safety)-ECU 80-1, a brake ECU 80-2, . . . and an engine ECU 80-N. The detection/measurement devices 81 include a forward radar sensor 81-1, an image sensor 81-2, . . . and an acceleration sensor 81-M. In the following, the term "ECU 80-#" represents an arbitrary ECU of the ECUs 80-1 through 80-N.

Figure 4:
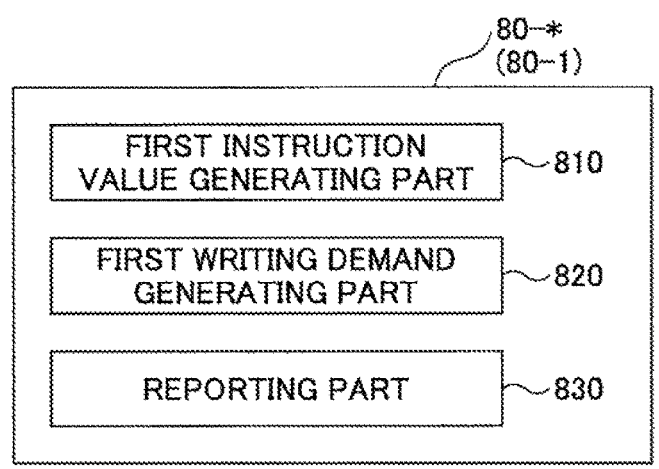
FIG. 4 is a functional block diagram of an ECU.

FIG. 4 is a functional block diagram of the ECU 80-# in the on-vehicle electronic device group 8. The hardware configuration of the ECU 80-# is not illustrated. A basic hardware configuration (architecture) of the ECU 80-# is the same as that of the information record ECU 7 illustrated in FIG. 2 except that there is no wireless transmission/reception part 26. Further, the ECU 80-# may not include the clock 15. It is noted that, from the viewpoint of the ECU 80-#, the information record ECU 7 is included in the on-vehicle electronic device group 8 (and the ECU 80-# itself is not included in the on-vehicle electronic device group 8).

The ECU 80-# are ECUs, among the ECUs included in the on-vehicle electronic device group 8, that perform control related to predetermined types of vehicle events. The ECU 80-1 through 80-N perform control related to one or more types of vehicle events, respectively. In the first embodiment, as an example, the ECU 80-1 through 80-N perform control related to a single type of the vehicle event, respectively. Thus, the number of the vehicle events to be detected by the ECU 80-1 through 80-N as a whole is "N". There may be a case where there is only one type of the vehicle event to be detected (i.e., N=1); however, in the following, unless otherwise specified, it is assumed that there are two or more types of the vehicle events to be detected.

The vehicle events are behaviors of the vehicle caused by control values calculated for controlling the vehicle, operation signals generated in response to operations of vehicle occupants, etc., for example. There are various vehicle events, and thus the types of the vehicle events to be detected are predetermined according to an analysis purpose, etc. For example, the types of the vehicle events to be detected include vehicle events due to particular operations, such as a simultaneous occurrence (referred to as "simultaneous occurrence of accelerator and brake signals", hereinafter) of an accelerator signal of the accelerator opening degree greater than 0 and a brake signal of the brake pedal operation amount greater than 0, an occurrence of the accelerator opening degree greater than a middle value at a neutral shift range, a sudden braking operation that could cause ABS (Antilock Brake System) to be operated if it were performed under rainy situations, an emergency braking operation that is more emergent than the sudden braking operation, and a sudden steering operation. Further, the types of the vehicle events to be detected include operations of particular controls caused by particular conditions being met. For example, the types of the vehicle events to be detected include operations of automatic controls or alarm controls for assisting a safety drive of the vehicle. The automatic controls may be operated regardless of the operations of the driver (i.e., the automatic controls are performed based on control values that are different from those calculated based on the driver operation). The automatic controls include a brake control of PCS, VSC (Vehicle Stability Control), ABS, TRC (TRaction Control), LKA (Lane Keeping Assist), etc. Further, alarm controls include an alarm control of PCS, LDA (Lane Departure Alert), CTA (Cross Traffic Alert), etc.

In FIG. 4, as an example, the case where the ECU 80-# is the PCS-ECU 80-1 is described.

The PCS-ECU 80-1 includes a first instruction value generating part 810, a first writing demand generating part 820 and a reporting part 830. The first instruction value generating part 810, the first writing demand generating part 820, and the reporting part 830 may be implemented by the CPU executing one or more programs stored in the ROM, respectively. It is noted that, when the vehicle information to be written (i.e., the vehicle event data described hereinafter) includes an instruction generated by the first instruction value generating part 810, the first instruction value generating part 810 forms an example of the vehicle information generating part.

The first instruction value generating part 810 generates an instruction related to "an operation of the PCS". Specifically, the first instruction value generating part 810 determines, based on the information obtained from the on-vehicle electronic device group 8 (from the elements other than the PCS-ECU 80-1, and the same holds true, hereinafter) via the wired transmission/reception part, whether the operation of the PCS is necessary. For example, the first instruction value generating part 810 calculates, based on detection information (obstacle information) from the forward radar sensor 81-1, a time before the collision of the vehicle with respect to the forward obstacle, that is to say, ITC (Time To Collision). Then, the first instruction value generating part 810 outputs an automatic brake operation demand (instruction) via the wired transmission/reception part when the TTC becomes less than or equal to a predetermined threshold Th1. This automatic brake operation demand is received by the brake ECU 80-2. The brake ECU 80-2 generates an instruction value in response to the automatic brake operation demand to control a brake actuator and valves (not illustrated) of a brake hydraulic circuit. In other words, the brake ECU 80-2 increases wheel cylinder pressures of the respective wheels based on the control value that is different from the control value according to the brake operation amount of the driver.

The first writing demand generating part 820 generates a data writing demand when a predetermined writing condition related to the operation of the PCS is met. The first writing demand generating part 820 transmits the data writing demand to the information record ECU 7 via the wired transmission/reception part. In the first embodiment, as an example, it is assumed that the first writing demand generating part 820 transmits the data writing demand when the TIC becomes less than or equal to a predetermined threshold Th2 (>Th1). The data writing demand is transmitted with information with which the information record ECU 7 can identify the data to be written. In the first embodiment, as an example, the data writing demand is transmitted with a vehicle event type ID that represents the type of the vehicle event (i.e., the operation of the PCS).

The reporting part 830 transmits a vehicle event detection report via the wired transmission/reception part when the first instruction value generating part 810 causes the PCS to be operated. The vehicle event detection report is used for reporting the operation of the PCS (i.e., the vehicle event) to the information record ECU 7. The vehicle event detection report is transmitted with information with which the information record ECU 7 can identify the type of the detected vehicle event. In the first embodiment, as an example, the vehicle event detection report is transmitted with the vehicle event type ID.

Figure 5:
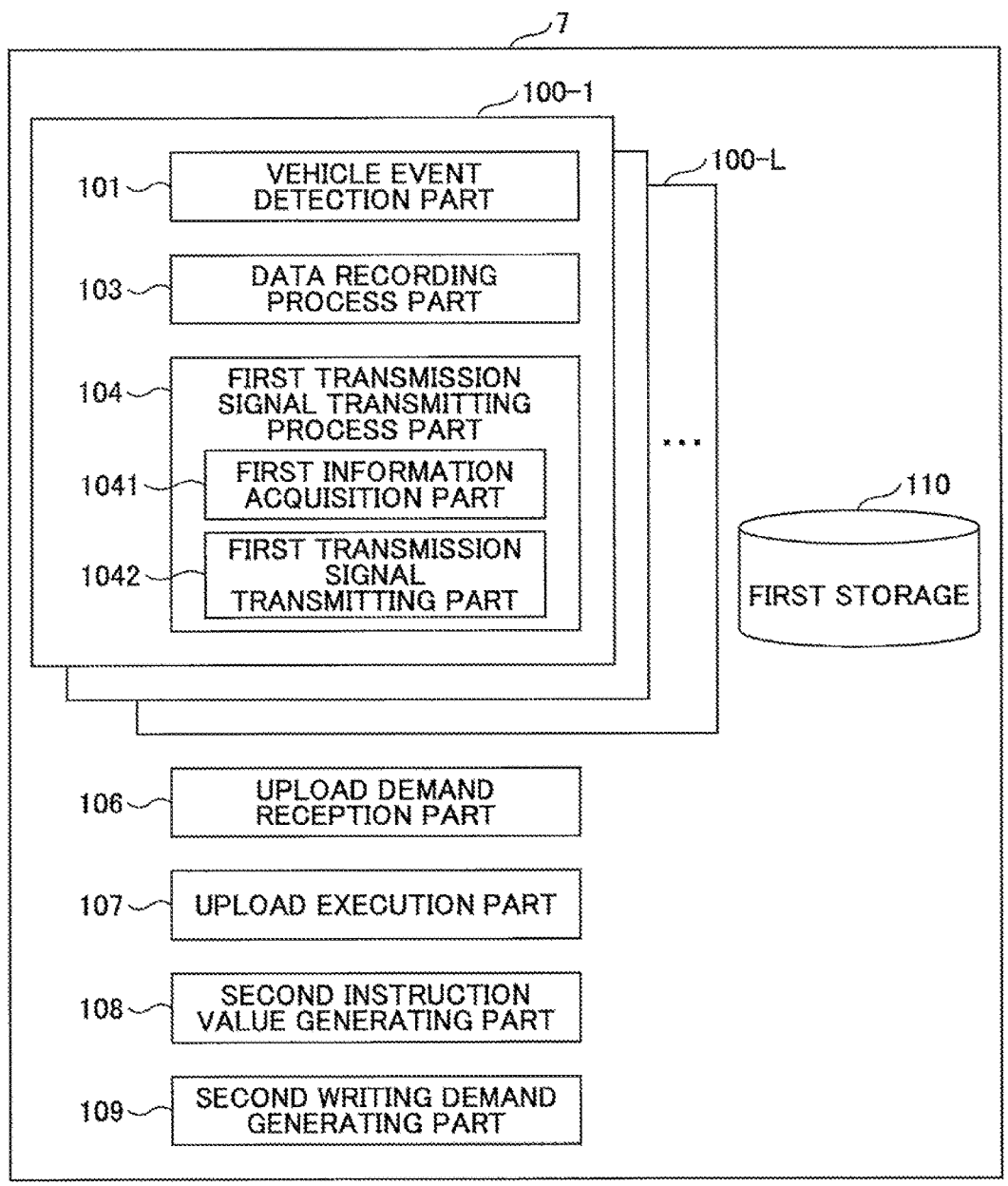
FIG. 5 is a functional block diagram of the information record ECU.

FIG. 5 is a diagram illustrating an example of a functional block of the information record ECU 7.

The information record ECU 7 includes vehicle event recording process parts 100-1 through 100-L, an upload demand reception part 106, an upload execution part 107, a second instruction value generating part 108, a second writing demand generating part 109, and a first storage 110. The respective parts 100-1 through 109 may be implemented by the CPU 11 illustrated in FIG. 2 executing one or more programs stored in the ROM 13 illustrated in FIG. 2, respectively. The first storage 110 is a storage of the on-vehicle device 2 and may be implemented by the auxiliary storage apparatus 14.

The vehicle event recording process parts 100-1 through 100-L are provided for the types of the vehicle events to be detected, respectively. In the first embodiment, a relationship between the number L of the vehicle event recording process parts 100-1 through 100-L and the number N of the ECUs 80-1 through 80-N is such that L=N+1. Specifically, the vehicle event recording process parts 100-1 through 100-L include the vehicle event recording process parts 100-1 through 100-N provided for the ECUs 80-1 through 80-N, respectively, and the vehicle event recording process part 100-L provided for the information record ECU 7 itself.

The functions of the vehicle event recording process parts 100-1 through 100-L are substantially the same except that the types of the vehicle events allocated to the vehicle event recording process parts 100-1 through 100-L are different. Thus, in the following, unless otherwise specified, an arbitrary vehicle event recording process part 100-#, among the vehicle event recording process parts 100-1 through 100-L, is described. The vehicle event recording process part 100-# includes a vehicle event detection part 101, a data recording process part 103, and a first transmission signal transmitting process part 104.

The vehicle event detection part 101 detects a predetermined type of the vehicle event. In the following, unless otherwise specified, the vehicle event corresponds to the predetermined type of the vehicle event.

The vehicle event detection part 101 can detect the vehicle event based on the vehicle event detection report that can be obtained via the wired transmission/reception part 25 from the ECU 80-# of the on-vehicle electronic device group 8. As described above, the vehicle event detection report is used for reporting the detection of the vehicle event to the information record ECU 7.

For example, in the case of the example illustrated in FIG. 3 (i.e., the case where the vehicle event is the operation of the PCS), the vehicle event detection part 101 of the vehicle event recording process part 100-1 can detect the vehicle event (i.e., the operation of the PCS) based on the vehicle event detection report from the PCS-ECU 80-1. Further, if the type of the vehicle event to be detected is the "simultaneous occurrence of accelerator and brake signals", the vehicle event detection part 101 can detect the vehicle event based on the vehicle event detection report from the ECU 80-# that detects the vehicle event "simultaneous occurrence of accelerator and brake signals". However, the vehicle event detection part 101 may detect the vehicle event based on the information (other than the vehicle event detection report) from the various detection/measurement devices 81 of the on-vehicle electronic device group that can be obtained via the wired transmission/reception part 25. For example, the vehicle event detection part 101 may detect the vehicle event "simultaneous occurrence of accelerator and brake signals" based on the accelerator and brake signals" that can be obtained via the wired transmission/reception part 25.

Further, the vehicle event detection part 101 of the vehicle event recording process part 100-L detects the corresponding type of the vehicle event based on the vehicle event detection report from the second instruction value generating part 108. In the first embodiment, as an example, the vehicle event detection part 101 detects the vehicle event "an operation of an occupant protection assistance device (a seat belt pre-tensioner, for example"). The second instruction value generating part 108 inputs an operation instruction to the occupant protection assistance device when a predetermined operation condition is met. At that time, the vehicle event detection part 101 can detect the operation of the occupant protection assistance device (i.e., the vehicle event) based on the vehicle event detection report that is the operation instruction from the second instruction value generating part 108.

The data recording process part 103 performs a data recording (writing) process for recording the vehicle information over the recording period T1 in the first storage 110 when the vehicle event detection part 101 detects the vehicle event (i.e., receives the vehicle event detection report). In the following, as an example, the data recording process part 103 records the vehicle information a plurality of times over the recording period T1 in the first storage 110.

The recording areas in the first storage 110 are determined in advance on a vehicle event type basis, as illustrated in FIG. 6. For example, in the example illustrated in FIG. 6, the recording area "RA" is allocated for the vehicle event type whose vehicle event type ID is "AAA", the recording area "RB" is allocated for the vehicle event type whose vehicle event type ID is "BBB", and so on. The respective recording areas have capacities for recording the vehicle information a plurality of times over the corresponding recording period T1. Ring buffers (not illustrated) are set for the recording areas, respectively. The ring buffers can be implemented by the RAM 12. The ring buffers have length (numbers) for storing the vehicle information to be recorded in the corresponding recording areas, respectively.

The recording areas in the first storage 110 includes areas for storing vehicle event detection number (times) information and areas for storing the vehicle information. The vehicle event detection number information is counter values that are incremented every time the corresponding vehicle event detection reports are received, respectively (see FIG. 10). The counter values are held without being reset from the time of a shipment of the vehicle.

The vehicle information determined in advance to be written is information that represents a state of the vehicle. Here, the term "state of the vehicle" covers a concept that includes a movement state of the vehicle (acceleration, speed, etc., based on sensor values or calculated values), a control state of the vehicle (operation instructions of the control, instruction values of the control, etc.), a traveling state of the vehicle (distance toward the preceding vehicle, a traveling lane, etc., based on the sensor values or calculated values), a operation state of the vehicle (an accelerator pedal operation amount and a brake pedal operation amount based on the sensor values, etc), an environmental state of the vehicle (a room temperature, etc., on the sensor values), an occupant (including the driver) state of the vehicle (image data of the driver captured by an image sensor, for example), etc. Preferably, the state of the vehicle which the vehicle information to be written represents is a kind of a state that is dynamically changed.

Types of the vehicle information to be written are determined in advance on a vehicle event type basis. This is because the types of the vehicle information useful for the analysis may vary according to the type of the vehicle event. In the example illustrated in FIG. 8, the vehicle information to be written is a control signal (control instruction) A for the vehicle event type whose vehicle event type ID is "AAA", the vehicle information to be written is an operation signal B for the vehicle event type whose vehicle event type ID is "BBB", and the vehicle information to be written is a sensor signal C for the vehicle event type whose vehicle event type ID is "CCC". It is noted that two or more types of the vehicle information to be written may be recorded for a certain vehicle event.

Figure 9:
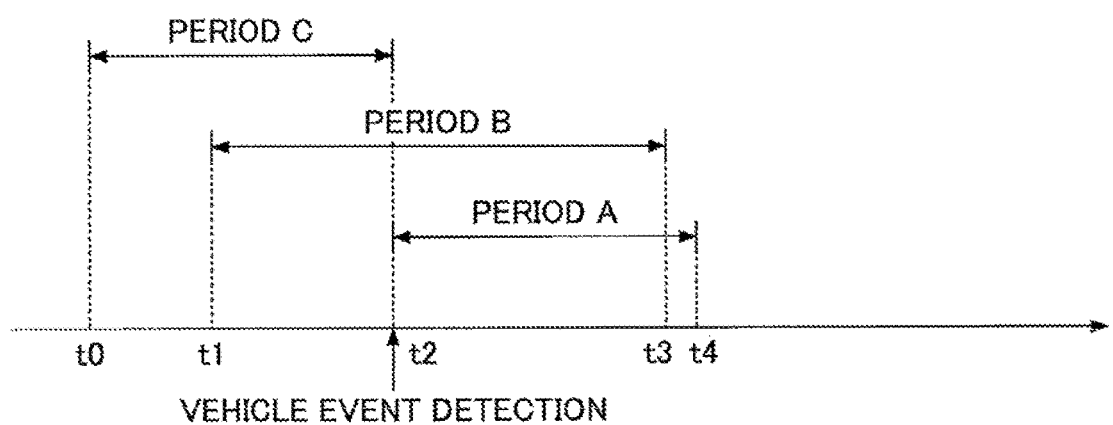
FIG. 9 is a diagram illustrating an example of a writing period for the vehicle information.

The recording period T1 (i.e., the writing period for the vehicle information) represents the length of the period over which the vehicle information is recorded. The recording period T1 is a determined period according to the detection time of the vehicle event. For example, the length and the start timing of the recording period T1 is determined in advance on a vehicle event type basis. This is because the recording periods for the vehicle information useful for the analysis may vary according to the type of the vehicle event. For example, as illustrated in FIG. 9, the recording period T1 may be a period A (t2 through t4) starting from the detection time t2 of the vehicle event, a period C (t0 through t2) ending at the detection time t2 of the vehicle event, or period B (t1 through t3) before and after the detection time t2 of the vehicle event. Alternatively, as a variant of the period A, a period that starts immediately after the detection time t2 of the vehicle event may be used, and as a variant of the period C, a period that ends immediately before the detection time t2 of the vehicle event may be used. The length of the recording period T1 is also determined in advance based on the characteristics of the corresponding vehicle event.

Figure 10:
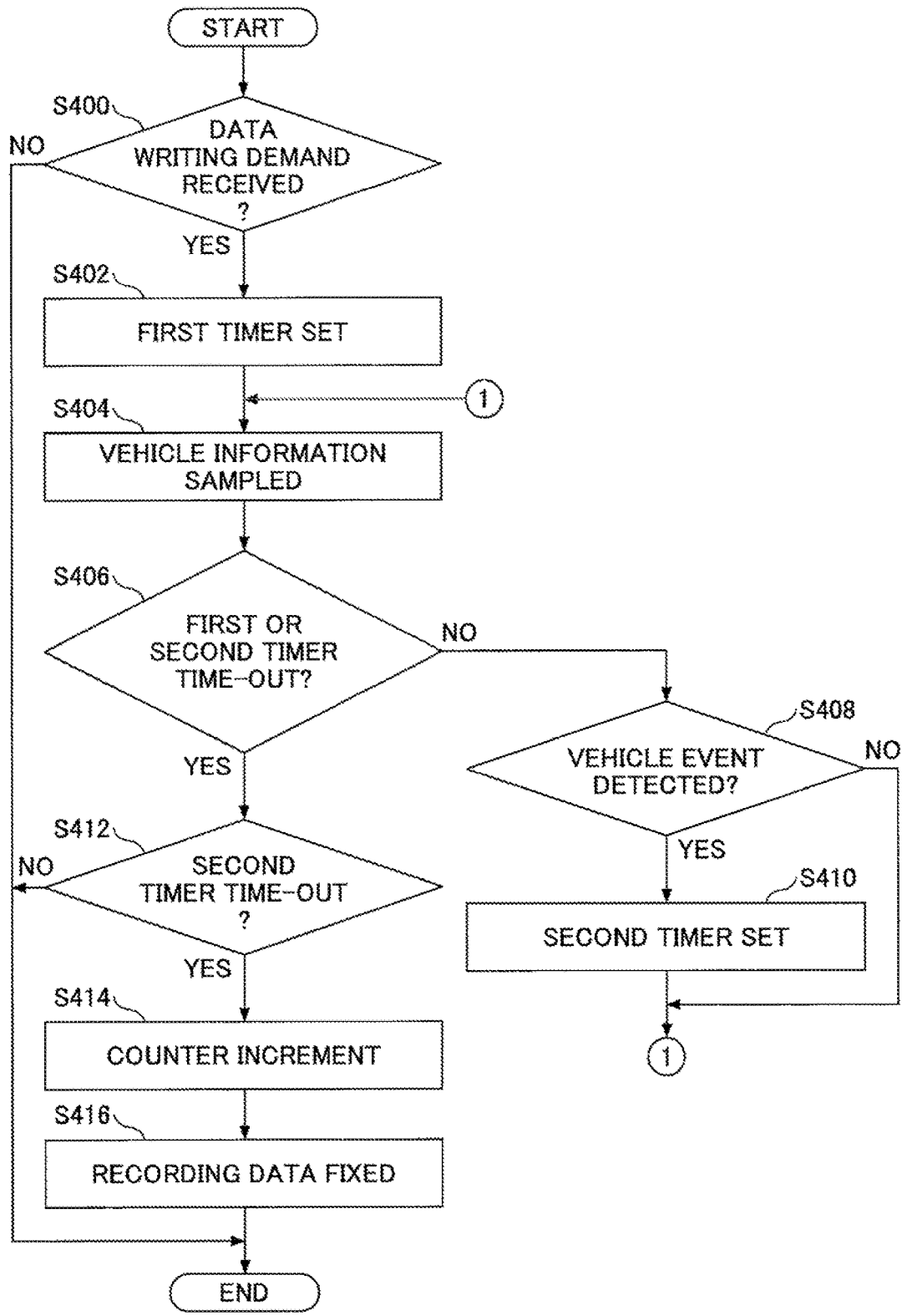
FIG. 10 is a flowchart illustrating an example of a data recording process.

Specifically, the data recording process part 103 performs the data recording process, as illustrated in FIG. 10, for example. According to the first embodiment, as an example, the number of types of the vehicle information to be written is one for each vehicle event. According to the first embodiment, as an example, the recording period T1 corresponds to the period B illustrated in FIG. 9. In FIG. 10, the data recording process part 103 of an arbitrary vehicle event recording process part 100-# of the vehicle event recording process parts 100-1 through 100-L is explained.

At first, the data recording process part 103 sets a first timer (step S402), when the data recording process part 103 receives the data writing demand that is transmitted together with the corresponding vehicle event type ID ("YES" in step S400). The time-out of the first timer occurs upon a lapse of a predetermined period T10. The period T10 is substantially longer than the recording period T1.

Further, the data recording process part 103 starts the data recording process when the data recording process part 103 receives the data writing demand ("YES" in step S400). Specifically, the data recording process part 103 starts the data recording process for recording the vehicle information to be written according to the type of the vehicle event, using the ring buffer related to the recording area associated with the type of the vehicle event (step S404). More specifically, the data recording process part 103 starts to obtain the vehicle information from a particular element of the on-vehicle electronic device group 8 (i.e., the element that generates the vehicle information to be written) via the wired transmission/reception part 25. For example, in the case of the example illustrated in FIG. 3 (in the case of the vehicle event being the operation of the PCS), the data recording process part 103 starts to obtain detection data (an example of the vehicle information) of the forward radar sensor 81-1 via the wired transmission/reception part 25 in response to the data writing demand from the PCS-ECU 80-1. Then, the data recording process part 103 writes the vehicle information sampled periodically in the ring buffer with FIFO (First-In, First-Out). It is noted that the sampling frequency is determined in advance on a vehicle information type basis. The data recording process part 103 continues to write the vehicle information sampled periodically in the ring buffer (step S404) until the time-out ("YES" in step S406) of the first timer (see step S402) or a second timer (see step S410). In this way, the data recording process part 103 writes the vehicle information sampled periodically in the ring buffer, which causes the ring buffer to hold the latest vehicle information of the length (data amount) corresponding to the recording period T1.

When the data recording process part 103 receives the vehicle event detection notice indicating the vehicle event during the sampling and writing period of the vehicle information, the data recording process part 103 sets the second timer (step S410) and continues to sample and write the vehicle information (step S404). The time-out of the second timer occurs upon a lapse of a predetermined period T20. The period T20 is set according to the recording period T1. Specifically, since the recording period T1 corresponds to the period B illustrated in FIG. 9, the period T20 is set as such T20=t3−t2.

The data recording process part 103 increments the counter value that represents the vehicle event detection number (see FIG. 7) by "1" upon the time-out of the second timer ("YES" in step S412) during the sampling and writing period of the vehicle information. Then, the data recording process part 103 ends the sampling and writing of the vehicle information to record (transfer) the vehicle information (i.e., the vehicle information at a plurality of times over the recording period T1) stored in the ring buffer at that timing in the corresponding recording area.

It is noted that, in the example illustrated in FIG. 110, if the recording period T1 corresponds to the period A, the period T20 of the second timer is set as such T20=t4−t2. In this case, the vehicle event detection report functions as the writing demand, and thus the first writing demand generating part 820 and the second writing demand generating part 109 are omitted. Further, in this case, the first timer is omitted, step S402 is replaced with step S410, step S412 is omitted, and if the determination result of step S406 is "NO", the process returns to step S404 (instead of going to step S408). Further, if the recording period T1 corresponds to the period C, the period T20 is equal to 0, in the example illustrated in FIG. 10. In this case, in the example illustrated in FIG. 10, if the determination result of step S408 is "YES", the process directly goes to step S414.

It is noted that there may be a configuration (referred to as "an alternative configuration") in which the data recording process part 103 constantly obtains (periodically samples) the vehicle information to be written (during the period in which the ignition switch is in an ON state) via the wired transmission/reception part 25, regardless of the presence or absence of the data writing demand, and stores the obtained vehicle information in the corresponding ring buffers. According to the alternative configuration, the writing demand becomes unnecessary, and thus the first writing demand generating part 820 and the second writing demand generating part 109 are omitted. Further, according to the alternative configuration, the first timer in FIG. 10 is not necessary, and step S400, step S402, and step S412 become unnecessary.

In the following, data of the vehicle information thus recorded in the first storage 110 is referred to as "vehicle event data".

The first transmission signal transmitting process part 104 performs a first transmission signal transmission process for transmitting the first transmission signal (an example of the transmission signal) when the vehicle event detection part 101 detects the vehicle event. It is noted that the same holds true for the first transmission signal transmitting process part 104 of the vehicle event recording process part 100-L. The first transmission signal transmitting process part 104 includes a first information acquisition part 1041 (an example of a determination purposes information acquisition part) and a first transmission signal transmitting process part 1042.

The first information acquisition part 1041 obtains first information when the vehicle event detection part 101 detects the vehicle event. The first information is information that is included in determination purposes information described hereinafter. Thus, the first information is utilized to determine whether an information acquisition condition described hereinafter is met. The first information includes at least one of timing-based information relevant to the detection timing of the vehicle event; and type information relevant to a type of the vehicle event. The timing-based information relevant to the detection timing of the vehicle event includes information that represents a first item described hereinafter and information that represents a second item described hereinafter. The type information relevant to a type of the vehicle event includes information that represents a third item described hereinafter and information that represents a fourth item described hereinafter.

Here, the information that represents the four items described hereinafter can be used as the first information to determine whether the information acquisition condition described hereinafter is met. It is noted that the term "vehicle event" in the following (1) through (4) means the vehicle event that the vehicle event detection part 101 detects.

(1) a surrounding circumstance of the vehicle at the detection timing of the vehicle event (referred to as "a first item", hereinafter).
(2) a state of the vehicle at the detection timing of the vehicle event (referred to as "a second item", hereinafter).
(3) a type of the vehicle event (referred to as "a third item", hereinafter).
(4) a past detection situation (history) of the same type of the vehicle event (referred to as "a fourth item", hereinafter).

In the following, the information representing the first item is also referred to as "first item information", the information representing the second item is also referred to as "second item information", the information representing the third item is also referred to as "third item information", and the information representing the fourth item is also referred to as "fourth item information".

Here, examples of obtaining (identifying) the first, second, third, and fourth information are explained, respectively.

(1) With respect to the first item information, the first information acquisition part 1041 can identify date/time (i.e., the date/time of the vehicle event) at the detection timing of the vehicle event from the clock 15. Specifically, the first information acquisition part 1041 obtains the time information from the clock 15 when the vehicle event detection part 101 detects the vehicle event. The detection date/time of the vehicle event represents the surrounding circumstance of the vehicle at the detection timing of the vehicle event. For example, the date/time can represent whether the surrounding circumstance of the vehicle at the detection timing of the vehicle event is night or early morning, and the date can also represent seasons such as summer, etc. It is noted that, in the case where there is no clock 15, the first information acquisition part 1041 may obtain the information representing the detection date/time of the vehicle event via the wired transmission/reception part 25 from the element of the on-vehicle electronic device group 8 which has a clock.

Further, the first information acquisition part 1041 can identify the position (i.e., a detection position of the vehicle event) of the vehicle at the detection timing of the vehicle event based on information that can be obtained via the wired transmission/reception part 25 from the element of the on-vehicle electronic device group 8. For example the first information acquisition part 1041 obtains the position information of the vehicle from the GPS receiver when the vehicle event detection part 101 detects the vehicle event. The detection position of the vehicle event represents the surrounding circumstance of the vehicle at the detection timing of the vehicle event. For example, the detection position of the vehicle event can represent whether the surrounding circumstance of the vehicle at the detection timing of the vehicle event is a mountain road or a flat road, and can also represent regions such as a local region, a city region, a cold climate region, a mountain region, etc.

Further, the first information acquisition part 1041 may identify the surrounding circumstance other than the detection date/time and the detection position of the vehicle event based on the information obtained via the wired transmission/reception part 25 from the element of the on-vehicle electronic device group 8. The surrounding circumstance other than the date/time and the position includes a road type (an ordinary road, a highway, an expressway, etc.) at the detection timing of the vehicle event, a road gradient (a hill road, an uneven road) at the detection timing of the vehicle event, other road circumstance (an off-road, a road friction coefficient, a mountain road, crossroads, a curve/straight, an ON/OFF state of a traffic signal in front of the vehicle, traffic amount, etc.) at the detection timing of the vehicle event, features of the detection position of the vehicle event (in a parking area, near convenience store, a distance to a crossing, a distance to a traffic signal, etc.), etc. The information representing such surrounding circumstances (i.e. the first item information other than the detection date/time and the detection position of the vehicle event) may be obtained from the element of the on-vehicle electronic device group 8. Specifically, there may be a case, depending on the configuration of the on-vehicle electronic device group 8, where the first information acquisition part 1041 can obtain the first item information other than the detection date/time and the detection position of the vehicle event from the detection/measurement devices 81 and the ECUs 80 of the on-vehicle electronic device group 8 via the wired transmission/reception part 25. For example, the first information acquisition part 1041 can identify the surrounding circumstance of the vehicle at the detection timing of the vehicle event (other than the detection date/time and the detection position of the vehicle event) based on the sensor values of a rain sensor that detects a rain drop, an luminance sensor that detects the luminance outside of the vehicle, an outside temperature sensor, a gradient sensor (an acceleration sensor) that detects the gradient of the road at the vehicle position, map information from the navigation ECU, etc.

(2) With respect to the second item information, the first information acquisition part 1041 can identify the state of the vehicle at the detection timing of the vehicle event based on the vehicle information that can be obtained from the on-vehicle electronic device group B via the wired transmission/reception part 25. Specifically, the first information acquisition part 1041 can identify the state of the vehicle at the detection timing of the vehicle event by obtaining predetermined vehicle information from the on-vehicle electronic device group 8 when the vehicle event detection part 101 detects the vehicle event.

The term "state of the vehicle" related to the second item covers the same concept as the term "state of the vehicle", which the vehicle information (referred to as "vehicle event data purposes vehicle information", for a distinction therebetween), which forms the vehicle event data described above, represents.

For example, the state of the vehicle related to the second item includes a total travel distance (i.e., an odometer value), the number of ON times of the ignition switch, a lapsed time from the ON event of the ignition switch (a timestamp described hereinafter), a detection values of tire pressures, an accumulated use amount of the on-vehicle battery, SOC (State Of Charge) of the on-vehicle battery, a degradation level of the on-vehicle battery, a gear ratio of a transmission, a brake operation amount (an instantaneous value at the detection timing of the vehicle event or an average value before the detection timing of the vehicle event), an ON/OFF state of a wiper apparatus, an ON/OFF state of a headlight, an ON/OFF state of a hazard apparatus, etc., whether an autonomous driving such as ACC (Adaptive Cruise Control) is being performed, whether a speed limiter such as ASL (Adjustable Speed Limiter) is being performed, etc.

Further, the state of the vehicle related to the second item includes the state of the occupant of the vehicle. The term "state of the occupant" covers a concept that includes the state of the driver, the state of the occupant other than the driver, etc. For example, the state of the occupant includes the gender of the occupant, the age of the occupant (whether the occupant is an elder), the presence or absence of the detection of the driver's looking aside (the presence or absence of the detection timing of the vehicle event or the detection number before the detection timing of the vehicle event), the presence or absence of the detection of the driver's falling asleep (the presence or absence of the detection at the detection timing of the vehicle event or the detection number before the detection timing of the vehicle event), the heart beat interval of the driver (an instantaneous value at the detection timing of the vehicle event or an average value before the detection timing of the vehicle event), the number of the occupants, the presence or absence of the seat belt fastened, the seat position, the state of the reclining seat, etc.

Here, the vehicle information obtained for the second item information (referred to as "first information purposes vehicle information", for a distinction therebetween) has data amount that is substantially smaller than the vehicle information (i.e., the vehicle event data purposes vehicle information) that forms the vehicle event data described above. Specifically, the vehicle event data purposes vehicle information includes vehicle information at a plurality of times (at m time points, for example) over the recording period T1, while the first information purposes vehicle information includes vehicle information (at a single time point, at time points less than m time points, or an average value at m time points) when the vehicle event detection part 101 detects the vehicle event.

The type of the vehicle information obtained for the second item information is predetermined on a vehicle event type basis. It is noted that the first information purposes vehicle information to be obtained for a certain type of the vehicle event may be a part of the vehicle event data purposes vehicle information for the same type of the vehicle event, or may be of a type that is different from the type of the vehicle event data purposes vehicle information.

(3) With respect to the third item information, the first information acquisition parts 1041 of the vehicle event recording process parts 100-1 through 100-L can identify the types of the vehicle events based on the vehicle event type IDs (transmitted together with the vehicle event detection reports from the ECUs 80-#) that can be received via the wired transmission/reception part 25. Specifically, the first information acquisition part 1041 can identify the type of the vehicle event based on the vehicle event type ID which is transmitted together with the vehicle event detection report at the detection time of the vehicle event.

The first information acquisition part 1041 of the vehicle event recording process part 100-L can identify the type of the vehicle event, which is detected by the vehicle event detection part 101, based on the operation instruction from the second instruction value generating part 108. This is because the operation instruction from the second instruction value generating part 108 causes the particular type of the vehicle event, that is to say, the operation of the occupant protection assistance device.

(4) With respect to the fourth item information, the first information acquisition part 1041 can identify the past detection situation of the same type of the vehicle event by referring to the vehicle event detection number information (see FIG. 7) stored in the recording area in the first storage 110. It is noted that the recording areas are set on a vehicle event type basis, as described above (see FIG. 6).

The first transmission signal transmitting part 1042 transmits the first transmission signal to the server 3 via the wireless transmission/reception part 26. According to the first embodiment, the first transmission signal includes vehicle event detection report information that represents the fact that the vehicle event detection part 101 has detected the vehicle event; and the first information obtained by the first information acquisition part 1041. The first transmission signal includes the vehicle event detection report information to have a function (referred to as "a first function", hereinafter) of reporting the detection of the vehicle event to the server 3. Further, the first transmission signal includes the first information to have a function (referred to as "a second function", hereinafter) of giving the server 3 a material (other than the presence or absence of the detection of the vehicle event) that can be used to determine whether the vehicle event data related to the vehicle event detected by the vehicle event detection part 101 need to be uploaded.

The first transmission signal includes the information that represents one or more items, among the first through fourth items, which are associated with the information acquisition condition described hereinafter. Thus, the items of the first through fourth items to be included in the first transmission signal depend on the information acquisition condition. This is described hereinafter in connection with the explanation of the information acquisition condition.

According to the first embodiment, as an example, the first transmission signal transmitting part 1042 generates the first transmission signal including the information illustrated in FIG. 11 and transmits the generated first transmission signal to the server 3. The first transmission signal illustrated in FIG. 11 includes a first transmission signal ID, a vehicle ID, the detection date/time and the detection position of the vehicle event as the first item information, a recording area information as the third item information, the detection number information as the fourth item information (see FIG. 7), and the timestamp.

The first transmission signal ID represents that the transmission signal is a "first transmission signal" (signal type) and thus forms the vehicle event detection report information. Specifically, the first transmission signal ID is information with which the server 3 can identify that the type of the transmission signal is a "first transmission signal". The first transmission signal ID is inserted in a head section of the first transmission signal, for example, and the remaining information is inserted in a data section (payload) of the first transmission signal, for example. It is noted that the vehicle event detection report information may be information (other than the first transmission signal ID) that explicitly represents the detection event of the vehicle event (i.e., the fact that the vehicle event has been detected), for example.

The vehicle ID is generated based on a number (a product number, etc., for example) unique to the wireless transmission/reception part 26, for example. The recording area information is used to identify the recording area of the vehicle event data associated with the first transmission signal, and thus substantially the same as the vehicle event type ID (i.e., the third item information). It is noted that, in the server 3 that receives the first transmission signal, the respective vehicle events can be identified based on the recording area information and the detection number information (i.e., these can be linked). The timestamp is generated based on a value of a timestamp counter that is incremented at every clock of the CPU 11. The timestamp represents the lapsed time from the ON event of the ignition switch, for example. Thus, the timestamp may function as the information related to the state of the vehicle at the detection timing of the vehicle event (i.e., the second item information).

The upload demand reception part 106 receives an upload demand from the server 3. The upload demand reception part 106 receives, via the wireless transmission/reception part 26, the upload demand transmitted from the server 3. The upload demand is a signal from the server 3 that requests the information record ECU 7 to transmit the vehicle event data stored in the first storage 110 to the server 3. The information included in the upload demand (signal) includes an upload demand ID that represents that the transmission signal is an "upload demand" (signal type) and information (designation information) to designate the recording area from which the vehicle event data is read, as illustrated in FIG. 12, for example.

The upload execution part 107 reads the vehicle event data from the first storage 110 to transmit the read vehicle event data to the server 3 when the upload demand reception part 106 receives the upload demand. For example, when the upload demand illustrated in FIG. 12 is received, the upload execution part 107 reads the vehicle event data stored in the designated recording area in the first storage 110 and transmits the read vehicle event data to the server 3 via the wireless transmission/reception part 26. The upload execution part 107 transmits the vehicle event data to the server 3 such that the server 3 can link the vehicle event data uploaded this time with the first transmission signal previously transmitted by the first transmission signal transmitting part 1042. For example, the upload execution part 107 generates upload data that includes information and data illustrated in FIG. 13 and transmits the upload data to the server 3. The upload data illustrated in FIG. 13 includes an upload ID that represents that the transmission signal (transmission data) is "upload data" (signal type), the vehicle ID, the recording area information of the recording area from which the vehicle event data is read, and the detection number information. In this case, in the server 3, the vehicle event data uploaded can be linked with the first transmission signal previously transmitted by the first transmission signal transmitting part 1042 based on the vehicle ID, the recording area information, and the detection number information.

The second instruction value generating part 108 generates an instruction related the predetermined type of the vehicle event, as the first instruction value generating part 810 of the PCS-ECU 80-1. However, the second instruction value generating part 108 generates the instruction related to the vehicle event whose type is different from the types of the vehicle events associated with the ECUs 80-1 through 80-N. According to the first embodiment, the second instruction value generating part 108 performs the control related to the operation of the occupant protection assistance device, as described above. For example, the second instruction value generating part 108 inputs the operation instruction (an example of an instruction) to the occupant protection assistance device when the second instruction value generating part 108 detects a front collision of the vehicle based on the information obtained via the wired transmission/reception part 25 (the information from the acceleration sensor 81-N provided on the front portion of the vehicle, for example).

The second writing demand generating part 109 inputs the writing demand to the data recording process part 103 when a predetermined writing condition related to the operation of the occupant protection assistance device is met. According to the first embodiment, as an example, the second instruction value generating part 108 inputs the writing demand to the data recording process part 103 when the second instruction value generating part 108 receives the vehicle event detection report (i.e., the PCS operation report) from the PCS-ECU 80-1.

In this case, the data recording process part 103 of the vehicle event recording process part 100-L performs the data recording (writing) process in response to the data writing demand from the second writing demand generating part 109, as is the case with the data writing demand from the first writing demand generating part 820. Specifically, the data recording process part 103 records the vehicle information over the recording period T1 related to the operation of the occupant protection assistance device in the first storage 110. According to the first embodiment, as an example, the recording period T1 related to the operation of the occupant protection assistance device is longer than a predetermined threshold Th1 (i.e., a PCS operation threshold), and the vehicle information to be recorded with respect to the operation of the occupant protection assistance device includes detection data of the forward radar sensor 81-1, vehicle speed data, and acceleration data. In this case, the data recording process part 103 obtains the vehicle information such as the detection data of the forward radar sensor 81-1, the vehicle speed data, etc., in response to the writing demand from the second instruction value generating part 108, and records (protects) the vehicle information at a plurality of times over the recording period T1 in the first storage 110 as the vehicle event data.

It is noted that, in the example illustrated in FIG. 5, the information record ECU 7 includes the second instruction value generating part 108 and the second writing demand generating part 109. Thus, when the instruction generated by the second instruction value generating part 108 forms the vehicle information to be written (i.e., the vehicle event data), the second instruction value generating part 108 forms an example of the vehicle information generating part.

Figure 14:
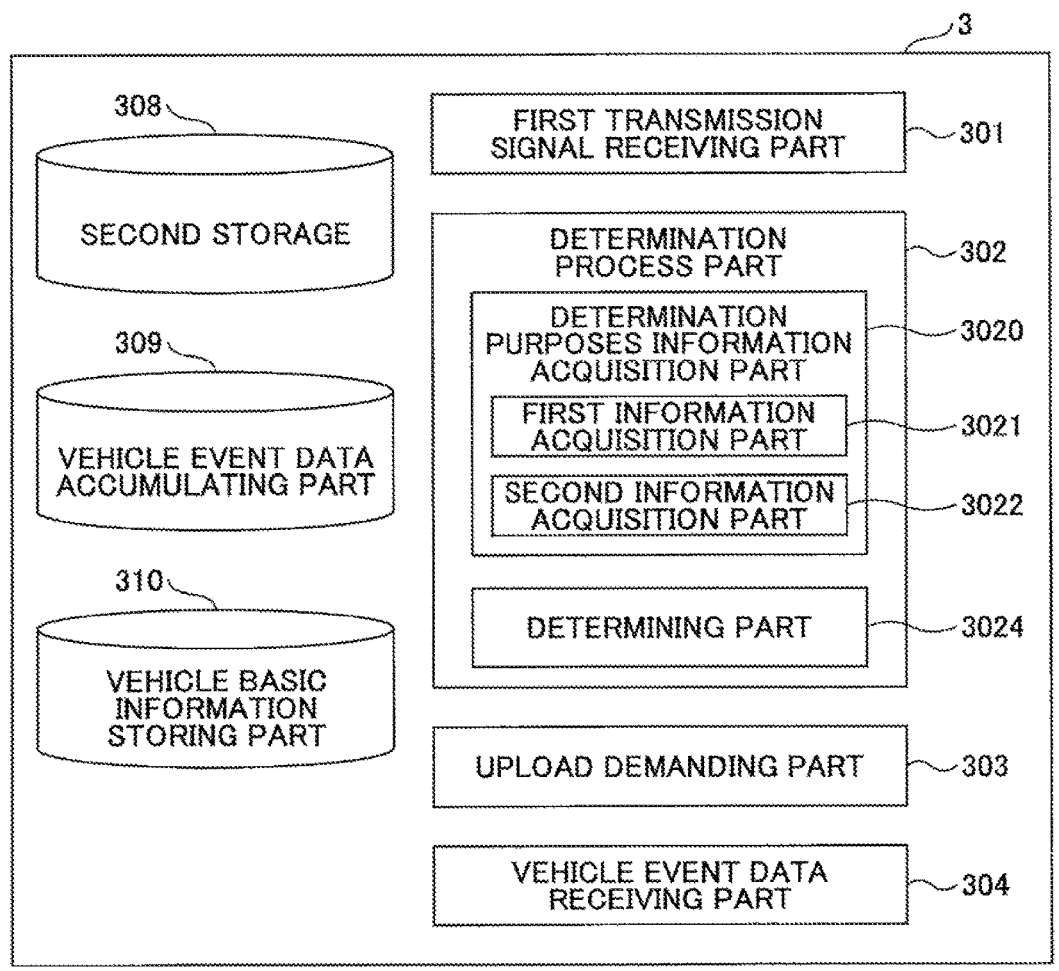
FIG. 14 is a functional block diagram of a server.

Next, with reference to FIG. 14, a function of the server 3 is described. The hardware configuration of the server 3 is not illustrated. A basic hardware configuration (architecture) of the server 3 is the same as that of the information record ECU 7 illustrated in FIG. 2 except that the processing capability and the storage capacity are enhanced.

FIG. 14 is a functional block diagram of the server 3.

The server 3 includes a first transmission signal receiving part 301, a determination process part 302, an upload demanding part 303, a vehicle event data receiving part 304, a second storage 308, a vehicle event data accumulating part 309, and a vehicle basic information storing part 310. The parts 301 through 304 may be implemented by the CPU executing one or more programs in the ROM, respectively. The second storage 308 is a storage of the server 3 which can be implemented by an auxiliary storage apparatus (EE- PROM, HOD, for example). The vehicle event data accumulating part 309 and the vehicle basic information storing part 310 can be implemented by an auxiliary storage apparatus (HOD, for example).

The first transmission signal receiving part 301 receives the first transmission signal transmitted from the information record ECU 7 (the first transmission signal transmitting process part 104). Specifically, the first transmission signal receiving part 301 receives the first transmission signal (FIG. 11). Particular information included in the first transmission signal received by the first transmission signal receiving part 301 is stored in the vehicle event data accumulating part 309. According to the first embodiment, the particular information includes the information that represents the detection date/time and the detection position of the vehicle event, and is merely referred to as "vehicle event detection date/time/position information", hereinafter.

The determination process part 302 includes a determination purposes information acquisition part 3020 and a determining part 3024.

The determination purposes information acquisition part 3020 obtains the determination purposes information. The determination purposes information is used to determine whether the information acquisition condition is met. According to the first embodiment, the determination purposes information includes the first information. Further, in the first embodiment, such a case is also assumed where the determination purposes information optionally includes second information in addition to the first information. The first information is described above. The second information is described hereinafter.

The determination purposes information acquisition part 3020 includes a first information acquisition part 3021 and a second information acquisition part 3022.

The first information acquisition part 3021 obtains the first information. According to the first embodiment, the first information acquisition part 3021 obtains the first information from the first transmission signal received by the first transmission signal receiving part 301. Thus, according to the first embodiment, the first information obtained by the first information acquisition part 3021 is the same as the first information obtained by the first information acquisition part 1041.

The second information acquisition part 3022 obtains the second information. The second information acquisition part 3022 obtains the second information when the second information is included in the determination purposes information. The second information includes information related to a vehicle configuration that has influence on the vehicle event. The expression "vehicle configuration that has influence on the vehicle event" covers a concept that includes a vehicle configuration that has influence on the presence or absence of the vehicle event, a vehicle configuration that has influence on a frequency of the vehicle event, a vehicle configuration that has influence on a manner of the vehicle event, etc.

The information related to a vehicle configuration that has influence on the vehicle event includes a vehicle name or a model name of the vehicle, equipment or specification of the vehicle (a brake mechanism, a power train mechanism, a control algorithm, etc.), a vehicle type (SUV: Sports Utility Vehicle, sedan, minivan, sport, coupe, light car, etc.), a size of the vehicle, a weight of the vehicle, a height of the vehicle, a gravity center position of the vehicle, etc., for example. For example, the equipment or specification basically has influence on the vehicle event. The weight, the height, and the gravity center position of the vehicle may have influence on the vehicle event, depending on the type of the vehicle event to be detected. For example, the type of the vehicle event to be detected is "rollover event" or "the vehicle's being about to rollover but returning to its neutral state without rollover (merely referred to as "rollover narrowly escaped event", hereinafter)", such a vehicle event is influenced by the height and the gravity center position of the vehicle. Further, for example, if the equipment unique to the particular vehicle type such as SUV has influence on the particular type of the vehicle event, the information representing the vehicle type becomes the information related to a vehicle configuration that has influence on the vehicle event. The vehicle name or the vehicle model name of the vehicle can be used to identify the equipment, the vehicle type, the weight, etc., of the vehicle, and thus may become the information related to a vehicle configuration that has influence on the vehicle event. It is noted that, if the number of the vehicles with the vehicle name of the vehicle on which the on-vehicle device 2 is installed is 1, information representing a manufacturing period, a destination, a content of a maker option, a version name, a package name, etc., may become the information related to a vehicle configuration that has influence on the vehicle event. On the other hand, if the number of the vehicle name of the vehicle on which the on-vehicle device 2 is installed is two or more, the information representing the manufacturing period, etc., can be used as auxiliary information for the information representing the vehicle name, for example, that is to say, auxiliary information for identifying the vehicle configuration in detail (with high accuracy). The second information acquisition part 3022 can obtain the second information from the vehicle basic information storing part 310 described hereinafter.

The determining part 3024 reads the information acquisition condition from the second storage 308 to determine whether the information acquisition condition is met based on the determination purposes information obtained by the determination purposes information acquisition part 3020, when the first transmission signal receiving part 301 receives the first transmission signal.

The information acquisition condition has a function of selecting the vehicle events, among a number of the vehicle events, whose vehicle event data is to be uploaded to the server 3.

The information acquisition condition is predetermined such that the information acquisition condition is determined based on the determination purposes information. In other words, the determination purposes information is determined depending on the information acquisition condition. For example, the information acquisition condition is predetermined to be determined based on the first and second information, the determination purposes information includes the first and second information. On the other hand, the information acquisition condition is predetermined to be determined based on only the first information, among the first and second information, the determination purposes information includes the only the first information, among the first and second information. According to the first embodiment, the information acquisition condition is predetermined to be determined based on at least the first information of the first and second information. Specifically, the information acquisition condition is predetermined to be determined based on at least one of the timing-based information relevant to the detection timing of the vehicle event and the type information relevant to the type of the vehicle event.

It is noted that the timing-based information relevant to the detection timing of the vehicle event and the type information relevant to the type of the vehicle event include the first through fourth item information described above, for example. Thus, if the information acquisition condition is predetermined to be determined based on the timing-based information relevant to the detection timing of the vehicle event, the information acquisition condition is predetermined to be associated with at least one of the surrounding circumstance of the vehicle at the detection timing of the vehicle event (i.e., the first item) and the state of the vehicle at the detection timing of the vehicle event (i.e., the second item). Further, if the information acquisition condition is predetermined to be determined based on the type information relevant to the type of the vehicle event, the information acquisition condition is predetermined to be associated with at least one of the type of the vehicle event (i.e., the third item) and the past detection situation of the same type of the vehicle event (i.e., the fourth item). Concrete examples of the information acquisition condition are described hereinafter.

The determination process part 302 sets an information acquisition condition met flag to "1" when determination process part 302 has determined that the information acquisition condition is met. An initial value of the information acquisition condition met flag is "0". On the other hand, the determination process part 302 keeps an information acquisition condition met flag at "0" when determination process part 302 has determined that the information acquisition condition is not met.

The upload demanding part 303 transmits the upload demand to the information record ECU 7, when the determination process part 302 has determined that the information acquisition condition is met (i.e., when the information acquisition condition met flag is "1"). The upload demand is generated such that the information record ECU 7 can identify the vehicle event data to be uploaded (i.e., which vehicle event of the first transmission signal is related to the upload demand). For example, the upload demand includes the information that designates the recording area of the vehicle event data in the first storage 110 (see FIG. 12). It is noted that the upload demanding part 303 can identify the recording area of the vehicle event data to be uploaded, based on the recording area information included in the first transmission signal (FIG. 11), for example.

The vehicle event data receiving part 304 receives the vehicle event data transmitted from the information record ECU 7 (the upload execution part 107). The vehicle event data receiving part 304 stores the received vehicle event data in the vehicle event data accumulating part 309. At that time, the vehicle event data receiving part 304 stores the received vehicle event data, together with the vehicle event detection date/time/position information included in the first transmission signal received by the first transmission signal receiving part 301, in the vehicle event data accumulating part 309. It is noted that the linking between the vehicle event data and the vehicle event detection date/time/position information included in the first transmission signal can be implemented based on the information (the vehicle ID, the recording area information, and the detection number information) commonly included in the first transmission signal and the upload data, as described above.

The second storage 308 stores the information acquisition condition. The information acquisition condition can be stored in the second storage 308 in a form of a program that defines the information acquisition condition, for example.

The vehicle event data accumulating part 309 accumulates the vehicle event data received by the vehicle event data receiving part 304. For example, the vehicle event data is accumulated together with the vehicle ID, the vehicle event detection date/time/position information, etc., as illustrated in FIG. 15. In the example illustrated in FIG. 15, the vehicle event data is given an ID (data ID) on a vehicle event basis. It is noted that, in FIG. 15, "##" means that there is some data. Further, the accumulated data of the vehicle event data illustrated in FIG. 15 exists on a vehicle event type basis.

The vehicle basic information storing part 310 stores various information related to the vehicle (referred to as "vehicle basic information", hereinafter), as illustrated in FIG. 16, for example. The vehicle basic information includes data recording specification information of the vehicle (generation information related to the vehicle event recording function, a conversion way of the vehicle event data, etc.), other specification information (specification related to the configuration of the vehicle), the shipment information of the vehicle, the repair/accident history of the vehicle, a line-off period of the vehicle, the vehicle name, a dealer of the vehicle, a history of the owners of the vehicle, a main user information of the vehicle, etc., for example. Further, other specification information (specification related to the configuration of the vehicle) includes a content of the maker option, a type and a piston displacement of the engine such as a diesel engine, a type of a transmission, whether the vehicle is a hybrid car, whether the vehicle is an electric car, etc., for example. Further, the vehicle basic information may include information representing the occupants of the vehicle. The information representing the occupants of the vehicle may include a composition of family, driving technique, driving experience/grade (good, etc.), an ordinary use region where the vehicle is usually used, a position (i.e., an address) of a garage, driving characteristics (a tendency of pressing down the accelerator pedal and the brake pedal simultaneously, for example), a preference of the driving (an economical driving preferred, a sport mode preferred, etc.), etc., for example. These items of the information are not dynamically changed, and thus the server 3 requests the on-vehicle device 2 to transmit the vehicle basic information, as is the case with the upload demand described above, at the time of the first communication with the on-vehicle device 2, for example. In response to the request, the on-vehicle device 2 reads the vehicle basic information to upload it to the server 3. Then, the server 3 accumulates the vehicle basic information uploaded from the on-vehicle device 2 in the vehicle basic information storing part 310 such that the vehicle basic information is linked with the vehicle ID. Alternatively, the information in the vehicle basic information storing part 310 may be generated or added based on information available via another route (other than the upload from the on-vehicle device 2) from the user, the dealer, or the maker of the vehicle. Further, the information related to various items in the vehicle basic information storing part 310 is updated on a regular basis, if necessary. It is noted that, in the example illustrated in FIG. 16, the vehicle basic information includes information representing the data recording specification, the vehicle specification, and the dealer. It is noted that, in FIG. 16, "##" means that there is some data.

Figure 17:
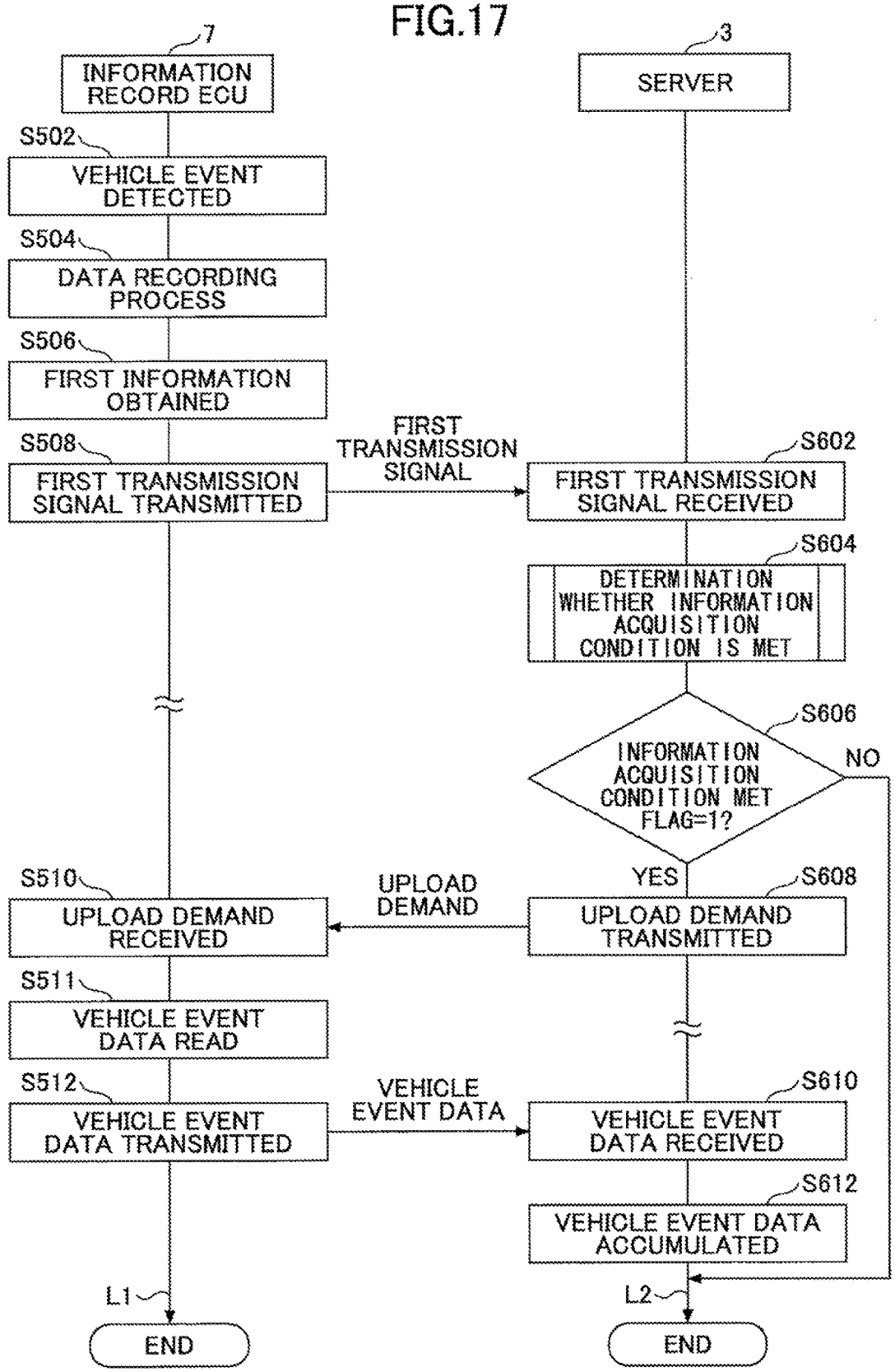
FIG. 17 is a flowchart schematically illustrating an example of a relationship between a process of an on-vehicle device and a process of the server.

Next, with reference to FIG. 17, an example of an operation of the information collection system 1 is described.

FIG. 17 is a flowchart schematically illustrating an example of a relationship between the process of the information record ECU 7 and the process of the server 3.

In FIG. 17, lines L1 and L2 are time axes extending downwardly from the information record ECU and the server 3, respectively. The down direction corresponds to the direction in which time goes. Omission marks in the lines L1 and L2 indicate separation in time with respect to a series of processes. It is noted that the series of processes are not necessarily performed simultaneously. For example, there may be a substantial time difference between the process timing of step S510 and the process timing of step S511. Further, the time axes of the lines L1 and L2 are schematic to illustrate the order of the processes in time. For example, although the lines L1 and L2 have "end" on the same location, this does not means that the processes of the information record ECU 7 and the processes of the server 3 end simultaneously. Further, although the main process goes to the same "end" in the case where the determination result in step S606 on the line L2 is "NO" and in the case where the process of step S612 is interposed, this does not means that the timings of ending these processes are simultaneous. Specifically, if the determination result in step S606 is "NO", the main process ends directly; however, if the determination result in step S606 is "YES", the main process ends when the process of step S612 ends.

In the example illustrated in FIG. 17, the vehicle event detection part 101 of the information record ECU 7 of the on-vehicle device 2 detects the vehicle event whose type is to be detected (step S502). The data recording process part 103 of the information record ECU 7 performs the data recording (writing) process (step S504) when the vehicle event detection part 101 detects the vehicle event. Further, the first transmission signal transmitting process part 104 of the information record ECU 7 obtains the first information (step S506), and the first transmission signal transmitting part 1042 of the first transmission signal transmitting process part 104 transmits the first transmission signal to the server 3 (step S508), when the vehicle event detection part 101 detects the vehicle event. The first transmission signal thus transmitted is received by the first transmission signal receiving part 301 of the server 3 (step S602).

When the first transmission signal receiving part 301 of the server 3 receives the first transmission signal (step S602), the determination process part 302 of the server 3 reads the information acquisition condition from the second storage 308 to perform a determining process whether the information acquisition condition is met based on the determination purposes information obtained by the determination purposes information acquisition part 3020 (step S604). An example of the determining process whether the information acquisition condition is met is described hereinafter. As the result of the determining process whether the information acquisition condition is met, if the information acquisition condition met flag is "1" ("YES" in step S606), the upload demanding part 303 transmits the upload demand to the information record ECU 7 (step S608). The upload demand thus transmitted is received by the upload demand reception part 106 of the information record ECU 7 (step S510). On the other hand, as the result of the determining process whether the information acquisition condition is met, if the information acquisition condition met flag is not "1" ("NO" in step S606), the upload demanding part 303 does not transmit the upload demand to the information record ECU 7. In this case, the server 3 ends the process related to the first transmission signal received this time to be in a waiting state for a new first transmission signal. Specifically, in this case, the upload demanding part 303 does not demand the upload of the vehicle event data related to the first transmission signal received this time, and thus the vehicle event data is not accumulated in the vehicle event data accumulating part 309.

When the upload demand reception part 106 of the information record ECU 7 receives the upload demand (step S510), the upload execution part 107 reads the vehicle event data from the first storage 110 (step S511), and transmits the read vehicle event data to the server 3 (step S512). In this way, the vehicle event data is uploaded to the server 3.

When the vehicle event data receiving part 304 of the server 3 receives the vehicle event data (step S610), the vehicle event data receiving part 304 stores (accumulates) the vehicle event data in the vehicle event data accumulating part 309 (step S612).

According to the first embodiment illustrated in FIG. 1 through FIG. 17, the following effects can be obtained.

According to the first embodiment, as described above, when the vehicle event detection part 101 detects the vehicle event whose type is to be detected, the vehicle event data of the vehicle event is not always uploaded to the server 3, but instead the first transmission signal is transmitted to the server 3 at first. Then, in the server 3, whether the information acquisition condition is met is determined, and if it is determined by the determination process part 302 that the information acquisition condition is met, the vehicle event data is uploaded to the server 3. Thus, according to the first embodiment, because the vehicle event data is uploaded to the server 3 when the information acquisition condition is met, it becomes possible to reduce the communication load of the information collection system 1 as a whole, in comparison with a configuration where the vehicle event data is always uploaded to the server 3 whenever the vehicle event is detected. For example, according to the first embodiment, with respect to the vehicle event which causes to generate the first transmission signal for which the information acquisition condition is not met, only the first transmission signal is transmitted to the server 3, and the vehicle event data is not uploaded to the server 3, which means that the communication load can be reduced in comparison with the case where the first transmission signal and the vehicle event data of the vehicle event are uploaded to the server 3.

Further, according to the first embodiment, the information acquisition condition is predetermined to be determined based on the determination purposes information that includes at least one of the timing-based information relevant to the detection timing of the vehicle event and the type information relevant to a type of the vehicle event, or the determination purposes information that further includes the information relevant to the vehicle configuration that has influence on the vehicle event.

Here, with respect to a certain vehicle event, whether the vehicle event data thereof is useful for the analysis often depends on the surrounding circumstance of the vehicle at the detection timing of the vehicle event. For example, if the vehicle event is "ABS operation", operations in a rain environment are its ordinarily predicted operations of ABS, and thus there may be a case where the vehicle event data of the operations of ABS in a rain environment is not useful. On the other hand, in the case of the operation of ABS in a sunny environment, there is a high probability that the operation of ABS is involved in an emergency braking operation to escape an accident, and thus the vehicle event data thereof may be useful.

Further with respect to a certain vehicle event, whether the vehicle event data thereof is useful for the analysis often depends on the state of the vehicle at the detection timing of the vehicle event. For example, with respect to the vehicle event "operation of PCS warning", the vehicle event data in the case where the driver is not looking aside nor falling asleep is more useful than the vehicle event data in the case where the driver is looking aside or falling asleep. This is because the operation of the PCS warning in the case where the driver is looking aside or falling asleep is its ordinarily predicted operation.

Further with respect to a certain vehicle event, whether the vehicle event data thereof is useful for the analysis often depends on the type of the vehicle event. This is because there may be a case where the vehicle event data with respect to some types of the vehicle events is useful for the analysis while the vehicle event data with respect to other types of the vehicle events is not useful for the analysis. For example, with respect to the vehicle event "PCS operation", the frequency of the vehicle event "PCS operation" is substantially less than the other type of the vehicle event "sudden braking operation". For this reason, with respect to the vehicle event "PCS operation", the vehicle event data may be always useful, regardless of the environment in which the vehicle event is detected. On the other hand, with respect to "sudden braking operation", if the vehicle event data related to the vehicle event "PCS operation" or "emergency braking operation" can be obtained, the vehicle event data related to "sudden braking operation" may not be useful.

Further with respect to a certain vehicle event, whether the vehicle event data thereof is useful for the analysis often depends on the past detection situation of the same type of the vehicle event. With respect to the vehicle event "ABS operation", since the vehicle event is detected with a high frequency, there may be a case where the vehicle event data becomes useful only if the number of the detections of the vehicle event is greater than a predictable value or only if the vehicle event is detected with higher frequency than a predicted value.

Further with respect to a certain vehicle event, whether the vehicle event data thereof is useful for the analysis often depends on the configuration of the vehicle that causes the vehicle event. For example, with respect to the vehicle event "rollover narrowly escaped event" or "rollover event", the usefulness of the vehicle event data may differ depending on the configuration of the vehicle. For example, the usefulness of the vehicle event data may differ between the case where the vehicle type is SUV with a higher height or sedan with an ordinary height. Further, for example, with respect to the vehicle event "PCS operation", the usefulness of the vehicle event data thereof may differ depending on the specification of the vehicle. For example, the usefulness of the vehicle event data may differ between the case where there is only a forward monitoring radar sensor, the case where there is only a forward monitoring image sensor, and the case where there are the forward monitoring radar sensor and image sensor.

With respect to this point, according to the first embodiment, since the information acquisition condition is predetermined to be determined based on the determination purposes information described above, the probability that the server 3 can obtain only the vehicle event data useful for the analyst can be increased, which can increase analysis efficiency of the vehicle events.

Further, according to the first embodiment, the information acquisition condition is stored in the second storage 308 in the server 3. Thus, according to the first embodiment, the information acquisition condition can be collectively managed in the server 3, it becomes possible to more feely change the information acquisition condition afterward, in comparison with the case where the information acquisition condition is given in the respective vehicles. For example, even the vehicle event whose vehicle event data was believed to be always useful for the analysis may be reconsidered afterward such that the vehicle event data thereof is useful only when the vehicle event is detected in a particular circumstance. Alternatively, reversely, even the vehicle event whose vehicle event data was believed to be always useless for the analysis may be reconsidered afterward such that the vehicle event data thereof is useful only when the vehicle event is detected in a particular circumstance. In such a case, by rewriting the information acquisition condition (the program defining the information acquisition condition, for example) stored in the second storage 308 of the server 3, the information acquisition condition can be easily changed based on such an afterward reappraisal.

Further, according to the first embodiment, the determination purposes information includes the first information which in turn includes at least one of the timing-based information relevant to the detection timing of the vehicle event and the type information relevant to the type of the vehicle event. The first information may be changed during the travel of the vehicle or whenever the vehicle system is initiated. Thus, it is difficult for the server 3 to obtain such information from an information resource other than the vehicle. With respect to this point, according to the first embodiment, the determination purposes information acquisition part 3020 of the server 3 can obtain the first information included in the determination purposes information from the first transmission signal. Because the server 3 obtains the first information from the on-vehicle device 2, the server 3 can determine whether the information acquisition condition is met based on the first information whose accuracy is relatively high. As a result of this, the probability that the server 3 can obtain only the vehicle event data useful for the analyst can be further increased, which can further increase analysis efficiency of the vehicle events.

Further, according to the first embodiment, the vehicle event detection date/time/position information included in the first transmission signal is accumulated in the vehicle event data accumulating part 309 such that the vehicle event detection date/time/position information is associated with the vehicle event data, the vehicle event detection date/time/position information can be effectively used at the time of the analysis of the vehicle event data, which can further increase analysis efficiency of the vehicle events. For example, multidimensional perspective analyses such as how the surrounding circumstance of the vehicle affects the vehicle event (the vehicle event "PCS operation", for example), which surrounding circumstance tends to induce the vehicle event, etc., becomes possible.

Next, some examples of the information acquisition condition are explained together with examples of the determining process of the determination process part 302.

In the examples of the information acquisition condition, unless otherwise specified, it is assumed that the information acquisition condition is predetermined to be associated with one or more of (1) the surrounding circumstance of the vehicle at the detection timing of the vehicle event (i.e., the first item), (2) the state of the vehicle at the detection timing of the vehicle event (i.e., the second item), (3) the type of the vehicle event (i.e., the third item), and (4) the past detection situation of the same type of the vehicle event (i.e., the fourth item).

In this case, which of the first through fourth items the information included in the first transmission signal should represent is dependent on which of first through fourth items the information acquisition condition is associated with. Specifically, the first transmission signal may only include at least the information representing the item with which the information acquisition condition is associated. For example, if the information acquisition condition is associated with the first item of the first through fourth items, the first transmission signal may only include at least the first item information. For example, if the information acquisition condition is associated with the first and fourth items of the first through fourth items, the first transmission signal may only include at least the first item information and the fourth item information.

[First Example of Information Acquisition Condition]

FIG. 18 is a diagram illustrating an example of the information acquisition condition.

The information acquisition condition is predetermined in a form of a logic expression such as "AND", "OR", etc., of condition elements related to the first through fourth items. In the example illustrated in FIG. 18, the information acquisition condition is met in the case (1) where a condition element A0 is met, the case (2) where a condition element A1 is met, the case (3) where condition elements A2 and A3 are met, the case (4) where condition elements A4 through A6 are met, etc. In this case, for example, the condition element A0 is predetermined to be associated with the third item, such as the vehicle event being of a particular type, for example. The condition element A1 is predetermined to be associated with the second item, such as the driver at the time of the detection of the vehicle event being an elder, for example. Further, the condition element A2 is predetermined to be associated with the first item, such as the surrounding circumstance being other than a highway, for example, and condition element A3 is predetermined to be associated with the second item like the condition element A1. Further, the condition element A4 is predetermined to be associated with the third item like the condition element A0. Further, the condition element A5 is predetermined to be associated with the first item like the condition element A2. Further, the condition element A6 is predetermined to be associated with the fourth item, such as the (past) detection number being greater than or equal to a threshold, for example.

In this way, the information acquisition condition can be predetermined in a form of a logic expression such as "AND", "OR", etc., of condition elements related to the first through fourth items, based on the characteristics of the vehicle event of the type to be detected, which increases the degree of freedom in defining the information acquisition condition. As a result of this, the probability that the server 3 can obtain the vehicle event data that the analyst thinks useful for the analysis is increased.

It is noted that, in the example illustrated in FIG. 18, the information acquisition condition is predetermined in a form of a logic expression such as "AND", "OR", etc., of condition elements related to the first through fourth items; however, one or more condition element related to other items may be added to predetermine the information acquisition condition in a form of a logic expression. Other items includes an item such as a dealer of the vehicle, and various items related to the vehicle basic information (described above) stored in the vehicle basic information storing part 310 may be used.

[Second Through Fifth Examples of Information Acquisition Condition]

Next, other examples (second through fifth examples) of the information acquisition condition are explained.

According to the following second through fifth examples, as an example, the information acquisition condition includes at least one of a condition element (referred to as "a first acquisition condition", hereinafter) associated with the surrounding circumstance (i.e., the first item) and a condition element (referred to as "a second acquisition condition", hereinafter) associated with only the type of the vehicle event (i.e., the third item).

Further, according to the following second through fifth examples, as an example, the first acquisition condition and the second acquisition condition each represent the condition to be met to meet the information acquisition condition. For example, there is no condition element (i.e., a prevention condition) which causes the information acquisition condition not to be met if the condition element is met, and instead such a prevention condition is defined in an "inverse" form. For example, in the case where the information acquisition condition is not met due to the surrounding circumstance being rainy, the first acquisition condition is "the surrounding circumstance not being rainy".

Here, when there is only one type of the vehicle event to be detected, the information acquisition condition does not include the second acquisition condition. However, even when there are two or more types of the vehicle events to be detected, the information acquisition condition may not include the second acquisition condition, if these types of the vehicle events have the similar characteristics, for example. Further, when there are two or more types of the vehicle events to be detected, the first acquisition conditions are defined on a vehicle event type basis. However, even when there are two or more types of the vehicle events to be detected, the first acquisition conditions may be defined in the same manner for respective types of the vehicle events, if these types of the vehicle events have the similar characteristics, for example.

Further, when there are two or more types of the vehicle events to be detected, the information acquisition condition may not include the first acquisition condition. Further, when there are two or more types of the vehicle events to be detected, the information acquisition condition may include the first and second acquisition conditions. In this case, for example, with respect to the vehicle event of the type for which the second acquisition condition is not met, the first acquisition conditions are defined on a vehicle event type basis (see FIG. 25).

It is assumed here that the information acquisition condition is predetermined to be associated with at least one of the first and third items. Thus, three patterns are assumed, that is to say, a first pattern in which the first transmission signal includes only the first item information of the first and third item information, a second pattern in which the first transmission signal includes only the third item information of the first and third item information, and a third pattern in which the first transmission signal includes the first and third item information. The pattern to be used is dependent on the information acquisition condition.

For example, when the information acquisition condition includes only the first acquisition condition of the first and second acquisition conditions, the first pattern is used. Further, when the information acquisition condition includes only the second acquisition condition of the first and second acquisition conditions, the second pattern is used. However, even in these two cases, it is desirable to use the third pattern in order to increase the degree of freedom for an afterward change in the information acquisition condition stored in the second storage 308. Further, when the information acquisition condition includes the first and second acquisition conditions, the third pattern is used.

[Second Example of Information Acquisition Condition]

FIG. 19 is a diagram illustrating an example of the information acquisition condition including the first acquisition condition. In FIG. 19, a mark "o" indicates that the information acquisition condition is met (this holds true in FIG. 21, etc.). The information acquisition condition illustrated in FIG. 19 is met when the first acquisition condition is met. Further, the example illustrated in FIG. 19, the first acquisition condition is met when the surrounding circumstance is a specified season A or the surrounding circumstance is a specified position B. It is noted that the position B represents a region.

The first acquisition condition illustrated in FIG. 19 is suited for the case where there is only one type of the vehicle event to be detected, the case where there are two or more types of the vehicle events to be detected but all the types of the vehicle events have the same characteristics, etc.

FIG. 20 is a flowchart illustrating an example of the process of the determination process part 302 in the case where the information acquisition condition illustrated in FIG. 19 is used. Specifically, FIG. 20 illustrates an example of the process of step S604 in FIG. 17.

It is noted that the information acquisition condition illustrated in FIG. 19 includes the first acquisition condition, and thus, FIG. 20 is explained based on a premise that the first transmission signal includes only the first item information (i.e., the first pattern) or the first and third item information (i.e., the third pattern).

Further, the first acquisition condition illustrated in FIG. 19 is defined in association with the detection date/time (season) and the detection position of the vehicle event, respectively, and thus, FIG. 20 is explained based on a premise that the first item information includes the information representing the detection date/time of the vehicle event and the information representing the detection position of the vehicle event without including other information. Specifically, FIG. 20 is explained based on a premise that the first item information does not include such information that directly represents the surrounding circumstance of the vehicle at the detection timing of the vehicle event, such as climate information at the detection timing and at the position of the vehicle event. Such a configuration is advantageous in that the information amount of the first item information is reduced, the processing load of the first information acquisition part 1041 is reduced, and requirements for the detection/measurement devices 81 to be included in the on-vehicle electronic device group 8 is reduced (requirements are reduced such that the on-vehicle electronic device group 8 may only include the GPS receiver, for example).

In step S900, the first information acquisition part 3021 of the determination purposes information acquisition part 3020 of the determination process part 302 obtains the first item information (i.e., the information representing the surrounding circumstance of the vehicle at the detection timing of the vehicle event) from the first transmission signal. Specifically, the first information acquisition part 3021 obtains the first information from the first transmission signal.

In step S902, the determining part 3024 of the determination process part 302 determines whether the information acquisition condition (the first acquisition condition) illustrated in FIG. 19 is met based on the surrounding circumstance the first information obtained in step S900 represents. Specifically, the determination process part 302 determines that the first acquisition condition is met if the surrounding circumstance the first information obtained in step S900 represents is the specified season A or position B. In this case, the process goes to step S904. On the other hand, the determination process part 302 determines that the first acquisition condition is not met if the surrounding circumstance the first information obtained in step S900 represents is not the specified season A nor position B. In this case, the process goes to step S906.

In step S904, the determining part 3024 of the determination process part 302 sets the information acquisition condition met flag to "1" to end the process.

In step S906, the determining part 3024 of the determination process part 302 sets the information acquisition condition met flag to "0" to end the process.

Here, as described above, with respect to a certain vehicle event, whether the vehicle event data thereof is useful for the analysis often depends on the surrounding circumstance of the vehicle at the detection timing of the vehicle event. Thus, according to the second example of the information acquisition condition, the probability that the server 3 can obtain the vehicle event data related to the vehicle event detected in the surrounding circumstance that the analyst thinks useful for the analysis.

It is noted that, according to the example illustrated in FIG. 19 and FIG. 20, the first acquisition condition is met when the surrounding circumstance is the specified season A or the surrounding circumstance is the specified position B; however, this is not essential. For example, the first acquisition condition may be met when the surrounding circumstance is the specified season A and the specified position B.

Further, according to the example illustrated in FIG. 19 and FIG. 20, the information acquisition condition is simple as described above; however, the information acquisition condition may include other condition element (referred to as "additional condition element", hereinafter) as described above with reference to FIG. 18. In such a case, for example, if the determination result of step S902 is "YES", whether the additional condition element is met is determined.

[Third Example of Information Acquisition Condition]

FIG. 21 is a diagram illustrating another example of the information acquisition condition including the first acquisition condition.

In the example illustrated in FIG. 21, the first acquisition conditions are set on a vehicle event type basis. The information acquisition condition illustrated in FIG. 21 is met if the first acquisition condition corresponding to the type of the vehicle event is met. In the example illustrated in FIG. 21, the first acquisition condition corresponding to the type of the vehicle event "vehicle event type A" is "date/time condition element A (other than winter, for example)". Further, the first acquisition condition corresponding to the type of the vehicle event "vehicle event type B" is "position condition element A (other than a mountain region, for example)". Similarly, the first acquisition condition corresponding to the type of the vehicle event "vehicle event type C" is "position condition element B (a countryside, for example)".

The first acquisition condition illustrated in FIG. 21 is suited for the case where there are two or more types of the vehicle events to be detected, the case where there are two or more types of the vehicle events with different characteristics, etc.

FIG. 22 is a flowchart illustrating an example of the process of the determination process part 302 in the case where the information acquisition condition illustrated in FIG. 21 is used. Specifically, FIG. 22 illustrates another example of the process of step S604 in FIG. 17.

It is noted that the information acquisition condition illustrated in FIG. 21 includes the first acquisition conditions defined the types of the vehicle events, respectively, and thus, FIG. 22 is explained based on a premise that the first transmission signal includes the first and third item information (i.e., the third pattern). Further, the first acquisition condition illustrated in FIG. 21 is defined in association with the detection date/time and the detection position of the vehicle event, respectively, and thus, FIG. 22 is explained based on a premise that the first item information includes the information representing the detection date/time of the vehicle event and the information representing the detection position of the vehicle event without including other information.

In step S1100, the first information acquisition part 3021 of the determination purposes information acquisition part 3020 of the determination process part 302 obtains the first item information (i.e., the information representing the surrounding circumstance of the vehicle at the detection timing of the vehicle event) from the first transmission signal. Specifically, the first information acquisition part 3021 obtains the first information from the first transmission signal.

In step S1102, the first information acquisition part 3021 of the determination purposes information acquisition part 3020 of the determination process part 302 obtains the third item information (i.e., the information representing the type of the vehicle event) from the first transmission signal. Specifically, the first information acquisition part 3021 obtains the first information from the first transmission signal.

In step S1104, the determining part 3024 of the determination process part 302 determines whether the first acquisition condition corresponding to the type of the vehicle event, among the first acquisition conditions illustrated in FIG. 21, is met, based on the information (the first information) representing the surrounding circumstance, obtained by the determination purposes information acquisition part 3020 in step S1100 and the information (the first information) representing the type of the vehicle event, obtained by the determination purposes information acquisition part 3020 in step S1102. Specifically, the determining part 3024 of the determination process part 302 determines whether the first acquisition condition corresponding to the type of the vehicle event the first information obtained in step S1102 represents is met based on the surrounding circumstance the first information obtained in step S1100 represents. If it is determined that the first acquisition condition is met, the process goes to step S1106, otherwise the process goes to step S1108.

In step S1106, the determining part 3024 of the determination process part 302 sets the information acquisition condition met flag to "1" to end the process.

In step S1108, the determining part 3024 of the determination process part 302 sets the information acquisition condition met flag to "0" to end the process.

Here, as described above, which surrounding circumstance, in which the vehicle event is detected, makes the vehicle event data thereof useful is dependent on the type of the vehicle event. This is because the characteristics of the vehicle events differ depending on the types of the vehicle events.

For example, if the vehicle event is "ABS operation", operations in a rain environment are its ordinarily predicted operations of ABS, and thus there may be a case where the vehicle event data of the operations of ABS in a rain environment is not useful. On the other hand, if the vehicle event is "emergency braking operation", operations in a rain environment in winter may tend to cause a slip of the vehicle, and thus the vehicle event data obtained in such a surrounding circumstance may be useful.

With respect to this point, according to the third example of the information acquisition condition, since the first acquisition conditions are defined on a vehicle event type basis, the probability that the server 3 can obtain only the vehicle event data that the analyst thinks useful for the analysis, on a vehicle event type basis, can be increased, even if there are an increased number of the types of the vehicle events to be detected.

It is noted that, according to the example illustrated in FIG. 21 and FIG. 22, the information acquisition condition is simple as described above; however, the information acquisition condition may include an additional condition element (the detection values of the tire pressures being greater than or equal to a predetermined threshold, for example) as described above with reference to FIG. 18. In such a case, for example, if the determination result of step S1104 is "YES", whether the additional condition element is met is determined.

[Fourth Example of Information Acquisition Condition]

Figures 23, 24:
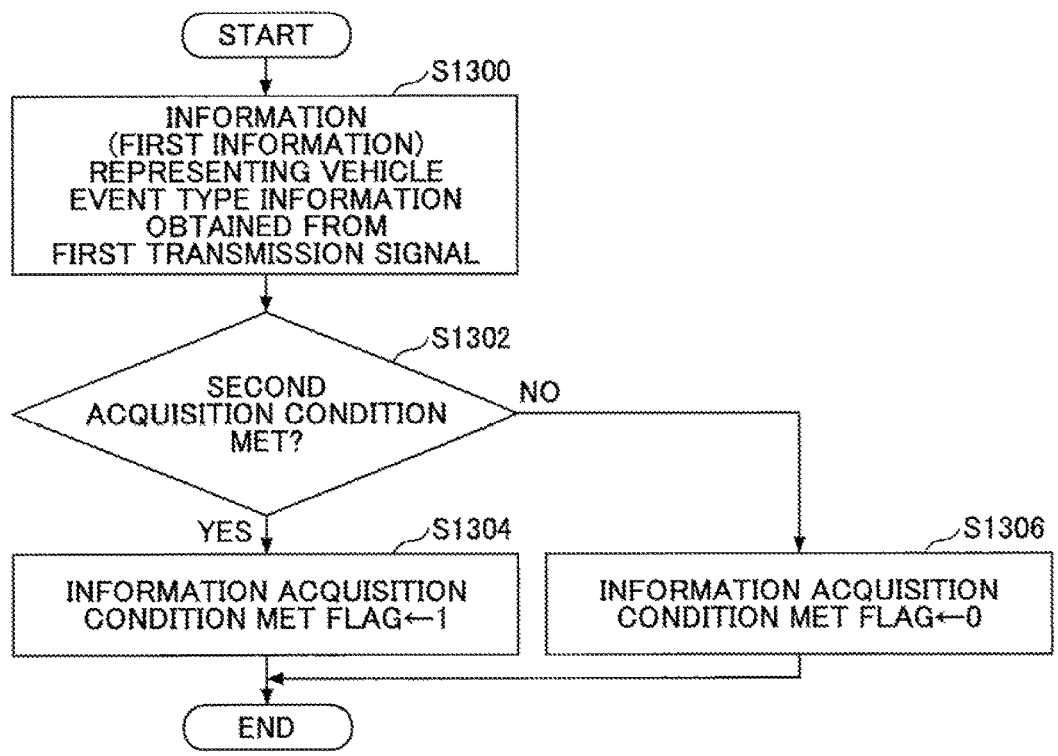
FIG. 23 is a diagram illustrating yet another example of the information acquisition condition.
FIG. 24 is a flowchart illustrating yet another example of the vehicle event data acquisition necessity determination process.

FIG. 23 is a diagram illustrating an example of the information acquisition condition including the second acquisition condition. The information acquisition condition illustrated in FIG. 23 is met when the second acquisition condition is met. In the example illustrated in FIG. 23, the second acquisition condition is met when the type of the vehicle event is one of specified vehicle event types A, B, and C. The second acquisition condition illustrated in FIG. 23 is based on a premise that there are three or more types of the vehicle events to be detected.

FIG. 24 is a flowchart illustrating an example of the process of the determination process part 302 in the case where the information acquisition condition illustrated in FIG. 23 is used. Specifically, FIG. 24 illustrates another example of the process of step S604 in FIG. 17.

It is noted that the information acquisition condition illustrated in FIG. 23 includes the second acquisition condition, and thus, FIG. 23 is explained based on a premise that the first transmission signal includes only the third item information (i.e., the second pattern) or the first and third item information (i.e., the third pattern).

In step S1300, the first information acquisition part 3021 of the determination purposes information acquisition part 3020 of the determination process part 302 obtains the third item information (i.e., the information representing the type of the vehicle event) from the first transmission signal. Specifically, the first information acquisition part 3021 obtains the first information from the first transmission signal.

In step S1302, the determining part 3024 of the determination process part 302 determines whether the information acquisition condition (the second acquisition condition) illustrated in FIG. 23 is met based on the type of the vehicle event the first information obtained in step S1300 represents. Specifically, the determination process part 302 determines that the second acquisition condition is met if the type of the vehicle event the first information obtained in step S1300 represents is one of the specified vehicle event types A, B, and C. In this case, the process goes to step S1304. On the other hand, the determining part 3024 of the determination process part 302 determines that the second acquisition condition is not met if the type of the vehicle event the first information obtained in step S1300 represents is none of the specified vehicle event types A, B, or C. In this case, the process goes to step S1306.

In step S1304, the determining part 3024 of the determination process part 302 sets the information acquisition condition met flag to "1" to end the process.

In step S1306, the determining part 3024 of the determination process part 302 sets the information acquisition condition met flag to "0" to end the process.

As described above, there may be a case where the vehicle event data of some types of the vehicle events is useful for the analysis while the vehicle event data of other types of the vehicle events is not useful for the analysis. With respect to this point, according to the fourth example of the information acquisition condition, since the information acquisition condition is met if the type of the vehicle event the first information represents meets the second acquisition condition, the probability that the server 3 can obtain the vehicle event data related to the types of the vehicle events which the analyst thinks useful for the analysis.

It is noted that, according to the example illustrated in FIG. 23 and FIG. 24, the information acquisition condition is simple as described above; however, the information acquisition condition may include an additional condition element as described above with reference to FIG. 18. In such a case, for example, if the determination result of step S1302 is "YES", whether the additional condition element is met is determined.

For example, the additional condition element may be the acquisition condition associated with the fourth item described above. For example, the acquisition condition associated with the fourth item is "the detection number of the same type of the vehicle event being greater than or equal to the predetermined threshold", for example. In this case, the first information acquisition part 3021 of the determination purposes information acquisition part 3020 obtains the information (the first information) representing the detection number of the type of the vehicle event, which type the determination purposes information obtained in step S1300 represents, and the determination process part 302 determines whether the detection number the first information represents is greater than or equal to the predetermined threshold. The determination purposes information acquisition part 3020 can obtain the information (the first information) representing the detection number of the type of the vehicle event, which type the determination purposes information obtained in step S1300 represents, from the first transmission signal (i.e., the detection number information included in the first transmission signal). Such an additional condition element is suited for the case where the vehicle event data of the vehicle event of a certain type becomes useful only when the vehicle event is detected relatively many times.

For example, the additional condition element is "a combination of a radar sensor and an image sensor being used to monitor the objects ahead of the vehicle", if the vehicle event type A is "PCS operation", for example. In this case, the second information acquisition part 3022 of the determination purposes information acquisition part 3020 obtains the information representing the specification of the vehicle (i.e., the second information) from the vehicle basic information storing part 310, and the determination process part 302 determines, based on the specification the second information represents, whether a combination of a radar sensor and an image sensor is used to monitor the objects ahead of the vehicle. Such an additional condition element is suited for the case where the vehicle event data of the vehicle event of a certain type becomes useful only when the vehicle event is detected in the vehicle with a particular vehicle configuration.

[Fifth Example of Information Acquisition Condition]

The fifth example of the information acquisition condition corresponds to an combination of the third example of the information acquisition condition described above and the fourth example of the information acquisition condition described above. Specifically, the information acquisition condition includes the first acquisition conditions associated to the types of the vehicle events, respectively, and the second acquisition condition. In this case, the information acquisition condition is met when the first or second acquisition condition is met.

Figure 25:
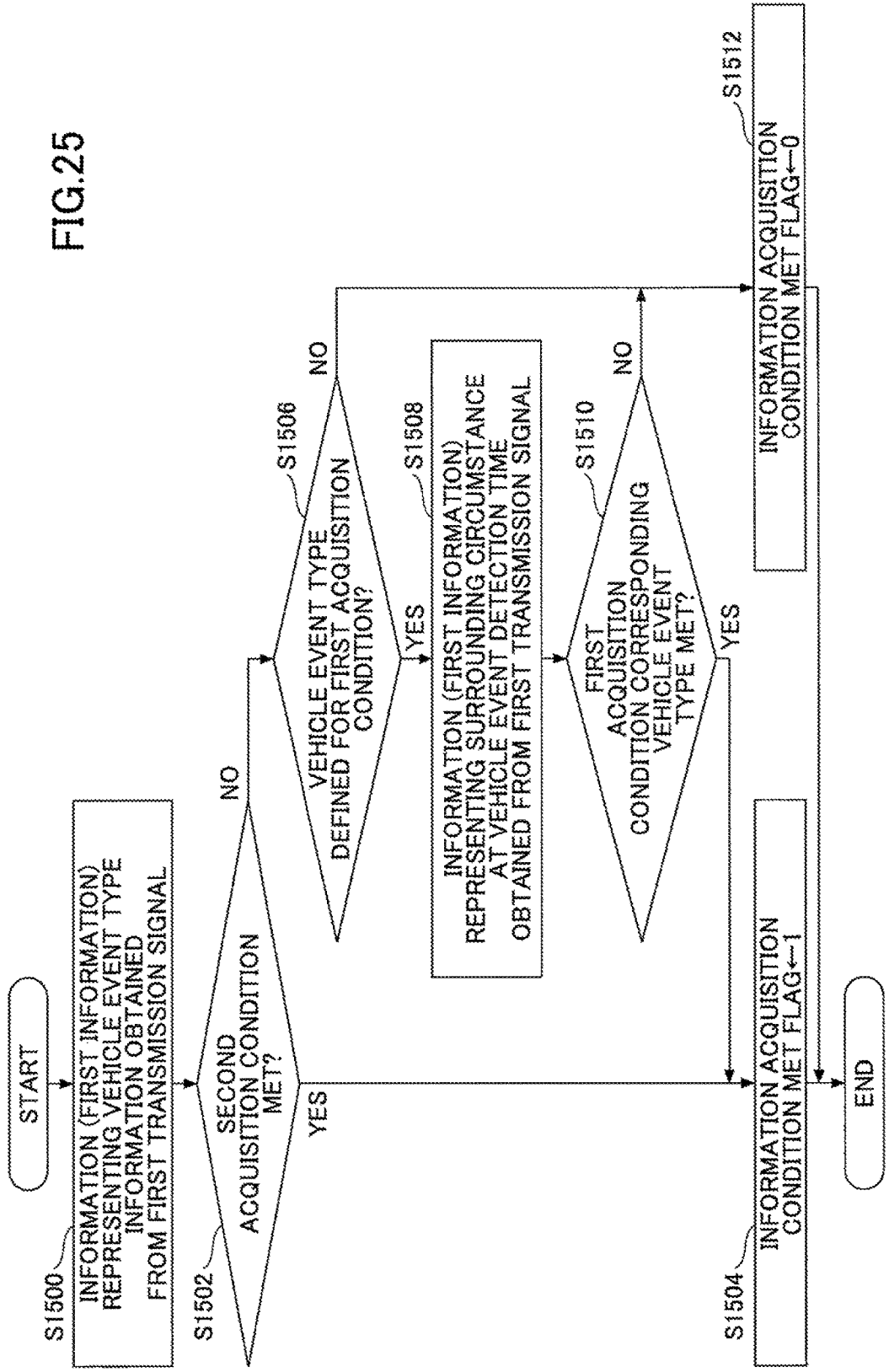
FIG. 25 is a flowchart illustrating yet another example of the vehicle event data acquisition necessity determination process.

FIG. 25 is a flowchart illustrating an example of the process of the determination process part 302 in the case where the information acquisition condition according to the fifth example is used. Specifically, FIG. 25 illustrates another example of the process of step S604 in FIG. 17.

It is noted that the information acquisition condition according to the fifth example includes the first acquisition conditions and the second acquisition condition, and thus, FIG. 25 is explained based on a premise that the first transmission signal includes the first and third item information (i.e., the third pattern). FIG. 25 is explained based on a premise that the first item information includes the information representing the detection date/time of the vehicle event and the information representing the detection position of the vehicle event without including other information.

The processes of step S1500 and step S1502 are the same as those of step S1300 and step S1302 illustrated in FIG. 24, respectively, and thus the explanation thereof is omitted. Similarly, the processes of step S1504 and step S1512 are the same as those of step S1304 and step S1306 illustrated in FIG. 24, respectively, and thus the explanation thereof is omitted.

In step S1506, the determining part 3024 of the determination process part 302 determines whether the first acquisition condition is predetermined based on the type of the vehicle event the first information obtained in step S1500 represents. If the determination result is "YES", the process goes to step S1508, and if the determination result is "NO", the process goes to step S1512.

The processes of step S1508 and step S1510 are the same as those of step S1100 and step S1104 illustrated in FIG. 22, respectively, and thus the explanation thereof is omitted.

According to the fifth example of the information acquisition condition, the degree of freedom in defining the information acquisition condition is increased. As a result of this, the probability that the server 3 can obtain only the vehicle event data that the analyst thinks useful for the analysis, on a vehicle event type basis, can be increased, even if there are further increased numbers of the types of the vehicle events to be detected.

It is noted that, according to the example illustrated in FIG. 25, the information acquisition condition is simple as described above; however, the information acquisition condition may include an additional condition element (the detection number of the same type of the vehicle event being greater than or equal to the predetermined threshold, for example) as described above with reference to FIG. 18. In such a case, for example, prior to step S1504, whether the additional condition element is met is determined.

Second Embodiment

The second embodiment described hereinafter differs from the first embodiment described above only in that the server 3 is replaced with the server 3A. In the following, the configuration of the server 3A is mainly described.

A basic hardware configuration of the server 3A is the same as that of the information record ECU 7 illustrated in FIG. 2 except that the processing capability and the storage capacity are enhanced.

Figure 26:
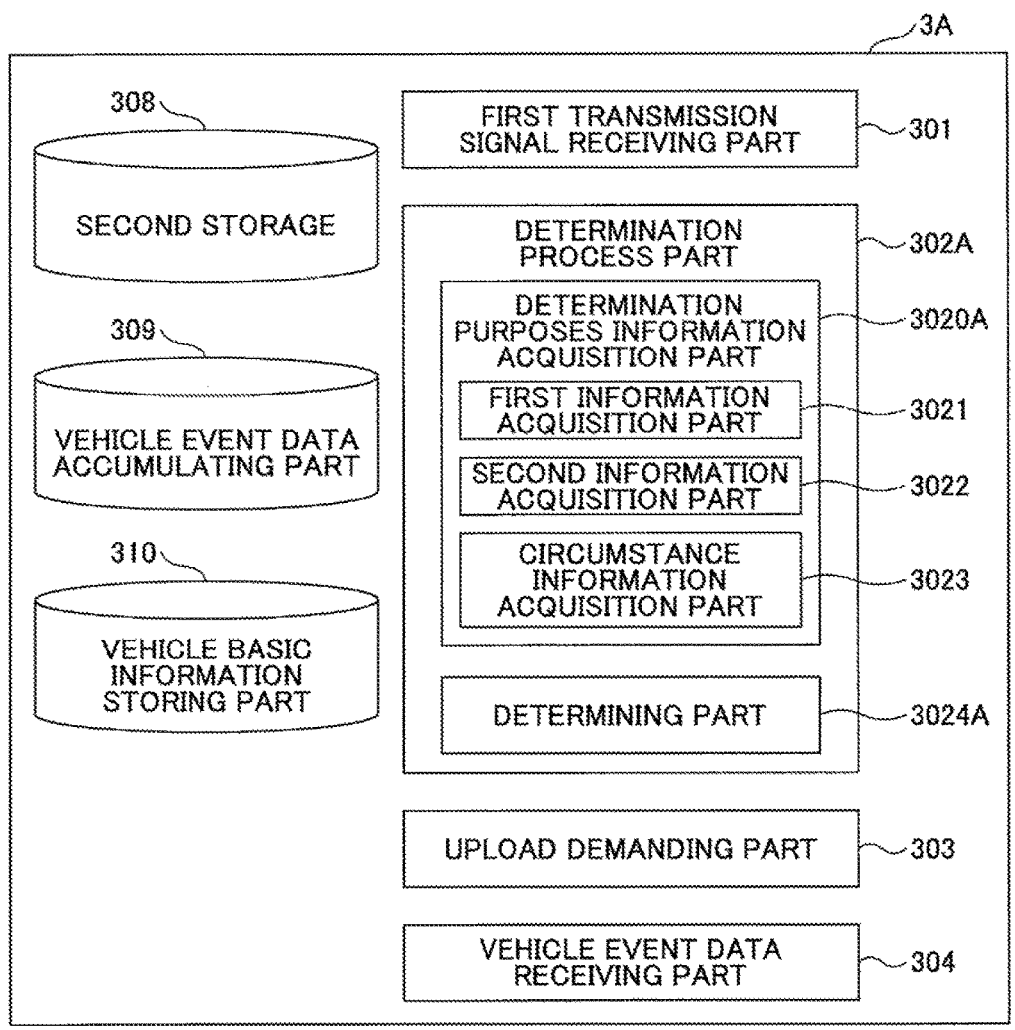
FIG. 26 is a functional block diagram of a server according to a second embodiment.

FIG. 26 is a functional block diagram of the server 3A. The server 3A differs from the server 3 according to the first embodiment and described above with reference to FIG. 14 in that the determination process part 302 is replaced with the determination process part 302A. Other components may be substantially the same, and further explanation thereof is omitted by using the same reference numerals as used in FIG. 14. The determination process part 302A may be implemented by the CPU executing one or more programs stored in the ROM.

The determination process part 302A differs from the determination process part 302 according to the first embodiment in that the determination purposes information acquisition part 3020 is replaced with the determination purposes information acquisition part 3020A and the determining part 3024 is replaced with the determining part 3024A. The determination purposes information acquisition part 3020A differs from the determination purposes information acquisition part 3020 in that a circumstance information acquisition part 3023 is added.

In the second embodiment, the information record ECU 7 and the server 3A perform the processes according to the process flow illustrated in FIG. 17, respectively; however, only a content of step S603 is different as described above.

In the second embodiment, as a premise, the first item information is included in the first transmission signal, and the first item information includes the information representing the detection date/time of the vehicle event and the information representing the detection position of the vehicle event without including other information.

The circumstance information acquisition part 3023 obtains more detailed first information that cannot be obtained by the first information acquisition part 3021.

Specifically, the circumstance information acquisition part 3023 obtains the circumstance information (an example of the first information) representing at least one of the surrounding circumstance of the vehicle at the detection date/time of the vehicle event and the surrounding circumstance of the vehicle at the detection position of the vehicle event, based on the first item information included in the first transmission signal. The circumstance information obtained by the circumstance information acquisition part 3023 does not represent the detection date/time and the detection position of the vehicle event themselves, but represents the surrounding circumstance other than the detection date/time and the detection position of the vehicle event. The circumstance information acquisition part 3023 obtains the circumstance information from resources other than the on-vehicle device 2. For example, the circumstance information acquisition part 3023 obtains the circumstance information from a server that provides detailed climate information (movement of clouds, temperatures in regions, amounts of rainfall, amounts of snowfall, etc.) in time series, a server that provides detailed map information (road gradients, curvatures of curved roads, cants, vista at intersections, etc.), a server that provides states of traffic signals in time series, a server that provides traffic amounts time series, etc. The circumstance information obtained by the circumstance information acquisition part 3023 can be effectively used to determine whether the first acquisition condition is met, as described hereinafter.

The determining part 3024A determines whether the information acquisition condition is met based on the determination purposes information obtained by the determination purposes information acquisition part 3020A. The determination purposes information obtained by the determination purposes information acquisition part 3020A includes the circumstance information obtained by the circumstance information acquisition part 3023. The circumstance information acquisition part 3023 obtains the circumstance information that is not included in the first item information included in the first transmission signal. Thus, the first acquisition condition of the information acquisition condition used in the second embodiment can be defined in a multidimensional perspective and detailed manner, in comparison with the first acquisition condition that may be used according to the first embodiment.

FIG. 27 is a diagram illustrating an example of the information acquisition condition used in the second embodiment.

The information acquisition condition used in the second embodiment includes at least the first acquisition condition. In the example illustrated in FIG. 27, the first acquisition conditions are set on a vehicle event type basis. Further, the first acquisition condition of the information acquisition condition used in the second embodiment is defined in advance in a multidimensional perspective and detailed manner, in comparison with the first acquisition condition (see FIG. 21) that may be used according to the first embodiment. For example, according to the example illustrated in FIG. 27, the first acquisition condition corresponding to the type of the vehicle event "vehicle event type A" is "climate condition element A (no rainfall and no snowfall at the detection date/time of the vehicle event and in the detection position of the vehicle event, for example)". Further, the first acquisition condition corresponding to the type of the vehicle event "vehicle event type B" is "road gradient condition element A (an average road gradient near the detection position of the vehicle event being less than or equal to a threshold, for example)". Similarly, the first acquisition condition corresponding to the type of the vehicle event "vehicle event type C" is "traffic amount condition element B (the traffic amount at the detection date/time of the vehicle event and the detection position of the vehicle event being less than or equal to a threshold, for example)".

Figure 28:
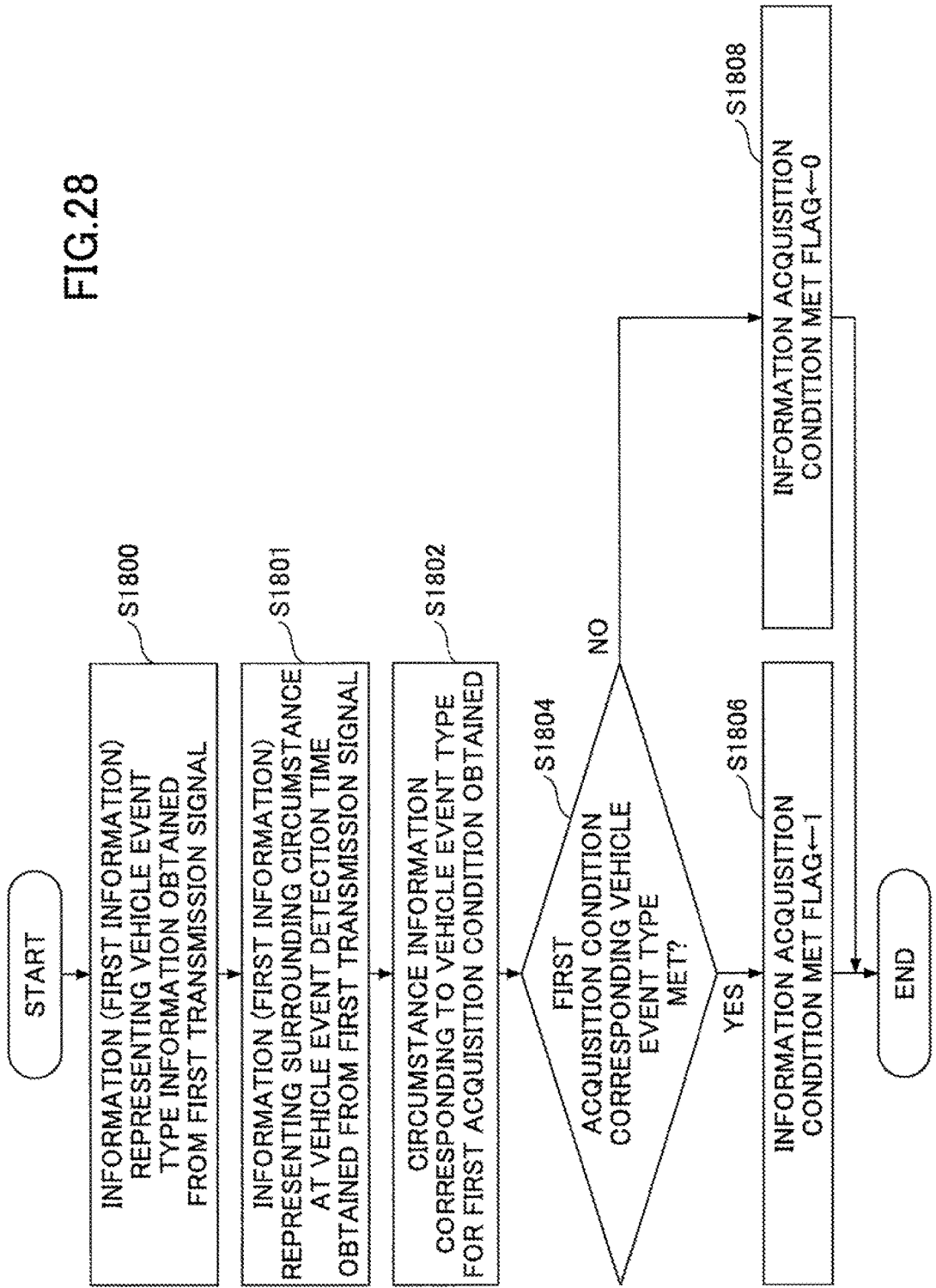
FIG. 28 is a flowchart illustrating an example of the vehicle event data acquisition necessity determination process in the second embodiment.

FIG. 28 is a flowchart illustrating an example of the process of the determination process part 302A in the case where the information acquisition condition illustrated in FIG. 27 is used. Specifically, FIG. 28 illustrates an example of the process of step S604 illustrated in FIG. 17.

It is noted that the information acquisition condition illustrated in FIG. 27 includes the first acquisition conditions defined by the types of the vehicle events, respectively, and thus, FIG. 28 is explained based on a premise that the first transmission signal includes the first and third item information (i.e., the third pattern). Further, the first acquisition condition illustrated in FIG. 27 is defined in association with detailed surrounding circumstance related to the detection date/time and the detection position of the vehicle event, respectively, and thus, FIG. 28 is explained based on a premise that the first item information includes the information representing the detection date/time of the vehicle event and the information representing the detection position of the vehicle event without including other information.

In step S1800, the first information acquisition part 3021 of the determination purposes information acquisition part 3020A of the determination process part 302A obtains the third item information (i.e., the information representing the type of the vehicle event) from the first transmission signal. Specifically, the first information acquisition part 3021 obtains the first information from the first transmission signal.

In step S1801, the first information acquisition part 3021 of the determination purposes information acquisition part 3020A of the determination process part 302A obtains the first item information (i.e., the information representing the detection date/time and the detection position of the vehicle event) from the first transmission signal. Specifically, the first information acquisition part 3021 obtains the first information from the first transmission signal.

In step S1802, the circumstance information acquisition part 3023 of the determination purposes information acquisition part 3020A of the determination process part 302A obtains the circumstance information representing the surrounding circumstance of the vehicle related to at least one of the detection date/time and the detection position of the vehicle event, based on the first and third item information. For example, if the first acquisition condition corresponding to the type of the vehicle event that the third item information obtained in step S1800 represents is associated with the surrounding circumstance (climate or traffic amount, for example) affected by the detection date/time and the detection position of the vehicle event, the circumstance information acquisition part 3023 obtains the circumstance information representing the surrounding circumstance of the vehicle at the detection date/time and the detection position of the vehicle event. On the other hand, if the first acquisition condition corresponding to the type of the vehicle event that the third item information obtained in step S1800 represents is associated with the surrounding circumstance (road gradient, for example) affected by one of the detection date/time and the detection position of the vehicle event, the circumstance information acquisition part 3023 obtains the circumstance information representing the surrounding circumstance of the vehicle at the detection position of the vehicle event.

In step S1804, the determining part 3024A of the determination process part 302A determines whether the first acquisition condition corresponds to the type of the vehicle event based on the circumstance information obtained in step S1802. Specifically, the determining part 3024A determines whether the first acquisition condition, corresponding to the type of the vehicle event that the third item information obtained in step S1800, represents is met based on the circumstance information obtained in step S1802. If it is determined that the first acquisition condition is met, the process goes to step S1806, otherwise the process goes to step S1808.

The processes of step S1806 and step S1808 are the same as those of step S1106 and step S1108 illustrated in FIG. 22, respectively, and thus the explanation thereof is omitted.

According to the second embodiment, the following effects can be obtained in addition to the effects obtained in the first embodiment described above. According to the second embodiment, the circumstance information acquisition part 3023 of the server 3A obtains the circumstance information representing the surrounding circumstance of the vehicle related to at least one of the detection date/time and the detection position of the vehicle event. The server 3A has a higher information processing ability and higher information acquisition ability than the on-vehicle device 2. Thus, the server 3A can identify the surrounding circumstance of the vehicle related to at least one of the detection date/time and the detection position of the vehicle event in a multidimensional perspective and detailed manner. Correspondingly, the first acquisition condition can be predetermined to be associated with the multidimensional perspective and detailed surrounding circumstance of the vehicle. As a result of this, the probability that the server 3A can obtain the vehicle event data of the vehicle event detected in the particular surrounding circumstance of the vehicle that the analyst thinks useful for the analysis is further increased.

For example, as described above, with respect to the type of the vehicle event "ABS operation", the vehicle event data may become useful when the vehicle event is detected in a sunny circumstance, for example, instead of in rainy or snowy circumstances. In this case, the first acquisition condition corresponding to the "ABS operation", for example, "climate being other than rain and snow" may increase the probability that the server 3A can obtain the vehicle event data related to the operations of the ABS detected in the surrounding circumstance that the analyst thinks useful for the analysis. Further, similarly, with respect to the type of the vehicle event "emergency braking operation", the vehicle event data may become useful when the vehicle event is detected in rainy or snowy circumstances. In this case, the first acquisition condition corresponding to the "emergency braking operation", for example, "climate being rain and snow" may increase the probability that the server 3A can obtain the vehicle event data related to the emergency braking operations detected in the surrounding circumstance that the analyst thinks useful for the analysis.

It is noted that, according to the second embodiment, since the information acquisition condition including the first acquisition condition associated with the surrounding circumstance (climate or traffic amount, for example) affected by the detection date/time and the detection position of the vehicle event is used, the first item information includes the information representing the detection date/time of the vehicle event and the information representing the detection position of the vehicle event; however, this is not essential. For example, depending on the first acquisition condition included in the information acquisition condition, the first item information may include the information representing only one of the detection date/time and the detection position of the vehicle event. For example, the first acquisition condition "road gradient indicating uphill" can be determined based on the circumstance information representing the surrounding circumstance of the vehicle at the detection position of the vehicle event, even if the first item information does not include the information representing the detection date/time of the vehicle event. Further, it can be determined that the first acquisition condition "climate being other than rain and snow" is met when the climate (the circumstance information) at the detection date/time of the vehicle event obtained by the circumstance information acquisition part 3023 represents sunny or cloudy day over a whole country, even if the first item information does not include the information representing the detection position of the vehicle event.

It is noted that, in the second embodiment, another information acquisition condition other than the information acquisition condition illustrated in FIG. 12 may be used. For example, the first acquisition condition of the information acquisition condition illustrated in FIG. 19 may be replaced with another first acquisition condition that is defined in a more multidimensional perspective and detailed manner. For example, the first acquisition condition "a surrounding circumstance being specified season A" of the information acquisition condition illustrated in FIG. 19 may be replaced with a first acquisition condition "climate being other than rain and snow, and the first acquisition condition "a surrounding circumstance being specified position B" of the information acquisition condition illustrated in FIG. 19 may be replaced with a first acquisition condition "an average road gradient near the detection position of the vehicle event being less than or equal to the threshold". If such a first acquisition condition is used, the third item information (i.e., the information representing the type of the vehicle event) is not necessarily obtained from the first transmission signal.

Third Embodiment

The third embodiment described hereinafter differs from the first embodiment described above only in that the on-vehicle device 2 is an on-vehicle device 2A. In the following, the configuration of the on-vehicle device 2A is mainly described. In the explanation of the third embodiment described hereinafter, the elements the same as those in the first embodiment described above are given the same reference numerals, and the explanation thereof is omitted.

Figure 29:
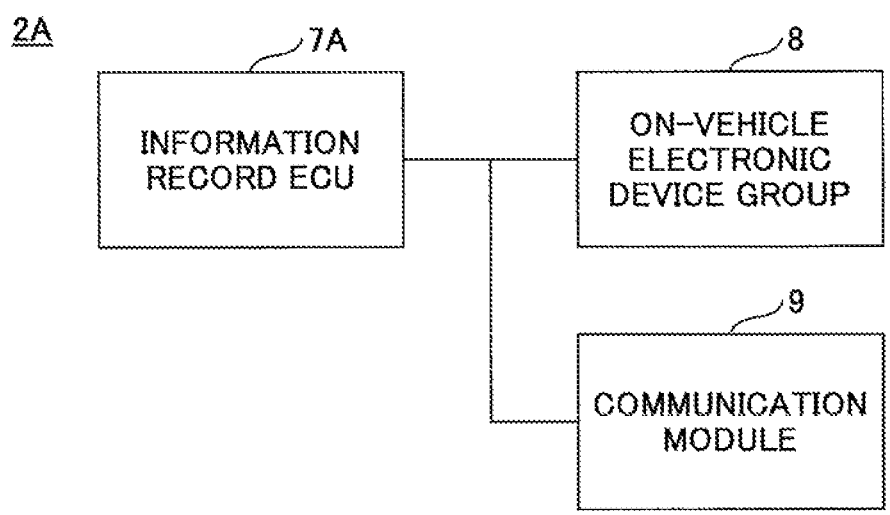
FIG. 29 is a diagram illustrating a configuration of an on-vehicle device according to a third embodiment.

FIG. 29 is a drawing showing the configuration of the on-vehicle device 2A. The on-vehicle device 2A includes an information record ECU 7A, the on-vehicle electronic device group 8, and a communication module 9. The communication module 9 is provided in a luggage compartment or a front portion on a passenger side of a floor panel. An antenna (not illustrated) of the communication module 9 is provided on a center portion of a roof or a top portion of a front windshield glass, for example.

A basic hardware configuration of the information record ECU 7A is the same as that of the information record ECU 7 illustrated in FIG. 2 except that there is no wireless transmission/reception part 26. Further, the information record ECU 7A may not include the clock 15.

A basic hardware configuration of the communication module 9 is the same as that of the information record ECU 7 illustrated in FIG. 2.

Figure 30:
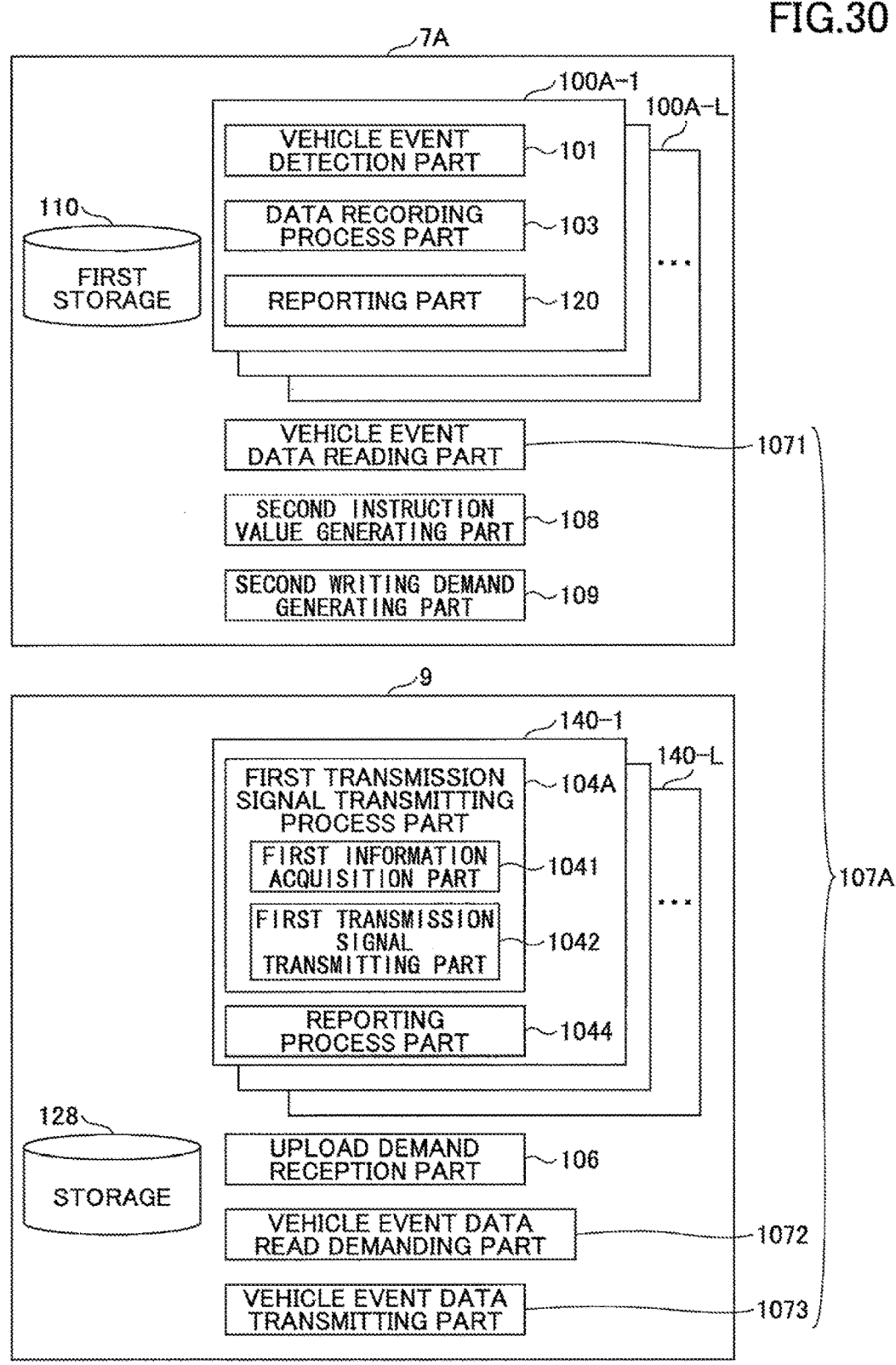
FIG. 30 is a functional block diagram of the information record ECU and a communication module.

FIG. 30 is a functional block diagram of the information record ECU 7A and the communication module 9.

The information record ECU 7A includes vehicle event recording process parts 100A-1 through 100A-L, a vehicle event data reading part 1071, the second instruction value generating part 108, the second writing demand generating part 109, and the first storage 110. The first instruction value generating part 108, the vehicle event recording process parts 100A-1 through 100A-L, and the vehicle event data reading part 1071 may be implemented by the CPU executing one or more programs stored in the ROM, respectively.

The vehicle event recording process parts 100A-1 through 100A-L are provided for the types of the vehicle events to be detected, respectively. The functions of the vehicle event recording process parts 100A-1 through 100A-L are substantially the same except that the types of the vehicle events allocated to the vehicle event recording process parts 100A-1 through 100A-L are different. Thus, in the following, unless otherwise specified, an arbitrary vehicle event recording process part 100A-#, among the vehicle event recording process parts 100A-1 through 100A-L, is described. The vehicle event recording process part 100A-# differs from the vehicle event recording process part 100-# according to the first embodiment described above in that the first transmission signal transmitting process part 104 is omitted and a reporting part 120 is added.

The reporting part 120 reports that the vehicle event detection part 101 has detected the vehicle event, when the vehicle event detection part 101 detects the vehicle event (i.e., the vehicle event detection part 101 receives the vehicle event detection report information). According to the third embodiment, as an example, the reporting part 120 transmits report information including the vehicle event type ID, and the counter value (after having been counted up) representing the detection number of the vehicle events (see FIG. 7) to the communication module 9 via the wired transmission/reception part.

The vehicle event data reading part 1071 reads the vehicle event data from the recording area to be read in the first storage 110 in response to the read demand from a vehicle event data read demanding part 1072. A way of reading the vehicle event data is the same as that used in the upload execution part 107 according to the first embodiment described above. Then, the vehicle event data reading part 1071 transmits the read vehicle event data to the communication module 9 via the wired transmission/reception part.

The communication module 9 includes transmit process parts 140-1 through 140-L, the upload demand reception part 106, the vehicle event data read demanding part 1072, a vehicle event data transmitting part 1073, and a storage 128. The transmit process parts 140-1 through 140-L, the upload demand reception part 106, the vehicle event data read demanding part 1072, and the vehicle event data transmitting part 1073 may be implemented by the CPU executing one or more programs stored in the ROM, respectively. The storage 128 may be implemented by an auxiliary storage apparatus (an EEPROM, for example). It is noted that, in the third embodiment, the vehicle event data reading part 1071, the vehicle event data read demanding part 1072, and the vehicle event data transmitting part 1073 form the upload execution part 107A.

The transmit process parts 140-1 through 140-L are provided for the types of the vehicle events to be detected, respectively. The functions of the transmit process parts 140-1 through 140-L are substantially the same except that the types of the vehicle events allocated to the transmit process parts 140-1 through 140-L are different. Thus, in the following, unless otherwise specified, an arbitrary transmit process part 140-#, among the transmit process parts 140-1 through 140-L, is described. The transmit process part 140-# includes a first transmission signal transmitting process part 104A and a reporting process part 1044.

The first transmission signal transmitting process part 104A performs a first transmission signal transmission process in response to an execution instruction from the reporting process part 1044. The first transmission signal transmission process itself is the same as that according to the first embodiment described above. It is noted that the execution instruction from the reporting process part 1044 is generated when the vehicle event detection part 101 detects the vehicle event (and thus the reporting process part 1044 has confirmed the detection of the vehicle event based on the report information from the reporting part 120), as described hereinafter.

The vehicle event data read demanding part 1072 transmits the read demand to the information record ECU 7A when the vehicle event data read demanding part 1072 receives an upload demand from the server 3. According to the third embodiment, as an example, the vehicle event data read demanding part 1072 transmits (transfers) the upload demand to the information record ECU 7A via the wired transmission/reception part.

The vehicle event data transmitting part 1073, when the vehicle event data transmitting part 1073 receives the vehicle event data according to the read demand, transmits the received vehicle event data to the server 3 via the wireless transmission/reception part. A way of transmitting the vehicle event data is the same as that used in the upload execution part 107 according to the first embodiment described above.

The reporting process part 1044 confirms the detection of the vehicle event in response to the report from the reporting part 120 of the information record ECU 7A. For example, the reporting process part 1044 compares, based on the report information from the reporting part 120, the counter value included in the report information with the counter value (representing the detection number related to the corresponding vehicle event type ID) stored in the storage 128. When the counter value included in the report information is greater than that in the storage 128 by "1", the reporting process part 1044 inputs the execution instruction for the first transmission signal transmission process to the first transmission signal transmitting process part 104A. At that time, the reporting process part 1044 increments the counter value in the storage 128 by "1".

The storage 128 stores the counter values of the detection numbers of the vehicle events, on a vehicle event type ID basis, as illustrated in FIG. 31, for example. In the example illustrated in FIG. 31, for example, the counter value related to the vehicle event of the type whose vehicle event type ID "AAA" is "1".

Figure 32:
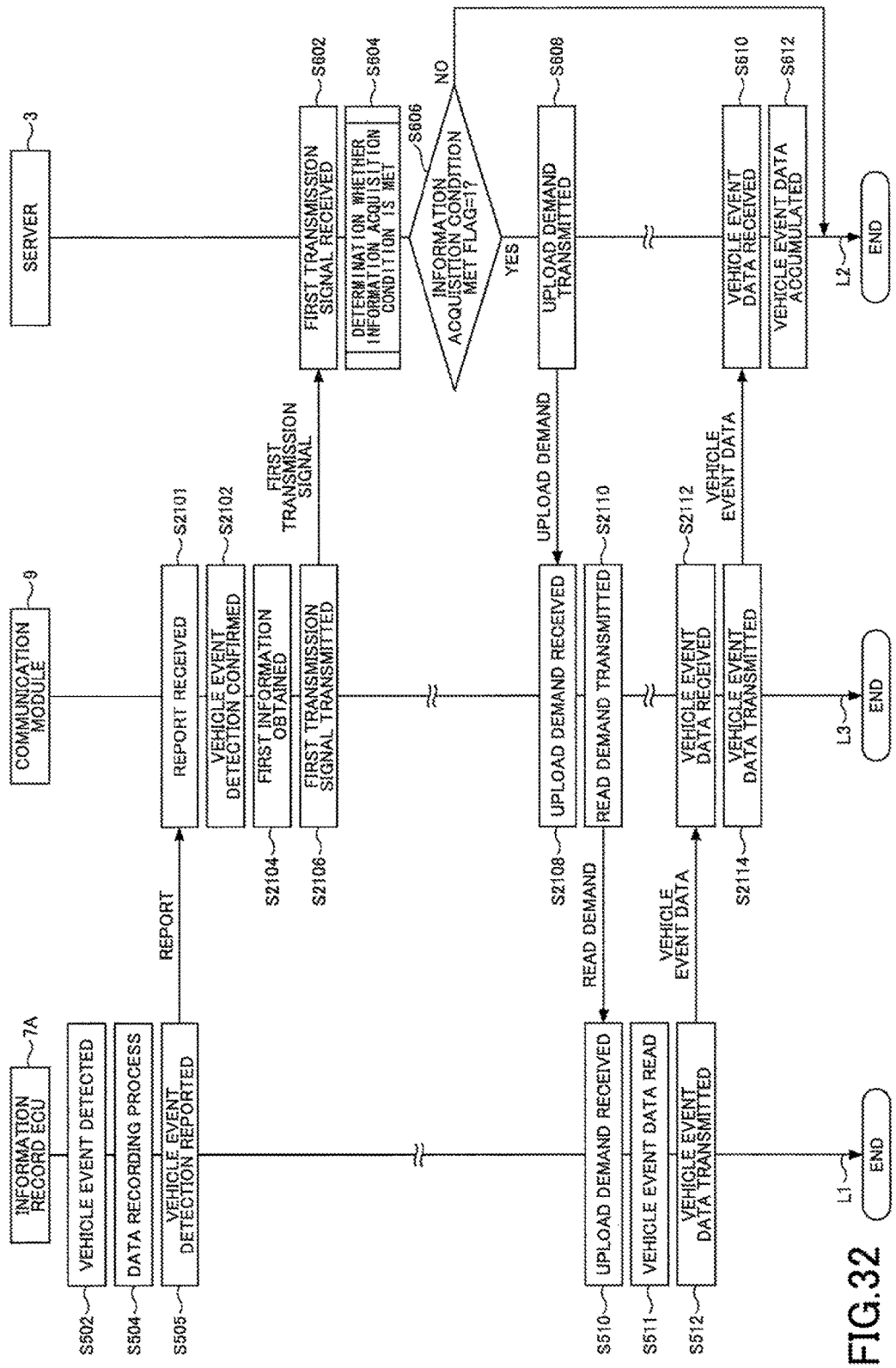
FIG. 32 is a flowchart schematically illustrating an example of a relationship between the process of the on-vehicle device and the process of the server.

FIG. 32 is a flowchart schematically illustrating an example of a relationship between the process of the on-vehicle device 2A and the process of the server 3.

In FIG. 32, lines L1, L2, and L3 are time axes extending downwardly from the information record ECU 7A, the server 3, and the communication module 9, respectively. The down direction corresponds to the direction in which time goes. Omission marks in the lines L1, L2, and L3 indicate separation in time with respect to a series of processes.

In the example illustrated in FIG. 32, the vehicle event detection part 101 of the information record ECU 7A of the on-vehicle device 2A detects the vehicle event whose type is to be detected (step S502). The data recording process part 103 of the information record ECU 7A performs the data recording (writing) process (step S504) when the vehicle event detection part 101 detects the vehicle event. Further, when the vehicle event detection part 101 detects the vehicle event, the reporting part 120 of the information record ECU 7A transmits the report information to the communication module 9 (step S505). The report information thus transmitted is received by the communication module 9 (step S2101).

When the communication module 9 receives the report information (step S2101), the reporting process part 1044 of the communication module 9 confirms the detection of the vehicle event based on the report information (step S2102). Then, the first information acquisition part 1041 of the communication module 9 obtains the first information (step S2104), and the first transmission signal transmitting part 1042 of the communication module 9 transmits the first transmission signal to the server 3 (step S2106). The first transmission signal thus transmitted is received by the first transmission signal receiving part 301 of the server 3 (step S602).

The process of the server 3 is as described above with reference to FIG. 17. The upload demand thus transmitted from the server 3 is received by the communication module 9 (step S2108).

When the communication module 9 receives the upload demand (step S2108), the vehicle event data read demanding part 1072 of the communication module 9 transmits the read demand to the information record ECU 7A (step S2110). The read demand thus transmitted is received by the information record ECU 7A (step S510).

When the information record ECU 7A receives the read demand (step S510), the vehicle event data reading part 1071 of the information record ECU 7A reads the vehicle event data from the first storage 110 (step S511), and transmits the read vehicle event data to the communication module 9 (step S512). The vehicle event data thus transmitted is received by the communication module 9 (step S2112).

When the communication module 9 receives the vehicle event data (step S2112), the vehicle event data transmitting part 1073 of the communication module 9 transmits the vehicle event data to the server 3 (step S2114). In this way, the vehicle event data is uploaded to the server 3.

According to the third embodiment, the following effects can be obtained in addition to the effects obtained in the first embodiment described above. According to the third embodiment, since the communication module 9 performs the first transmission signal transmission process, the processing load of the information record ECU 7A can be made less than that of the information record ECU 7 according to the first embodiment described above.

It is noted that, in the third embodiment, the information record ECU 7A receives the vehicle event detection reports generated in the ECUs 80-1 through 80-N of the on-vehicle electronic device group 8, respectively, to perform the data recording (writing) process, etc., as is the case with the information record ECU 7 according to the first embodiment described above; however, this is not essential. For example, as a variant, a part of or all of the ECUs 80-1 through 80-N of the on-vehicle electronic device group 8 may perform the data recording (writing) processes, etc., by themselves. In other words, a part of or all of the ECUs 80-1 through 80-N of the on-vehicle electronic device group 8 may include parts corresponding to the data recording process part 103, the reporting part 120, the vehicle event data reading part 1071, and the first storage 110 of the information record ECU 7A, respectively. The ECUs 80-1 through 80-N already have a function corresponding to the vehicle event detection part 101 of the information record ECU 7A. This is because the vehicle event detection reports from the ECUs 80-1 through 80-N require the detections of the vehicle events. According to the variant, there is at least one ECU 80-# that implements the data recording process part 103, the processing load as a whole required to upload the vehicle event data related to a plurality of types of vehicle events to be detected can be distributed over a plurality of ECUs (an example of a first control unit) including the information record ECU 7A.

Fourth Embodiment

The fourth embodiment described hereinafter differs from the first embodiment described above in that the on-vehicle device 2 is replaced with the on-vehicle device 2A and the server 3 is replaced with the server 3A. In the explanation of the fourth embodiment described hereinafter, the elements the same as those in the first embodiment described above are given the same reference numerals, and the explanation thereof is omitted.

The on-vehicle device 2B (not illustrated) differs from the on-vehicle device 2 according to the first embodiment described above in that the information record ECU 7 is replaced with the information record ECU 7B. A basic hardware configuration of the information record ECU 7B is the same as that of the information record ECU 7 illustrated in FIG. 2.

Figure 33:
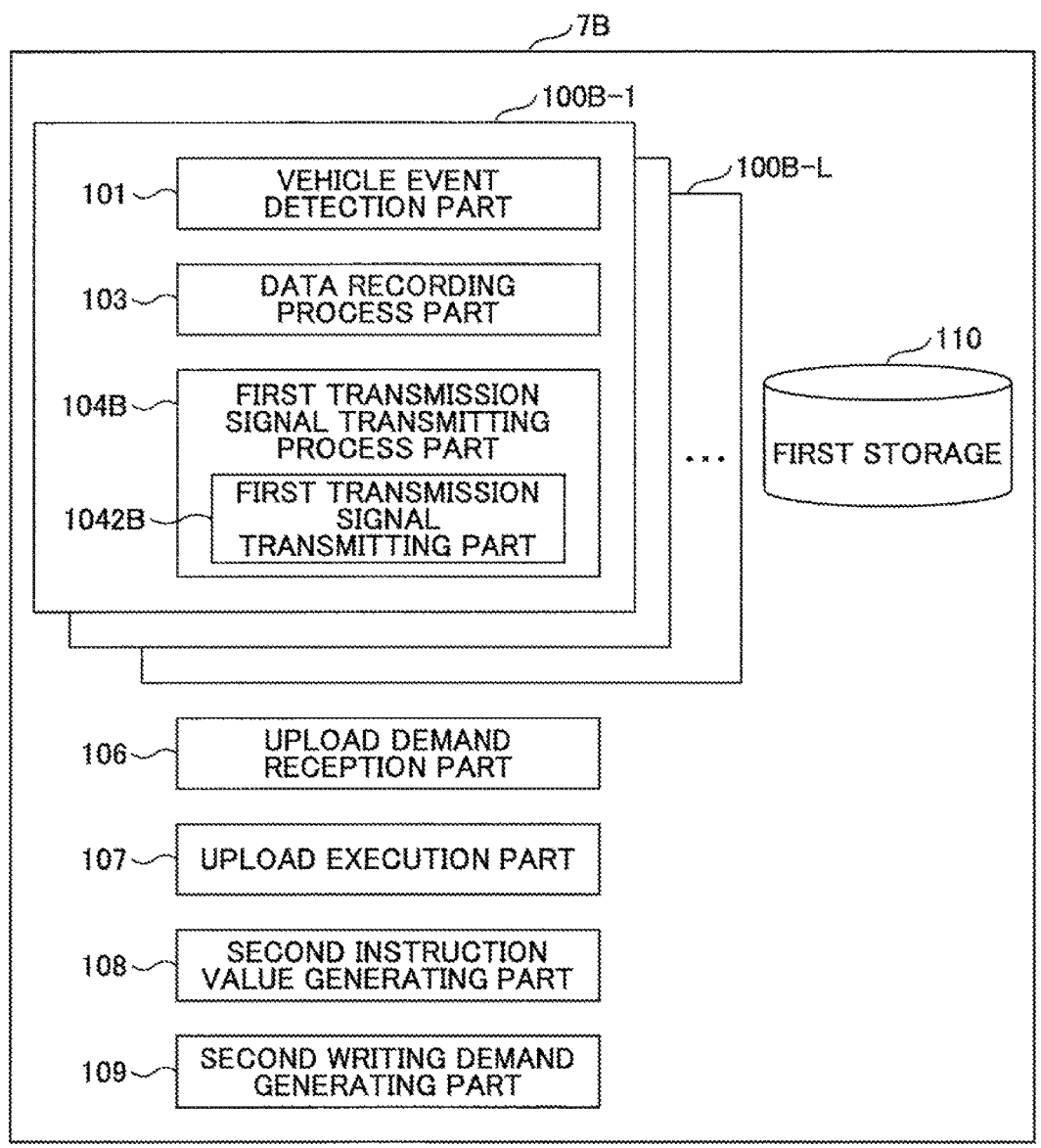
FIG. 33 is a functional block diagram of the information record ECU.

FIG. 33 shows a functional block diagram of the information record ECU 7B.

The functional block of the information record ECU 75 differs from the functional block of the information record ECU 7 illustrated in FIG. 5 in that the vehicle event recording process parts 100-1 through 100-1, are replaced with vehicle event recording process parts 100B-1 through 100B-L. The functions of the vehicle event recording process parts 100B-1 through 100B-L are substantially the same except that the types of the vehicle events allocated to the vehicle event recording process parts 100B-1 through 100B-L are different. Thus, in the following, unless otherwise specified, an arbitrary vehicle event recording process part 100B-#, among the vehicle event recording process parts 100B-1 through 100B-L, is described.

The vehicle event recording process part 100B-# differs from the vehicle event recording process part 100-# according to the first embodiment described above in that the first transmission signal transmitting process part 104 is replaced with a first transmission signal transmitting process part 104B. The first transmission signal transmitting process part 104B differs from the first transmission signal transmitting process part 104 according to the first embodiment described above in that first information acquisition part 1041 is not provided and the first transmission signal transmitting part 1042 is replaced with a first transmission signal transmitting part 1042B. The first transmission signal transmitting part 1042B may be implemented by the CPU executing one or more programs stored in the ROM.

The first transmission signal transmitting process part 104B transmits the first transmission signal when the vehicle event detection part 101 detects the vehicle event.

The first transmission signal according to the fourth embodiment differs from the first transmission signal according to the first embodiment (which includes the first information) in that the first information is not included therein. In other words, the first transmission signal according to the fourth embodiment includes only the vehicle event detection report information, among the vehicle event detection report information and the first information.

Figure 34:
FIG. 34 is a diagram illustrating an example of information included in the first transmission signal.

According to the fourth embodiment, as an example, the first transmission signal transmitting process part 104B generates the first transmission signal illustrated in FIG. 34 and transmits the generated first transmission signal to the server 3. The first transmission signal illustrated in FIG. 34 includes first transmission signal ID, which represents that the transmission signal is a "first transmission signal" (signal type), and the vehicle ID. It is noted that, also in this case, the first transmission signal ID serves the first function (i.e., the function of informing the server 3B of that the vehicle event has been detected) as the vehicle event detection report information.

Figure 35:
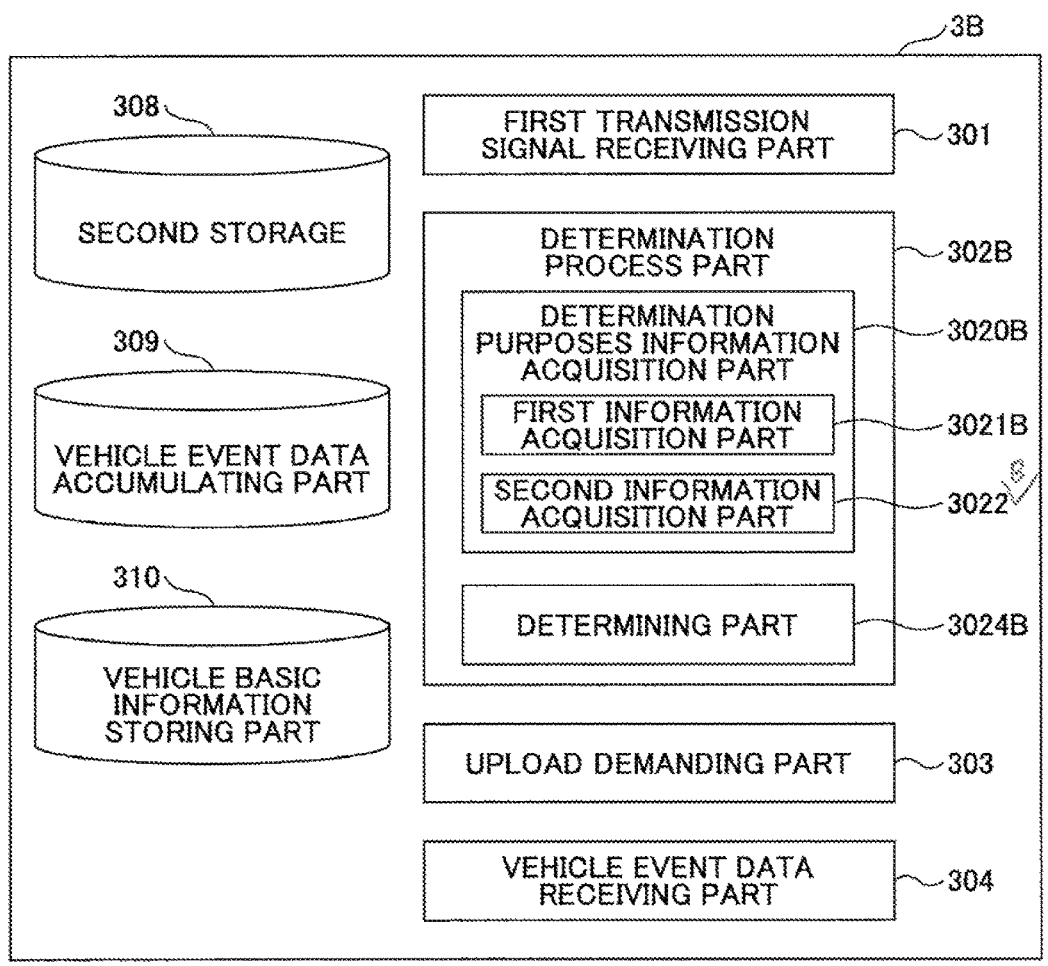
FIG. 35 is a functional block diagram of the server.

FIG. 35 is a functional block diagram of the server 3B.

The functional block diagram of the server 3B differs from the functional block diagram of the server 3 illustrated in FIG. 14 in that the determination process part 302 is replaced with a determination process part 302B. It is noted that, with respect to the second storage 308, the second storage 308 stores the information acquisition condition, as is the case with the first embodiment described above; however, a content of the information acquisition condition may be different from that of the information acquisition condition according to the first embodiment described above.

The determination process part 302B performs a determination process whether the information acquisition condition is met when the first transmission signal receiving part 301 receives the first transmission signal. The information acquisition condition is predetermined such that the information acquisition condition is determined based on the determination purposes information. According to the fourth embodiment, as an example, the determination purposes information includes at least one of (1) information representing a surrounding circumstance of the vehicle at the detection timing of the vehicle event and (2) the second information (i.e., the information representing the vehicle configuration that has influence on the vehicle event).

The determination process part 302B includes a determination purposes information acquisition part 3020B and a determining part 3024B.

The determination purposes information acquisition part 3020B obtains the determination purposes information. The determination purposes information acquisition part 3020B includes a first information acquisition part 3021B and a second information acquisition part 3022B.

According to the fourth embodiment, as described above, since the first transmission signal does not include the first information, the first information acquisition part 3021B cannot obtain the first information from the first transmission signal. Thus, according to the fourth embodiment, the determination purposes information obtained by the determination purposes information acquisition part 3020B does not include the first information that is directly obtained from the first transmission signal.

The first information acquisition part 3021B obtains the first information from an information resource other than the first transmission signal. This example is described hereinafter. It is noted that, in the fourth embodiment, in the determination purposes information does not include the first information (see FIG. 39), the first information acquisition part 3021B may be omitted.

Figure 36:
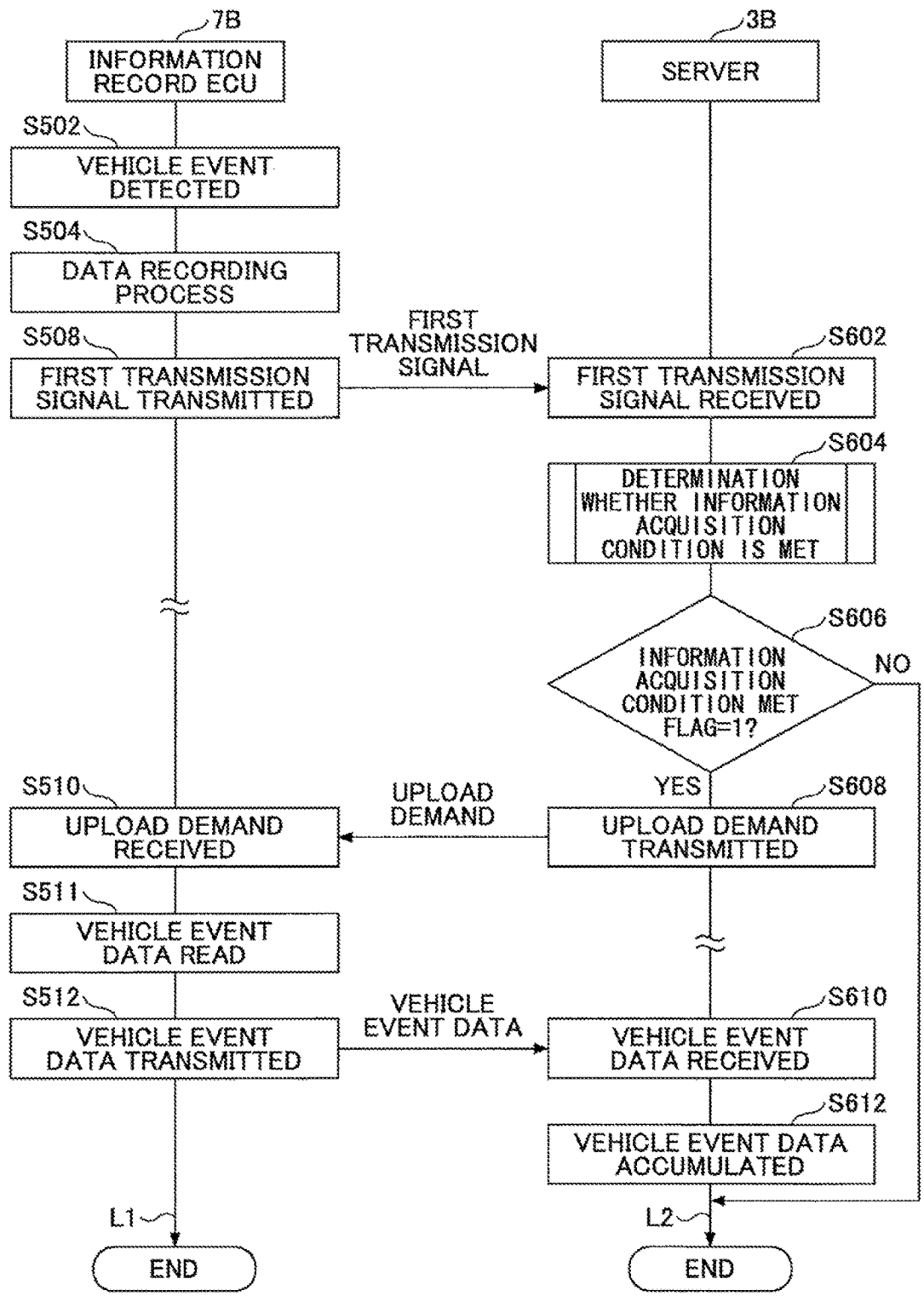
FIG. 36 is a flowchart schematically illustrating an example of a relationship between the process of the on-vehicle device and the process of the server.

FIG. 36 is a flowchart schematically illustrating an example of a relationship between the process of the information record ECU 7B and the process of the server 3B. The process flow illustrated in FIG. 36 differs from the process flow illustrated in FIG. 17 and explained in relation to the first embodiment described above in that step S506 (the acquisition of the first information in the information record ECU 7) is omitted, and a way of the process of step S604 is changed as described above.

Figures 37, 38:
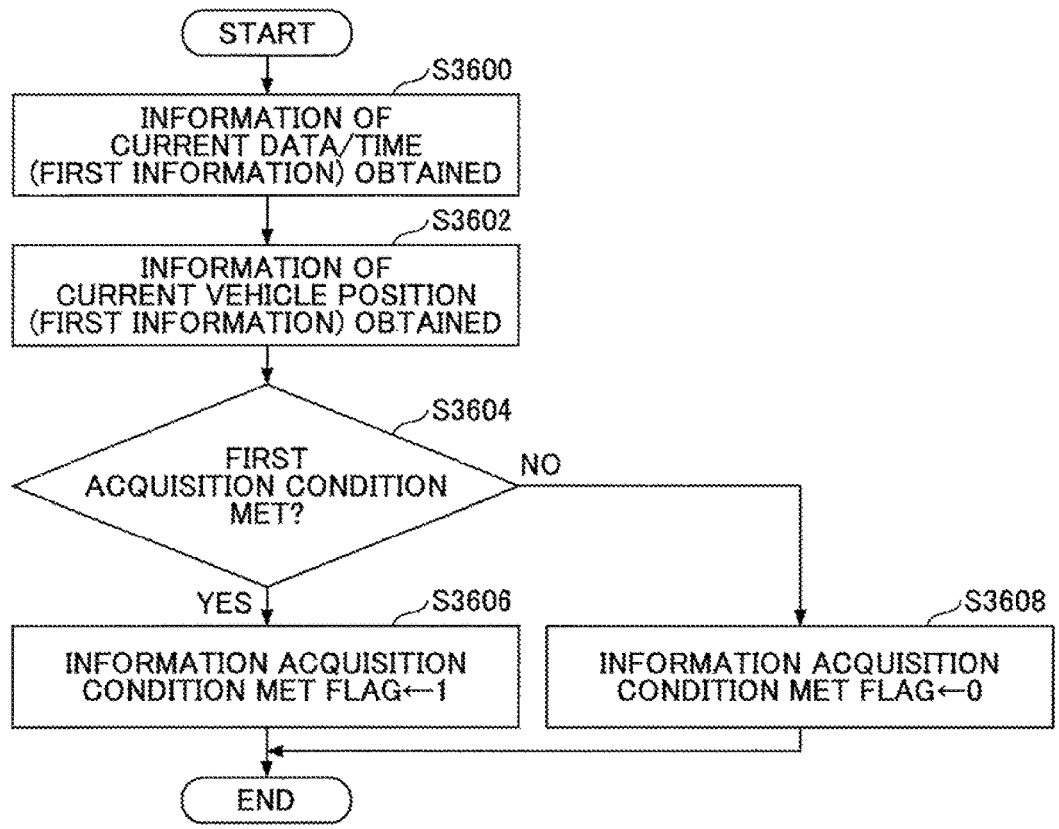
FIG. 37 is a flowchart illustrating an example of the vehicle event data acquisition necessity determination process.
FIG. 38 is a diagram illustrating another example of the information acquisition condition.

FIG. 37 is a flowchart illustrating an example of the determination process part 302B. Specifically, FIG. 37 illustrates an example of the process of step S604 in FIG. 36. FIG. 37 illustrates, as an example, the process of the determination process part 302 in the case where the information acquisition condition illustrated in FIG. 19 is used.

According to the explanation with respect to FIG. 37, as a premise, it is assumed that the vehicle basic information stored in the vehicle basic information storing part 310 includes such information, as the ordinary use region where the vehicle is usually used, the position of the garage, etc., with which the current position of the vehicle can be estimated. It is noted that the information representing the ordinary use region where the vehicle is usually used, etc., can be generated based on the position information that can be received from the vehicle on a regular basis, registration data at the time of initial registration, etc., for example.

In step S3600, the first information acquisition part 3021B of the determination purposes information acquisition part 3020B of the determination process part 302B obtains the information representing the current date/time (i.e., the first information). The information representing the current date/time can be obtained from a clock (not illustrated) that the server 3B includes, for example.

In step S3602, the first information acquisition part 3021B of the determination purposes information acquisition part 3020B of the determination process part 302B obtains the information representing the current vehicle position (i.e., the first information) based on the vehicle basic information stored in the vehicle basic information storing part 310. For example, the first information acquisition part 3021B identifies the vehicle based on the vehicle ID included in the first transmission signal, and regards, based on the vehicle basic information related to the vehicle stored in the vehicle basic information storing part 310, the position in the ordinary use region of the vehicle or the position of the garage of the vehicle as the current vehicle position of the vehicle.

In step S3604, the determining part 3024B of the determination process part 302B determines whether the first acquisition condition illustrated in FIG. 19 is met based on the first information (the information representing the current date/time and the current vehicle position) obtained by the first information acquisition part 3021 in step S3600 and step S3602. For example, the determining part 3024B of the determination process part 302B determines that the first acquisition condition is met when the current date/time represented by the first information obtained in step S3600 corresponds to the specified season A, or the current vehicle position represented by the first information obtained in step S3602 corresponds the specified position B or region around the specified position B. In this case, the process goes to step S3606. On the other hand, if the determination process part 302B determines that the first acquisition condition is not met, the process goes to step S3608.

In step S3606, the determining part 3024B of the determination process part 302B sets the information acquisition condition met flag to "1" to end the process.

In step S3608, the determining part 3024B of the determination process part 302B sets the information acquisition condition met flag to "0" to end the process.

It is noted that, in the case where the information acquisition condition in which the first acquisition conditions associated with the vehicle position are omitted from the information acquisition condition illustrated in FIG. 19 is used, the process of step S3602 may be omitted in the example illustrated in FIG. 37. In this case, it becomes unnecessary to refer to the vehicle basic information in the vehicle basic information storing part 310.

Further, in the example illustrated in FIG. 37, the process of step S3600 is performed when the first transmission signal receiving part 301 receives the first transmission signal (see step S604 in FIG. 17); however, the process of step S3600 may be performed before the first transmission signal receiving part 301 receives the first transmission signal (on a regular basis, for example). In other words, the timing of obtaining the information representing the current date/time is not necessarily after the timing of the reception of the first transmission signal. This holds true, in particular, for the case where the first acquisition condition is associated with the item which does not change dramatically, such as a season, etc.

Further, in the fourth embodiment, there may be a case where the information acquisition condition includes the acquisition condition associated with the second item described above. For example, the acquisition condition associated with the second item may be "a lapsed time from the shipment of the vehicle (or line-off timing) being greater than or equal to a predetermined threshold". In this case, the first information acquisition part 3021B of the determination purposes information acquisition part 3020B can obtain (identify) the information representing the lapsed time from the shipment of the vehicle (an example of the second item information) based on the line-off period of the vehicle (or the date/time of the initial communication) included in the vehicle basic information in the vehicle basic information storing part 310.

Further, according to the fourth embodiment, if there is only one type of the vehicle event to be detected, the information acquisition condition may include the acquisition condition associated with the fourth item described above. For example, the acquisition condition associated with the fourth item is "the detection number of the same type of the vehicle event being greater than or equal to the predetermined threshold", for example. In this case, the first information acquisition part 3021B of the determination purposes information acquisition part 3020B can obtain the information representing the detection number of the vehicle event (an example of the fourth item information) based on the counter value that is counted up every time when the first transmission signal is received.

FIG. 38 is a diagram illustrating another example of the information acquisition condition.

The information acquisition condition illustrated in FIG. 38 includes a condition element (referred to as "a third acquisition condition") that is predetermined to be determined based on the information related to the vehicle configuration that has influence on the vehicle event. In the example illustrated in FIG. 38, the information acquisition condition includes the third acquisition condition predetermined to be associated with the vehicle type. In the example illustrated in FIG. 38, the third acquisition condition is met when the vehicle type is a specified vehicle type XXA, XXB, or XXC.

It is noted that the third acquisition condition illustrated in FIG. 38 is suited for the type of the vehicle event, "rollover narrowly escaped event" or "rollover event", for example, on which the vehicle type has influence. This is because the vehicle event such as a rollover is affected by the vehicle height and the position of the gravity center.

Figure 39:
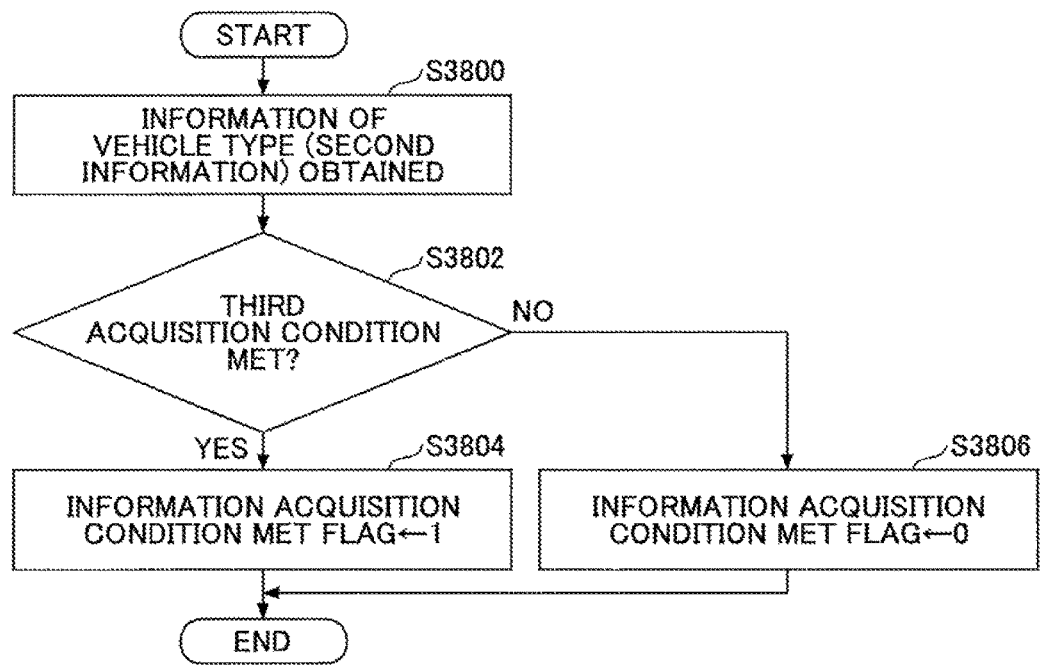
FIG. 39 is a flowchart illustrating yet another example of the vehicle event data acquisition necessity determination process.

FIG. 39 is a flowchart illustrating an example of the process of the determination process part 302B in the case where the information acquisition condition illustrated in FIG. 38 is used. Specifically, FIG. 39 illustrates an example of the process of step S604 in FIG. 36.

According to the explanation of FIG. 39 described hereinafter, as a premise, it is assumed that the vehicle basic information stored in the vehicle basic information storing part 310 includes information with which the vehicle type can be identified. The information with which the vehicle type can be identified is information explicitly representing the vehicle type, or other information (information representing the size or weight of the vehicle) with which the vehicle type can be identified (estimated), for example.

In step S3800, the second information acquisition part 3022B of the determination purposes information acquisition part 3020B of the determination process part 302B obtains the information representing the vehicle type of the vehicle (i.e., the second information). For example, the determination process part 302B can identify the vehicle type based on the vehicle ID included in the received first transmission signal and the vehicle basic information stored in the vehicle basic information storing part 310.

In step S3802, the determining part 3024B of the determination process part 302B determines whether the information acquisition condition (the third acquisition condition) illustrated in FIG. 38 is met based on the second information (representing the vehicle type) obtained in step S3800. Specifically, the determining part 3024B of the determination process part 302B determines that the third acquisition condition is met when the vehicle type represented by the second information obtained in step S3800 is the vehicle type XXA, XXB, or XXC. In this case, the process goes to step S3804. On the other hand, the determining part 3024B of the determination process part 302B determines that the third acquisition condition is not met when the vehicle type represented by the second information obtained in step S3800 is not the vehicle type XXA, XXB, or XXC. In this case, the process goes to step S3806.

The processes of step S3804 and step S3806 are the same as those of step S3606 and step S3608 illustrated in FIG. 37, respectively, and thus the explanation thereof is omitted.

According to the fourth embodiment, as is the case with the first embodiment, when the vehicle event detection part 101 detects the vehicle event whose type is to be detected, the vehicle event data of the vehicle event is not always uploaded to the server 3B, but instead the first transmission signal is transmitted to the server 3B at first. Thus, the communication load of the information collection system as a whole can be reduced. Further, according to the fourth embodiment, since the information acquisition condition can be predetermined to be determined based on the determination purposes information described above, the probability that the server 3B can obtain only the vehicle event data useful for the analyst can be increased, which can increase analysis efficiency of the vehicle events. Thus, according to the fourth embodiment, as is the case with the first embodiment, because the information acquisition condition can be collectively managed in the server 3B, it becomes possible to more feely change the information acquisition condition afterward, in comparison with the case where the information acquisition condition is given in the respective vehicles.

Further, according to the fourth embodiment, since the first transmission signal does not include the first information, the first transmission signal transmission process in the information record ECU 7B can be simplified and thus the processing load of the information record ECU 7B can be reduced, in comparison with the first embodiment described above. Further, according to the fourth embodiment, the information amount of the first transmission signal can be reduced and the communication load related to the first transmission signal can be reduced, in comparison with the first embodiment described above.

The present invention is disclosed with reference to the preferred embodiments. However, it should be understood that the present invention is not limited to the above-described embodiments, and variations and modifications may be made without departing from the scope of the present invention.

For example, according to the third embodiment described above, the server 3A according to the second embodiment may be used instead of the server 3. Further, similarly, in the fourth embodiment, the server 3B may include the circumstance information acquisition part 3023 to obtain further effects that can be obtained according to the second embodiment. In this case, the circumstance information acquisition part 3023 may obtain the circumstance information related to the current date/time obtained by the server 3B (see step S3600) or the current vehicle position obtained by the server 3B (see step S3602). Further, the third embodiment described above may be combined with the fourth embodiment described above. In other words, in the third embodiment, the first transmission signal transmitting process part 104A in the communication module 9 of the on-vehicle device 2A may be replaced with the first transmission signal transmitting process part 104B, and the server 3 may be replaced with the server 3B.

Further, in the first through third embodiments described above, the information representing the detection position of the vehicle event that may be included in the first transmission signal is generated based on the information from the GPS receiver; however, this is not essential. In other words, the vehicle position may be detected by different ways. For example, the vehicle position may be calculated based on a position information between the vehicle and a plurality of base stations. The position information the wireless transmission/reception part 26 may be obtained by the wireless transmission/reception part 26.

Further, according to the first through fourth embodiments, if the determination purposes information does not include the second information, the second information acquisition part 3022 may be omitted.

Further, in the first through fourth embodiments, the server 3 or 3A may obtain the information representing the detection date/time of the vehicle event by itself. For example, the first information acquisition part 3021 of the determination purposes information acquisition part 3020 of the server 3 or 3A may obtain date/time when the first transmission signal receiving part 301 receives the first transmission signal, and regard the date/time as the detection date/time of the vehicle event (see step S3600 in the fourth embodiment described above). In this case, the necessity of inserting the information representing the detection date/time of the vehicle event in the first transmission signal is reduced.

Further, in the first through fourth embodiments, the first transmission signal includes the first information; however, the first transmission signal may not include the first information, as is the case with the fourth embodiment described above (see FIG. 34). In the following, the first transmission signal that does not include such first information is referred to as "sub first transmission signal". In this case, the first transmission signal transmitting process part 104 (or 104A, this holds true in the following) may always transmit a first transmission signal (referred to as "main first transmission signal", hereinafter) including the first information obtained by the first information acquisition part 1041, after the transmission of the "sub first transmission signal". At that time, the first transmission signal transmitting process part 104 (104A) transmits the "main first transmission signal" to the server 3 (3A) such that the server 3 (3A) can link the "sub first transmission signal" with the "main first transmission signal". Alternatively, at first, the first transmission signal transmitting process part 104 (104A) transmits the "sub first transmission signal" to the server 3 (3A), and then may transmit the "main first transmission signal" to the server 3 (3A) in response to a request from the server 3 (3A). In such a configuration, the server 3 (3A) that receives the "sub first transmission signal" can determine, at a first stage, whether the information acquisition condition is met with in the way according to the fourth embodiment described above, and then requests the "main first transmission signal", if necessary. The on-vehicle device 2 (2A) transmits the "main first transmission signal" to the server 3 (3A) in response to such a request. Then, the server 3 (3A) can determine, at a first stage, whether the information acquisition condition is met based on the first information included in the received "main first transmission signal".

According to such a configuration, the server 3 (3A), when it receives the "sub first transmission signal", determines whether the information acquisition condition is met based on the determination purposes information that can be obtained by the server 3 (3A) itself, which can suppress unnecessary transmission of the "main first transmission signal". Further, the server 3 (3A) can request the "main first transmission signal", if necessary (if the determination at the first stage whether the information acquisition condition is met cannot be performed with high accuracy with the determination purposes information that can be obtained by the server 3 (3A) itself), and perform the determination at the second stage whether the information acquisition condition is met based on the first information from the "main first transmission signal" obtained via the request.

Further, according to the second embodiment, since the server 3A includes the circumstance information acquisition part 3023, the determining part 3024 of the server 3A can determine whether the information acquisition condition (the first acquisition condition predetermined to be associated with the multidimensional perspective and detailed surrounding circumstance of the vehicle) such as illustrated in FIG. 27 is met. However, also in the first embodiment, if the first item information included in the first transmission signal includes the information (described above) with which the surrounding circumstance other than the detection date/time and the detection position of the vehicle event can be identified, the determination process part 302 of the determination purposes information acquisition part 3020A can obtain such first item information from the first transmission signal. In this case, it is possible to determine whether the information acquisition condition (the first acquisition condition predetermined to be associated with the multidimensional perspective and detailed surrounding circumstance of the vehicle) such as illustrated in FIG. 27 is met.

Further, in the first through fourth embodiments, the on-vehicle device 2 (2A, 2B) may obtain the second information and transmit a second transmission signal including the second information to the server 3 (3A, 3B) such that the second transmission signal can be linked with the first transmission signal. In this case, the second information acquisition part 3022 can obtain the second information from the second transmission signal. Alternatively, the on-vehicle device 2 (2A, 2B) may obtain the second information and transmit the second information to the server 3 (3A, 3B) such that the second information is included in the first transmission signal. In this case, the second information acquisition part 3022 can obtain the second information from the first transmission signal.

Further according to the first through fourth embodiments, the information record ECU 7 (7A, 7B) may not include the second instruction value generating part 108, the second writing demand generating part 109, and the vehicle event recording process parts 100-L (100A-L, 100-BL). Specifically, the information record ECU 7 (7A, 7B) may not include control function related to the vehicle event, and may have a configuration such that the information record ECU 7 (7A, 7B) obtain the corresponding vehicle information in response to the writing demand from the ECUs 80-# to record the vehicle event in the corresponding recording area, respectively.

It is noted that the following aspects (1) and (2) are also disclosed.

(1) An on-vehicle device installed in a vehicle, the on-vehicle device being configured to communicate with a server disposed remotely from the vehicle in a bidirectional manner, the on-vehicle device comprising:
a storage,
a vehicle event detection part configured to detect a vehicle event,
a vehicle information generating part configured to generate vehicle information representing a state of the vehicle,
a data recording part configured to record vehicle event data in the storage when the vehicle event is detected, the vehicle event data including the vehicle information for a predetermined period according to a detection timing of the vehicle event,
a first transmission signal transmitting part configured to transmit a first transmission signal to the server when the vehicle event is detected, the first transmission signal including vehicle event detection report information for informing that the vehicle event has been detected,
an upload demand receiving part configured to receive an upload demand from the server, the upload demand being transmitted from the server when the server determines that an information acquisition condition stored in the server is met, and
an upload executing part configured to transmit the vehicle event data to the server when the upload demand is received,
wherein the information acquisition condition is predetermined to be determined based on determination purposes information the server obtains, and the determination purposes information includes at least one of timing-based information relevant to the detection timing of the vehicle event, type information relevant to a type of the vehicle event, and configuration information relevant to a vehicle configuration that has influence on the vehicle event.

(2) A server disposed remotely from a vehicle and configured to communicate with an on-vehicle device installed in the vehicle in a bidirectional manner, the server comprising:
a first transmission signal receiving part configured to receive a first transmission signal, the first transmission signal being transmitted from the on-vehicle device when a vehicle event is detected, the first transmission signal including vehicle event detection report information for informing that the vehicle event has been detected,
a storage configured to store an information acquisition condition that is predetermined to be determined based on determination purposes information, the determination purposes information including at least one of timing-based information relevant to the detection timing of the vehicle event, type information relevant to a type of the vehicle event, and configuration information relevant to a vehicle configuration that has influence on the vehicle event,
a determination purposes information acquisition part configured to obtain the determination purposes information,
a determining part configured to determine, based on the determination purposes information, when the first transmission is received, whether the information acquisition condition is met, an upload demanding part configured to transmit an upload demand to the on-vehicle device when it is determined that the information acquisition condition is met, and a vehicle event data receiving part configured to receive vehicle event data recorded in the on-vehicle device, the vehicle event data including the vehicle information for a predetermined period according to a detection timing of the vehicle event, the vehicle event data being transmitted from the on-vehicle device in response to the upload demand.

What is claimed is:

1. An information collection system, comprising:
an on-vehicle device installed in a vehicle, and
a server disposed remotely from the vehicle, the server being configured to communicate with the on-vehicle device in a bidirectional manner, wherein
the on-vehicle device includes:
a first storage,
a vehicle event detection part configured to detect a vehicle event,
a vehicle information generating part configured to generate vehicle information representing a state of the vehicle,
a data recording part configured to record vehicle event data in the first storage when the vehicle event is detected, the vehicle event data including the vehicle information for a predetermined period according to a detection timing of the vehicle event,
a first transmission signal transmitting part configured to transmit a first transmission signal to the server when the vehicle event is detected, the first transmission signal including vehicle event detection report information for informing that the vehicle event has been detected,
an upload demand receiving part configured to receive an upload demand from the server, and
an upload executing part configured to transmit the vehicle event data to the server when the upload demand is received, and wherein
the server includes:
a first transmission signal receiving part configured to receive the first transmission signal,
a second storage configured to store an information acquisition condition that is predetermined to be determined based on determination purposes information, the determination purposes information including at least one of timing-based information relevant to the detection timing of the vehicle event, type information relevant to a type of the vehicle event, and configuration information relevant to a vehicle configuration that has influence on the vehicle event,
a determination purposes information acquisition part configured to obtain the determination purposes information,
a determining part configured to determine, based on the determination purposes information, when the first transmission is received, whether the information acquisition condition is met,
an upload demanding part configured to transmit the upload demand to the on-vehicle device when it is determined that the information acquisition condition is met, and
a vehicle event data receiving part configured to receive the vehicle event data transmitted from the on-vehicle device.

2. The information collection system of claim 1, wherein the determination purposes information includes first information,
the first information includes at least one of the timing-based information and the type information,
the first transmission signal transmitting part includes a first information acquisition part configured to obtain the first information when the vehicle event is detected,
the first transmission signal includes the first information, and
the first transmission signal transmitting part obtains the first information, which is included in the determination purposes information, from the received first transmission signal.

3. The information collection system of claim 2, wherein the first information includes at least one of (1) first item information representing a surrounding circumstance of the vehicle at the detection timing of the vehicle event, (2) second item information representing a state of the vehicle at the detection timing of the vehicle event, (3) third item information representing the type of the vehicle event, and (4) forth item information representing a past detection situation of the same type of the vehicle event.

4. The information collection system of claim 3, wherein the information acquisition condition includes a first acquisition condition that is predetermined and associated with the surrounding circumstances,
the first information includes the first item information,
the information acquisition condition is met when the surrounding information represented by the first item information meets the first acquisition condition.

5. The information collection system of claim 4, wherein the vehicle event includes a plurality of types of the vehicle events,
the vehicle event detection part, the data recording part, and the first transmission signal transmitting part are provided for respective types of the vehicle events,
the first acquisition condition is set for respective types of the vehicle events,
the first information further includes the third item information, and
the information acquisition condition is met when the surrounding information represented by the first item information meets the first acquisition condition that is associated with the type of the vehicle event represented by the third item information.

6. The information collection system of claim 5, wherein the information acquisition condition includes a second acquisition condition that is predetermined and associated with only the types of the vehicle events, and
the information acquisition condition is met when the type of the vehicle event represented by the third item information meets the second acquisition condition or the surrounding information represented by the first item information meets the first acquisition condition that is associated with the type of the vehicle event represented by the third item information.

7. The information collection system of claim 4, wherein the first item information includes at least one of information representing a detection date/time of the vehicle event and information representing a detection position of the vehicle event.

8. The information collection system of claim 7, wherein the determination purposes information acquisition part includes a circumstance information acquisition part configured to obtain, based on the first item information, circumstance information representing at least one of the surrounding circumstance of the vehicle at a detection date/time of the vehicle event and the surrounding circumstance at a detection position of the vehicle event, and the determining part determines, based on the circumstance information, whether the first acquisition condition is met.

9. The information collection system of claim 3, wherein the vehicle event includes a plurality of types of the vehicle events, the vehicle event detection part, the data recording part, and the first transmission signal transmitting part are provided for respective types of the vehicle events, the information acquisition condition includes a second acquisition condition that is predetermined and associated with only the types of the vehicle events, the first information includes the third item information, and the information acquisition condition is met when the type of the vehicle event represented by the third item information meets the second acquisition condition.

10. The information collection system of claim 1, wherein the on-vehicle device includes a control part configured to perform automatic control or alarm control for assisting traveling of the vehicle, and the vehicle event includes an operation of the automatic control or the alarm control.

11. The information collection system of claim 10, wherein the on-vehicle device includes;

a detection/measurement apparatus configured to detect or measure a predetermined parameter, a plurality of control units configured to control the vehicle, and a communication module configured to communicate with the control units and the server in a bidirectional manner, wherein the vehicle event detection part, the data recording part, and the control part are implemented by a predetermined first control unit of the control units, the first storage is provided in the first control unit, the vehicle information generating part is implemented by at least one of the control units or the detection/measurement apparatus, the first transmission signal transmitting part and the upload demand receiving part are implemented by the communication module, and the upload executing part is implemented by the communication module and the first control unit.

12. A method of collecting information used in an information collection system, the information collection system including an on-vehicle device installed in a vehicle and a server disposed remotely from the vehicle, the server being configured to communicate with the on-vehicle device in a bidirectional manner, the method comprising:

detecting, with the on-vehicle device, a vehicle event, generating, with the on-vehicle device, vehicle information representing a state of the vehicle, recording, with the on-vehicle device, vehicle event data in the first storage when the vehicle event is detected, the vehicle event data including the vehicle information for a predetermined period according to a detection timing of the vehicle event, transmitting, with the on-vehicle device, a first transmission signal to the server when the vehicle event is detected, the first transmission signal including vehicle event detection report information for informing that the vehicle event has been detected, obtaining, with the server, determination purposes information, the server being configured to store an information acquisition condition that is predetermined to be determined based on the determination purposes information, the determination purposes information including at least one of information relevant to a timing when the vehicle event is detected, information relevant to a type of the vehicle event, and information relevant to a vehicle configuration that has influence on the vehicle event, determining, with the server, based on the determination purposes information, whether the information acquisition condition is met, when the first transmission is received by the server, transmitting, with the server, an upload demand to the on-vehicle device when it is determined that the information acquisition condition is met, and transmitting, with the on-vehicle device, the vehicle event data recorded in the first storage to the server when the upload demand is received by the on-vehicle device.

* * * * *